US010750303B2

(12) United States Patent
Sheen

(10) Patent No.: US 10,750,303 B2
(45) Date of Patent: Aug. 18, 2020

(54) SPATIAL AUDIO CORRECTION

(71) Applicant: Sonos, Inc., Santa Barbara, CA (US)

(72) Inventor: Timothy Sheen, Brighton, MA (US)

(73) Assignee: Sonos, Inc., Santa Barbara, CA (US)

(*) Notice: Subject to any disclaimer, the term of this patent is extended or adjusted under 35 U.S.C. 154(b) by 0 days.

(21) Appl. No.: 16/181,865

(22) Filed: Nov. 6, 2018

(65) Prior Publication Data
US 2019/0124458 A1  Apr. 25, 2019

Related U.S. Application Data

(63) Continuation of application No. 15/785,088, filed on Oct. 16, 2017, now Pat. No. 10,129,678, which is a (Continued)

(51) Int. Cl.
*H04R 29/00* (2006.01)
*G06F 3/16* (2006.01)

(52) U.S. Cl.
CPC .......... *H04R 29/007* (2013.01); *G06F 3/162* (2013.01); *G06F 3/165* (2013.01); (Continued)

(58) Field of Classification Search
CPC ............ H04R 29/007; H04R 2227/003; H04R 2227/005; H04R 2227/007; H04R 2430/20; G06F 3/162; G06F 3/165
See application file for complete search history.

(56) References Cited

U.S. PATENT DOCUMENTS 679,889 A   8/1901  Charles
4,306,113 A  12/1981  Morton
(Continued)

FOREIGN PATENT DOCUMENTS

CN     1447624 A    10/2003
CN   101366177 A     2/2009
(Continued)

OTHER PUBLICATIONS

Non-Final Office Action dated Aug. 2, 2017, issued in connection with U.S. Appl. No. 15/298,115, filed Oct. 19, 2016, 22 pages.
(Continued)

*Primary Examiner* — Mark Fischer
(74) *Attorney, Agent, or Firm* — McDonnell Boehnen Hulbert & Berghoff LLP

(57) ABSTRACT

Example techniques may involve performing aspects of a spatial calibration. An example implementation may include detecting a trigger condition that initiates calibration of a media playback system including multiple audio drivers that form multiple sound axes, each sound axis corresponding to a respective channel of multi-channel audio content The implementation may also include causing the multiple audio drivers to emit calibration audio that is divided into constituent frames, the multiple sound axes emitting calibration audio during respective slots of each constituent frame. The implementation may further include recording the emitted calibration audio. The implementation may include causing delays for each sound axis of the multiple sound axes to be determined, the determined delay for each sound axis based on the slots of recorded calibration audio corresponding to the sound axes and causing the multiple sound axes to be calibrated.

23 Claims, 19 Drawing Sheets

Related U.S. Application Data continuation of application No. 15/211,822, filed on Jul. 15, 2016, now Pat. No. 9,794,710.

(52) U.S. Cl.
CPC .. *H04R 2227/003* (2013.01); *H04R 2227/005* (2013.01); *H04R 2227/007* (2013.01); *H04R 2430/20* (2013.01)

(56) References Cited

U.S. PATENT DOCUMENTS

| | | |
|---|---|---|
| 4,342,104 A | 7/1982 | Jack |
| 4,504,704 A | 3/1985 | Ohyaba et al. |
| 4,592,088 A | 5/1986 | Shimada |
| 4,628,530 A | 12/1986 | Op et al. |
| 4,631,749 A | 12/1986 | Rapaich |
| 4,694,484 A | 9/1987 | Atkinson et al. |
| 4,773,094 A | 9/1988 | Dolby |
| 4,995,778 A | 2/1991 | Brussel |
| 5,218,710 A | 6/1993 | Yamaki et al. |
| 5,255,326 A | 10/1993 | Stevenson |
| 5,323,257 A | 6/1994 | Abe et al. |
| 5,386,478 A | 1/1995 | Plunkett |
| 5,440,644 A | 8/1995 | Farinelli et al. |
| 5,553,147 A | 9/1996 | Pineau |
| 5,581,621 A | 12/1996 | Koyama et al. |
| 5,757,927 A | 5/1998 | Gerzon et al. |
| 5,761,320 A | 6/1998 | Farinelli et al. |
| 5,910,991 A | 6/1999 | Farrar |
| 5,923,902 A | 7/1999 | Inagaki |
| 5,939,656 A | 8/1999 | Suda |
| 6,018,376 A | 1/2000 | Nakatani |
| 6,032,202 A | 2/2000 | Lea et al. |
| 6,072,879 A | 6/2000 | Ouchi et al. |
| 6,111,957 A | 8/2000 | Thomasson |
| 6,256,554 B1 | 7/2001 | DiLorenzo |
| 6,363,155 B1 | 3/2002 | Horbach |
| 6,404,811 B1 | 6/2002 | Cvetko et al. |
| 6,469,633 B1 | 10/2002 | Wachter et al. |
| 6,522,886 B1 | 2/2003 | Youngs et al. |
| 6,573,067 B1 | 6/2003 | Dib-Hajj et al. |
| 6,611,537 B1 | 8/2003 | Edens et al. |
| 6,631,410 B1 | 10/2003 | Kowalski et al. |
| 6,639,989 B1 | 10/2003 | Zacharov et al. |
| 6,643,744 B1 | 11/2003 | Cheng |
| 6,704,421 B1 | 3/2004 | Kitamura |
| 6,721,428 B1 | 4/2004 | Allred et al. |
| 6,757,517 B2 | 6/2004 | Chang et al. |
| 6,760,451 B1 | 7/2004 | Craven et al. |
| 6,766,025 B1 | 7/2004 | Levy et al. |
| 6,778,869 B2 | 8/2004 | Champion |
| 6,798,889 B1 | 9/2004 | Dicker et al. |
| 6,862,440 B2 | 3/2005 | Sampath |
| 6,916,980 B2 | 7/2005 | Ishida et al. |
| 6,931,134 B1 | 8/2005 | Waller, Jr. et al. |
| 6,985,694 B1 | 1/2006 | De Bonet et al. |
| 6,990,211 B2 | 1/2006 | Parker |
| 7,031,476 B1 | 4/2006 | Chrisop et al. |
| 7,039,212 B2 | 5/2006 | Poling et al. |
| 7,058,186 B2 | 6/2006 | Tanaka |
| 7,072,477 B1 | 7/2006 | Kincaid |
| 7,103,187 B1 | 9/2006 | Neuman |
| 7,130,608 B2 | 10/2006 | Hollstrom et al. |
| 7,130,616 B2 | 10/2006 | Janik |
| 7,143,939 B2 | 12/2006 | Henzerling |
| 7,187,947 B1 | 3/2007 | White et al. |
| 7,236,773 B2 | 6/2007 | Thomas |
| 7,289,637 B2 | 10/2007 | Montag et al. |
| 7,295,548 B2 | 11/2007 | Blank et al. |
| 7,312,785 B2 | 12/2007 | Tsuk et al. |
| 7,391,791 B2 | 6/2008 | Balassanian et al. |
| 7,477,751 B2 | 1/2009 | Lyon et al. |
| 7,483,538 B2 | 1/2009 | McCarty et al. |
| 7,483,540 B2 | 1/2009 | Rabinowitz et al. |
| 7,489,784 B2 | 2/2009 | Yoshino |
| 7,490,044 B2 | 2/2009 | Kulkarni |
| 7,492,909 B2 | 2/2009 | Carter et al. |
| 7,519,188 B2 | 4/2009 | Berardi et al. |
| 7,529,377 B2 | 5/2009 | Nackvi et al. |
| 7,571,014 B1 | 8/2009 | Lambourne et al. |
| 7,590,772 B2 | 9/2009 | Marriott et al. |
| 7,630,500 B1 | 12/2009 | Beckman et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,664,276 B2 | 2/2010 | McKee |
| 7,676,044 B2 | 3/2010 | Sasaki et al. |
| 7,689,305 B2 | 3/2010 | Kreifeldt et al. |
| 7,720,237 B2 | 5/2010 | Bharitkar et al. |
| 7,742,740 B2 | 6/2010 | Goldberg et al. |
| 7,769,183 B2 | 8/2010 | Bharitkar et al. |
| 7,796,068 B2 | 9/2010 | Raz et al. |
| 7,835,689 B2 | 11/2010 | Goldberg et al. |
| 7,853,341 B2 | 12/2010 | McCarty et al. |
| 7,876,903 B2 | 1/2011 | Sauk |
| 7,925,203 B2 | 4/2011 | Lane et al. |
| 7,949,140 B2 | 5/2011 | Kino |
| 7,949,707 B2 | 5/2011 | McDowall et al. |
| 7,961,893 B2 | 6/2011 | Kino |
| 7,970,922 B2 | 6/2011 | Svendsen |
| 7,987,294 B2 | 7/2011 | Bryce et al. |
| 8,005,228 B2 | 8/2011 | Bharitkar et al. |
| 8,014,423 B2 | 9/2011 | Thaler et al. |
| 8,045,721 B2 | 10/2011 | Burgan et al. |
| 8,045,952 B2 | 10/2011 | Qureshey et al. |
| 8,050,652 B2 | 11/2011 | Qureshey et al. |
| 8,063,698 B2 | 11/2011 | Howard |
| 8,074,253 B1 | 12/2011 | Nathan |
| 8,103,009 B2 | 1/2012 | McCarty et al. |
| 8,116,476 B2 | 2/2012 | Inohara |
| 8,126,172 B2 | 2/2012 | Horbach et al. |
| 8,131,390 B2 | 3/2012 | Braithwaite et al. |
| 8,139,774 B2 * | 3/2012 | Berardi ............... H04R 1/403 381/17 |
| 8,144,883 B2 | 3/2012 | Pedersen et al. |
| 8,160,276 B2 | 4/2012 | Liao et al. |
| 8,160,281 B2 | 4/2012 | Kim et al. |
| 8,170,260 B2 | 5/2012 | Reining et al. |
| 8,175,292 B2 | 5/2012 | Aylward et al. |
| 8,175,297 B1 | 5/2012 | Ho et al. |
| 8,194,874 B2 | 6/2012 | Starobin et al. |
| 8,229,125 B2 | 7/2012 | Short |
| 8,233,632 B1 | 7/2012 | MacDonald et al. |
| 8,234,395 B2 | 7/2012 | Millington et al. |
| 8,238,547 B2 | 8/2012 | Ohki et al. |
| 8,238,578 B2 | 8/2012 | Aylward |
| 8,243,961 B1 | 8/2012 | Morrill |
| 8,264,408 B2 | 9/2012 | Kainulainen et al. |
| 8,265,310 B2 | 9/2012 | Berardi et al. |
| 8,270,620 B2 | 9/2012 | Christensen et al. |
| 8,279,709 B2 | 10/2012 | Choisel et al. |
| 8,281,001 B2 | 10/2012 | Busam et al. |
| 8,290,185 B2 | 10/2012 | Kim |
| 8,291,349 B1 | 10/2012 | Park et al. |
| 8,300,845 B2 | 10/2012 | Zurek et al. |
| 8,306,235 B2 | 11/2012 | Mahowald |
| 8,325,931 B2 | 12/2012 | Howard et al. |
| 8,325,935 B2 | 12/2012 | Rutschman |
| 8,325,944 B1 | 12/2012 | Duwenhorst et al. |
| 8,331,585 B2 | 12/2012 | Hagen et al. |
| 8,332,414 B2 | 12/2012 | Nguyen et al. |
| 8,379,876 B2 | 2/2013 | Zhang |
| 8,391,501 B2 | 3/2013 | Khawand et al. |
| 8,392,505 B2 | 3/2013 | Haughay et al. |
| 8,401,202 B2 | 3/2013 | Brooking |
| 8,433,076 B2 | 4/2013 | Zurek et al. |
| 8,452,020 B2 | 5/2013 | Gregg et al. |
| 8,463,184 B2 | 6/2013 | Dua |
| 8,483,853 B1 | 7/2013 | Lambourne et al. |
| 8,488,799 B2 | 7/2013 | Goldstein et al. |
| 8,503,669 B2 | 8/2013 | Mao |
| 8,527,876 B2 | 9/2013 | Wood et al. |
| 8,577,045 B2 | 11/2013 | Gibbs |
| 8,577,048 B2 | 11/2013 | Chaikin et al. |

(56) References Cited

U.S. PATENT DOCUMENTS

| | | |
|---|---|---|
| 8,600,075 B2 | 12/2013 | Lim |
| 8,620,006 B2 | 12/2013 | Berardi et al. |
| 8,682,002 B2 | 3/2014 | Wihardja et al. |
| 8,731,206 B1 | 5/2014 | Park |
| 8,755,538 B2 | 6/2014 | Kwon |
| 8,798,280 B2 | 8/2014 | Goldberg et al. |
| 8,819,554 B2 | 8/2014 | Basso et al. |
| 8,831,244 B2 | 9/2014 | Apfel |
| 8,855,319 B2 | 10/2014 | Liu et al. |
| 8,862,273 B2 | 10/2014 | Karr |
| 8,879,761 B2 | 11/2014 | Johnson et al. |
| 8,903,526 B2 | 12/2014 | Beckhardt et al. |
| 8,914,559 B2 | 12/2014 | Kalayjian et al. |
| 8,930,005 B2 | 1/2015 | Reimann et al. |
| 8,934,647 B2 | 1/2015 | Joyce et al. |
| 8,934,655 B2 | 1/2015 | Breen et al. |
| 8,942,252 B2 | 1/2015 | Balassanian et al. |
| 8,965,033 B2 | 2/2015 | Wiggins |
| 8,965,546 B2 | 2/2015 | Visser et al. |
| 8,977,974 B2 | 3/2015 | Kraut |
| 8,984,442 B2 | 3/2015 | Pirnack et al. |
| 8,989,406 B2 | 3/2015 | Wong et al. |
| 8,995,687 B2 | 3/2015 | Marino, Jr. et al. |
| 8,996,370 B2 | 3/2015 | Ansell |
| 9,020,153 B2 | 4/2015 | Britt, Jr. |
| 9,021,153 B2 | 4/2015 | Lu |
| 9,065,929 B2 | 6/2015 | Chen et al. |
| 9,084,058 B2 | 7/2015 | Reilly et al. |
| 9,100,766 B2 | 8/2015 | Soulodre et al. |
| 9,106,192 B2 | 8/2015 | Sheen et al. |
| 9,179,233 B2 | 11/2015 | Kang |
| 9,215,545 B2 | 12/2015 | Dublin et al. |
| 9,219,460 B2 | 12/2015 | Bush |
| 9,231,545 B2 | 1/2016 | Agustin et al. |
| 9,286,384 B2 | 3/2016 | Kuper et al. |
| 9,288,597 B2 | 3/2016 | Carlsson et al. |
| 9,300,266 B2 | 3/2016 | Grokop |
| 9,319,816 B1 | 4/2016 | Narayanan |
| 9,451,377 B2 | 9/2016 | Massey et al. |
| 9,462,399 B2 | 10/2016 | Bharitkar et al. |
| 9,467,779 B2 | 10/2016 | Iyengar et al. |
| 9,472,201 B1 | 10/2016 | Sleator |
| 9,489,948 B1 | 11/2016 | Chu et al. |
| 9,524,098 B2 | 12/2016 | Griffiths et al. |
| 9,538,305 B2 | 1/2017 | Lehnert et al. |
| 9,538,308 B2 | 1/2017 | Isaac et al. |
| 9,560,449 B2 | 1/2017 | Carlsson et al. |
| 9,560,460 B2 | 1/2017 | Chaikin et al. |
| 9,609,383 B1 | 3/2017 | Hirst |
| 9,615,171 B1 | 4/2017 | O'Neill et al. |
| 9,674,625 B2 | 6/2017 | Armstrong-Muntner et al. |
| 9,689,960 B1 | 6/2017 | Barton et al. |
| 9,690,271 B2 | 6/2017 | Sheen et al. |
| 9,706,323 B2 | 7/2017 | Sheen et al. |
| 9,723,420 B2 | 8/2017 | Family et al. |
| 9,743,207 B1 | 8/2017 | Hartung |
| 9,743,208 B2 | 8/2017 | Oishi et al. |
| 9,763,018 B1 | 9/2017 | McPherson et al. |
| 9,788,113 B2 | 10/2017 | Wilberding et al. |
| 9,860,662 B2 | 1/2018 | Jarvis et al. |
| 9,864,574 B2 | 1/2018 | Hartung et al. |
| 10,045,142 B2 | 8/2018 | McPherson et al. |
| 10,154,359 B2 | 12/2018 | Sheen |
| 10,206,052 B2 | 2/2019 | Perianu |
| 2001/0038702 A1 | 11/2001 | Lavoie et al. |
| 2001/0042107 A1 | 11/2001 | Palm |
| 2001/0043592 A1 | 11/2001 | Jimenez et al. |
| 2001/0053228 A1 | 12/2001 | Jones |
| 2002/0022453 A1 | 2/2002 | Balog et al. |
| 2002/0026442 A1 | 2/2002 | Lipscomb et al. |
| 2002/0078161 A1 | 6/2002 | Cheng |
| 2002/0089529 A1 | 7/2002 | Robbin |
| 2002/0124097 A1 | 9/2002 | Isely et al. |
| 2002/0126852 A1 | 9/2002 | Kashani et al. |
| 2002/0136414 A1 | 9/2002 | Jordan et al. |
| 2002/0146136 A1 | 10/2002 | Carter et al. |
| 2003/0002689 A1 | 1/2003 | Folio |
| 2003/0031334 A1 | 2/2003 | Layton et al. |
| 2003/0157951 A1 | 8/2003 | Hasty |
| 2003/0161479 A1 | 8/2003 | Yang et al. |
| 2003/0161492 A1 | 8/2003 | Miller et al. |
| 2003/0179891 A1 | 9/2003 | Rabinowitz et al. |
| 2003/0235311 A1 | 12/2003 | Grancea et al. |
| 2004/0024478 A1 | 2/2004 | Hans et al. |
| 2004/0131338 A1 | 7/2004 | Asada et al. |
| 2004/0237750 A1 | 12/2004 | Smith et al. |
| 2005/0031143 A1 | 2/2005 | Devantier et al. |
| 2005/0063554 A1 | 3/2005 | Devantier et al. |
| 2005/0147261 A1 | 7/2005 | Yeh |
| 2005/0157885 A1 | 7/2005 | Olney et al. |
| 2006/0008256 A1 | 1/2006 | Khedouri et al. |
| 2006/0026521 A1 | 2/2006 | Hotelling et al. |
| 2006/0032357 A1 | 2/2006 | Roovers et al. |
| 2006/0195480 A1 | 8/2006 | Spiegelman et al. |
| 2006/0225097 A1 | 10/2006 | Lawrence-Apfelbaum |
| 2007/0003067 A1 | 1/2007 | Gierl et al. |
| 2007/0025559 A1 | 2/2007 | Mihelich et al. |
| 2007/0032895 A1 | 2/2007 | Nackvi et al. |
| 2007/0038999 A1 | 2/2007 | Millington et al. |
| 2007/0086597 A1 | 4/2007 | Kino |
| 2007/0116254 A1 | 5/2007 | Looney et al. |
| 2007/0121955 A1 | 5/2007 | Johnston et al. |
| 2007/0142944 A1 | 6/2007 | Goldberg et al. |
| 2008/0002839 A1 | 1/2008 | Eng |
| 2008/0014989 A1 | 1/2008 | Sandegard et al. |
| 2008/0065247 A1 | 3/2008 | Igoe et al. |
| 2008/0069378 A1 | 3/2008 | Rabinowitz et al. |
| 2008/0077261 A1 | 3/2008 | Baudino et al. |
| 2008/0098027 A1 | 4/2008 | Aarts |
| 2008/0136623 A1 | 6/2008 | Calvarese |
| 2008/0144864 A1 | 6/2008 | Huon et al. |
| 2008/0175411 A1 | 7/2008 | Greve |
| 2008/0214160 A1 | 9/2008 | Jonsson |
| 2008/0232603 A1 | 9/2008 | Soulodre et al. |
| 2008/0266385 A1 | 10/2008 | Smith et al. |
| 2008/0281523 A1 | 11/2008 | Dahl et al. |
| 2009/0003613 A1 | 1/2009 | Christensen et al. |
| 2009/0024662 A1 | 1/2009 | Park et al. |
| 2009/0047993 A1 | 2/2009 | Vasa |
| 2009/0063274 A1 | 3/2009 | Dublin, III et al. |
| 2009/0110218 A1 | 4/2009 | Swain |
| 2009/0138507 A1 | 5/2009 | Burckart et al. |
| 2009/0147134 A1 | 6/2009 | Iwamatsu |
| 2009/0175476 A1* | 7/2009 | Bottum ............... H04R 5/02 381/335 |
| 2009/0180632 A1 | 7/2009 | Goldberg et al. |
| 2009/0196428 A1 | 8/2009 | Kim |
| 2009/0202082 A1 | 8/2009 | Bharitkar et al. |
| 2009/0252481 A1 | 10/2009 | Ekstrand |
| 2009/0304194 A1 | 12/2009 | Eggleston et al. |
| 2009/0304205 A1 | 12/2009 | Hardacker et al. |
| 2009/0316923 A1 | 12/2009 | Tashev et al. |
| 2010/0095332 A1 | 4/2010 | Gran et al. |
| 2010/0128902 A1 | 5/2010 | Liu et al. |
| 2010/0135501 A1 | 6/2010 | Corbett et al. |
| 2010/0142735 A1 | 6/2010 | Yoon et al. |
| 2010/0146445 A1 | 6/2010 | Kraut |
| 2010/0162117 A1 | 6/2010 | Basso et al. |
| 2010/0189203 A1 | 7/2010 | Wilhelmsson et al. |
| 2010/0195846 A1 | 8/2010 | Yokoyama |
| 2010/0272270 A1 | 10/2010 | Chaikin et al. |
| 2010/0296659 A1 | 11/2010 | Tanaka |
| 2010/0303248 A1 | 12/2010 | Tawada |
| 2010/0303250 A1 | 12/2010 | Goldberg et al. |
| 2010/0323793 A1 | 12/2010 | Andall et al. |
| 2011/0007904 A1 | 1/2011 | Tomoda et al. |
| 2011/0007905 A1 | 1/2011 | Sato et al. |
| 2011/0087842 A1 | 4/2011 | Lu et al. |
| 2011/0091055 A1 | 4/2011 | Leblanc |
| 2011/0135103 A1 | 6/2011 | Sun et al. |
| 2011/0150228 A1* | 6/2011 | Yoon ............... H04R 3/12 381/17 |
| 2011/0170710 A1 | 7/2011 | Son |
| 2011/0234480 A1 | 9/2011 | Fino et al. |

(56) References Cited

U.S. PATENT DOCUMENTS

| | | |
|---|---|---|
| 2011/0235808 A1 | 9/2011 | Kon |
| 2011/0268281 A1 | 11/2011 | Florencio et al. |
| 2012/0032928 A1 | 2/2012 | Alberth et al. |
| 2012/0051558 A1 | 3/2012 | Kim et al. |
| 2012/0057724 A1 | 3/2012 | Rabinowitz et al. |
| 2012/0093320 A1 | 4/2012 | Flaks et al. |
| 2012/0127831 A1 | 5/2012 | Gicklhorn et al. |
| 2012/0140936 A1 | 6/2012 | Bonnick et al. |
| 2012/0148075 A1 | 6/2012 | Goh et al. |
| 2012/0183156 A1 | 7/2012 | Schlessinger et al. |
| 2012/0213391 A1 | 8/2012 | Usami et al. |
| 2012/0215530 A1 | 8/2012 | Harsch et al. |
| 2012/0237037 A1 | 9/2012 | Ninan et al. |
| 2012/0243697 A1 | 9/2012 | Frye et al. |
| 2012/0263325 A1 | 10/2012 | Freeman et al. |
| 2012/0268145 A1 | 10/2012 | Chandra et al. |
| 2012/0269356 A1 | 10/2012 | Sheerin et al. |
| 2012/0275613 A1 | 11/2012 | Soulodre et al. |
| 2012/0283593 A1 | 11/2012 | Searchfield et al. |
| 2012/0288124 A1 | 11/2012 | Fejzo et al. |
| 2013/0010970 A1 | 1/2013 | Hegarty et al. |
| 2013/0028443 A1 | 1/2013 | Pance et al. |
| 2013/0051572 A1 | 2/2013 | Goh et al. |
| 2013/0066453 A1 | 3/2013 | Seefeldt et al. |
| 2013/0108055 A1 | 5/2013 | Hanna et al. |
| 2013/0129102 A1 | 5/2013 | Li et al. |
| 2013/0129122 A1 | 5/2013 | Johnson et al. |
| 2013/0166227 A1 | 6/2013 | Hermann et al. |
| 2013/0202131 A1 | 8/2013 | Kemmochi et al. |
| 2013/0211843 A1 | 8/2013 | Clarkson |
| 2013/0216071 A1 | 8/2013 | Maher et al. |
| 2013/0223642 A1 | 8/2013 | Warren et al. |
| 2013/0230175 A1 | 9/2013 | Bech et al. |
| 2013/0259254 A1 | 10/2013 | Xiang et al. |
| 2013/0279706 A1 | 10/2013 | Marti et al. |
| 2013/0305152 A1 | 11/2013 | Griffiths et al. |
| 2013/0315405 A1 | 11/2013 | Kanishima et al. |
| 2013/0329896 A1 | 12/2013 | Krishnaswamy et al. |
| 2013/0331970 A1 | 12/2013 | Beckhardt et al. |
| 2014/0003622 A1 | 1/2014 | Ikizyan et al. |
| 2014/0003623 A1 | 1/2014 | Lang |
| 2014/0003625 A1 | 1/2014 | Sheen et al. |
| 2014/0003626 A1 | 1/2014 | Holman et al. |
| 2014/0003635 A1 | 1/2014 | Mohammad et al. |
| 2014/0006587 A1 | 1/2014 | Kusano et al. |
| 2014/0016784 A1 | 1/2014 | Sen et al. |
| 2014/0016786 A1 | 1/2014 | Sen |
| 2014/0016802 A1 | 1/2014 | Sen |
| 2014/0023196 A1 | 1/2014 | Xiang et al. |
| 2014/0029201 A1 | 1/2014 | Yang et al. |
| 2014/0032709 A1 | 1/2014 | Saussy et al. |
| 2014/0037097 A1 | 2/2014 | Labosco |
| 2014/0037107 A1 | 2/2014 | Marino, Jr. et al. |
| 2014/0052770 A1 | 2/2014 | Gran et al. |
| 2014/0064501 A1 | 3/2014 | Olsen et al. |
| 2014/0079242 A1 | 3/2014 | Nguyen et al. |
| 2014/0084014 A1 | 3/2014 | Sim et al. |
| 2014/0086423 A1 | 3/2014 | Domingo et al. |
| 2014/0112481 A1 | 4/2014 | Li et al. |
| 2014/0119551 A1 | 5/2014 | Bharitkar et al. |
| 2014/0126730 A1 | 5/2014 | Crawley et al. |
| 2014/0161265 A1 | 6/2014 | Chaikin et al. |
| 2014/0169569 A1 | 6/2014 | Toivanen et al. |
| 2014/0180684 A1 | 6/2014 | Strub |
| 2014/0192986 A1 | 7/2014 | Lee et al. |
| 2014/0219456 A1 | 8/2014 | Morrell et al. |
| 2014/0219483 A1 | 8/2014 | Hong |
| 2014/0226823 A1 | 8/2014 | Sen et al. |
| 2014/0242913 A1 | 8/2014 | Pang |
| 2014/0267148 A1 | 9/2014 | Luna et al. |
| 2014/0270202 A1 | 9/2014 | Ivanov et al. |
| 2014/0270282 A1 | 9/2014 | Tammi et al. |
| 2014/0273859 A1 | 9/2014 | Luna et al. |
| 2014/0279889 A1 | 9/2014 | Luna et al. |
| 2014/0285313 A1 | 9/2014 | Luna et al. |
| 2014/0286496 A1 | 9/2014 | Luna et al. |
| 2014/0294200 A1 | 10/2014 | Baumgarte et al. |
| 2014/0294201 A1 | 10/2014 | Johnson et al. |
| 2014/0310269 A1 | 10/2014 | Zhang et al. |
| 2014/0321670 A1 | 10/2014 | Nystrom et al. |
| 2014/0323036 A1 | 10/2014 | Daley et al. |
| 2014/0334644 A1 | 11/2014 | Selig et al. |
| 2014/0341399 A1 | 11/2014 | Dusse |
| 2014/0344689 A1 | 11/2014 | Scott et al. |
| 2014/0355768 A1 | 12/2014 | Sen et al. |
| 2014/0355794 A1 | 12/2014 | Morrell et al. |
| 2015/0011195 A1 | 1/2015 | Li |
| 2015/0016642 A1 | 1/2015 | Walsh et al. |
| 2015/0023509 A1 | 1/2015 | Devantier et al. |
| 2015/0031287 A1 | 1/2015 | Pang et al. |
| 2015/0032844 A1 | 1/2015 | Tarr et al. |
| 2015/0036847 A1 | 2/2015 | Donaldson |
| 2015/0036848 A1 | 2/2015 | Donaldson |
| 2015/0043736 A1 | 2/2015 | Olsen et al. |
| 2015/0063610 A1 | 3/2015 | Mossner |
| 2015/0078586 A1 | 3/2015 | Ang et al. |
| 2015/0078596 A1 | 3/2015 | Sprogis et al. |
| 2015/0100991 A1 | 4/2015 | Risberg et al. |
| 2015/0146886 A1 | 5/2015 | Baumgarte |
| 2015/0149943 A1 | 5/2015 | Nguyen et al. |
| 2015/0161360 A1 | 6/2015 | Paruchuri et al. |
| 2015/0195666 A1 | 7/2015 | Massey et al. |
| 2015/0201274 A1 | 7/2015 | Ellner et al. |
| 2015/0208184 A1 | 7/2015 | Tan et al. |
| 2015/0212788 A1 | 7/2015 | Lang |
| 2015/0220558 A1 | 8/2015 | Snibbe et al. |
| 2015/0223002 A1 | 8/2015 | Mehta et al. |
| 2015/0229699 A1 | 8/2015 | Liu |
| 2015/0260754 A1 | 9/2015 | Perotti et al. |
| 2015/0271616 A1 | 9/2015 | Kechichian et al. |
| 2015/0281866 A1 | 10/2015 | Williams et al. |
| 2015/0289064 A1 | 10/2015 | Jensen et al. |
| 2015/0358756 A1 | 12/2015 | Harma et al. |
| 2015/0382128 A1 | 12/2015 | Ridihalgh et al. |
| 2016/0007116 A1 | 1/2016 | Holman |
| 2016/0011846 A1 | 1/2016 | Sheen |
| 2016/0011850 A1 | 1/2016 | Sheen et al. |
| 2016/0014509 A1 | 1/2016 | Hansson et al. |
| 2016/0014510 A1 | 1/2016 | Sheen et al. |
| 2016/0014511 A1 | 1/2016 | Sheen et al. |
| 2016/0014534 A1 | 1/2016 | Sheen et al. |
| 2016/0014536 A1 | 1/2016 | Sheen |
| 2016/0021458 A1 | 1/2016 | Johnson et al. |
| 2016/0021473 A1 | 1/2016 | Riggi et al. |
| 2016/0021481 A1 | 1/2016 | Johnson et al. |
| 2016/0027467 A1 | 1/2016 | Proud |
| 2016/0029142 A1 | 1/2016 | Isaac et al. |
| 2016/0035337 A1 | 2/2016 | Aggarwal et al. |
| 2016/0036881 A1 | 2/2016 | Tembey et al. |
| 2016/0037277 A1 | 2/2016 | Matsumoto et al. |
| 2016/0061597 A1 | 3/2016 | De et al. |
| 2016/0070526 A1 | 3/2016 | Sheen |
| 2016/0073210 A1 | 3/2016 | Sheen et al. |
| 2016/0088438 A1* | 3/2016 | O'Keeffe ............... H04W 4/21 455/456.2 |
| 2016/0119730 A1 | 4/2016 | Virtanen |
| 2016/0140969 A1 | 5/2016 | Srinivasan et al. |
| 2016/0165297 A1 | 6/2016 | Jamal-Syed et al. |
| 2016/0192098 A1 | 6/2016 | Oishi et al. |
| 2016/0192099 A1 | 6/2016 | Oishi et al. |
| 2016/0212535 A1 | 7/2016 | Le et al. |
| 2016/0239255 A1 | 8/2016 | Chavez et al. |
| 2016/0260140 A1 | 9/2016 | Shirley et al. |
| 2016/0309276 A1 | 10/2016 | Ridihalgh et al. |
| 2016/0313971 A1 | 10/2016 | Bierbower et al. |
| 2016/0316305 A1 | 10/2016 | Sheen et al. |
| 2016/0330562 A1 | 11/2016 | Crockett et al. |
| 2016/0366517 A1 | 12/2016 | Chandran et al. |
| 2017/0069338 A1 | 3/2017 | Elliot et al. |
| 2017/0083279 A1 | 3/2017 | Sheen et al. |
| 2017/0086003 A1 | 3/2017 | Rabinowitz et al. |
| 2017/0105084 A1 | 4/2017 | Holman |
| 2017/0142532 A1 | 5/2017 | Pan |
| 2017/0207762 A1 | 7/2017 | Porter et al. |

(56) References Cited

U.S. PATENT DOCUMENTS

| | | | |
|---|---|---|---|
| 2017/0223447 | A1 | 8/2017 | Johnson et al. |
| 2017/0230772 | A1 | 8/2017 | Johnson et al. |
| 2017/0257722 | A1* | 9/2017 | Kerdranvat ............ H04S 3/002 |
| 2017/0280265 | A1* | 9/2017 | Po ........................... H04S 7/30 |
| 2017/0303039 | A1 | 10/2017 | Iyer et al. |
| 2017/0311108 | A1 | 10/2017 | Patel et al. |
| 2017/0374482 | A1 | 12/2017 | McPherson et al. |
| 2019/0037328 | A1 | 1/2019 | McPherson et al. |

FOREIGN PATENT DOCUMENTS

| | | | |
|---|---|---|---|
| CN | 101491116 | A | 7/2009 |
| CN | 102318325 | A | 1/2012 |
| CN | 102893633 | A | 1/2013 |
| CN | 103988523 | A | 8/2014 |
| CN | 105163221 | A | 12/2015 |
| EP | 0505949 | A1 | 9/1992 |
| EP | 0772374 | A2 | 5/1997 |
| EP | 1133896 | B1 | 8/2002 |
| EP | 1349427 | A2 | 10/2003 |
| EP | 1389853 | A1 | 2/2004 |
| EP | 2043381 | A2 | 4/2009 |
| EP | 1349427 | B1 | 12/2009 |
| EP | 2161950 | A2 | 3/2010 |
| EP | 2194471 | A1 | 6/2010 |
| EP | 2197220 | A2 | 6/2010 |
| EP | 2429155 | A1 | 3/2012 |
| EP | 1825713 | B1 | 10/2012 |
| EP | 2613573 | A1 | 7/2013 |
| EP | 2591617 | B1 | 6/2014 |
| EP | 2835989 | A2 | 2/2015 |
| EP | 2860992 | A1 | 4/2015 |
| EP | 3128767 | A2 | 2/2017 |
| EP | 2974382 | B1 | 4/2017 |
| JP | H02280199 | A | 11/1990 |
| JP | H05199593 | A | 8/1993 |
| JP | H05211700 | A | 8/1993 |
| JP | H06327089 | A | 11/1994 |
| JP | H0723490 | A | 1/1995 |
| JP | H1069280 | A | 3/1998 |
| JP | 2002502193 | A | 1/2002 |
| JP | 2003143252 | A | 5/2003 |
| JP | 2003304590 | A | 10/2003 |
| JP | 2005086686 | A | 3/2005 |
| JP | 2005538633 | A | 12/2005 |
| JP | 2006017893 | A | 1/2006 |
| JP | 2006180039 | A | 7/2006 |
| JP | 2007068125 | A | 3/2007 |
| JP | 2007271802 | A | 10/2007 |
| JP | 2008228133 | A | 9/2008 |
| JP | 2009188474 | A | 8/2009 |
| JP | 2010081124 | A | 4/2010 |
| JP | 2011123376 | A | 6/2011 |
| JP | 2011164166 | A | 8/2011 |
| JP | 2011217068 | A | 10/2011 |
| JP | 2013253884 | A | 12/2013 |
| KR | 1020060116383 | | 11/2006 |
| KR | 1020080011831 | | 2/2008 |
| WO | 200153994 | | 7/2001 |
| WO | 0182650 | A2 | 11/2001 |
| WO | 200182650 | | 11/2001 |
| WO | 2003093950 | A2 | 11/2003 |
| WO | 2004066673 | A1 | 8/2004 |
| WO | 2007016465 | A2 | 2/2007 |
| WO | 2011139502 | A1 | 11/2011 |
| WO | 2013016500 | A1 | 1/2013 |
| WO | 2014032709 | | 3/2014 |
| WO | 2014036121 | A1 | 3/2014 |
| WO | 2015024881 | A1 | 2/2015 |
| WO | 2015108794 | A1 | 7/2015 |
| WO | 2015178950 | A1 | 11/2015 |
| WO | 2016040324 | A1 | 3/2016 |
| WO | 2017049169 | A1 | 3/2017 |

OTHER PUBLICATIONS

Non-Final Office Action dated Apr. 20, 2017, issued in connection with U.S. Appl. No. 15/005,853, filed Jan. 25, 2016, 8 pages.
Non-Final Office Action dated Jul. 20, 2016, issued in connection with U.S. Appl. No. 14/682,182, filed Apr. 9, 2015, 13 pages.
Non-Final Office Action dated Jun. 20, 2017, issued in connection with U.S. Appl. No. 15/207,682, filed Jul. 12, 2016, 17 pages.
Non-Final Office Action dated Dec. 21, 2018, issued in connection with U.S. Appl. No. 61/181,213, filed Nov. 5, 2018, 13 pages.
Non-Final Office Action dated Jun. 21, 2016, issued in connection with U.S. Appl. No. 14/678,248, filed Apr. 3, 2015, 10 pages.
Non-Final Office Action dated Nov. 21, 2014, issued in connection with U.S. Appl. No. 13/536,493, filed Jun. 28, 2012, 20 pages.
Non-Final Office Action dated Jun. 22, 2018, issued in connection with U.S. Appl. No. 15/217,399, filed Jul. 22, 2016, 33 pages.
Non-Final Office Action dated Jan. 23, 2019, issued in connection with U.S. Appl. No. 16/113,032, filed Aug. 27, 2018, 8 pages.
Non-Final Office Action dated Oct. 25, 2016, issued in connection with U.S. Appl. No. 14/864,506, filed Sep. 24, 2015, 9 pages.
Non-Final Office Action dated Sep. 26, 2018, issued in connection with U.S. Appl. No. 15/229,693, filed Aug. 5, 2016, 25 pages.
Non-Final Office Action dated Dec. 27, 2017, issued in connection with U.S. Appl. No. 15/357,520, filed Nov. 21, 2016, 28 pages.
Non-Final Office Action dated Feb. 27, 2018, issued in connection with U.S. Appl. No. 14/864,393, filed Sep. 24, 2015, 19 pages.
Non-Final Office Action dated Feb. 27, 2018, issued in connection with U.S. Appl. No. 15/718,556, filed Sep. 28, 2017, 19 pages.
Non-Final Office Action dated Jul. 27, 2016, issued in connection with U.S. Appl. No. 14/696,014, filed Apr. 24, 2015, 11 pages.
Non-Final Office Action dated Mar. 27, 2017, issued in connection with U.S. Appl. No. 15/211,835, filed Jul. 15, 2016, 30 pages.
Non-Final Office Action dated Mar. 27, 2018, issued in connection with U.S. Appl. No. 15/785,088, filed Oct. 16, 2017, 11 pages.
Non-Final Office Action dated Jul. 28, 2016, issued in connection with U.S. Appl. No. 14/884,001, filed Oct. 15, 2015, 8 pages.
Non-Final Office Action dated Nov. 28, 2017, issued in connection with U.S. Appl. No. 15/673,170, filed Aug. 9, 2017, 7 pages.
Non-Final Office Action dated Sep. 28, 2018, issued in connection with U.S. Appl. No. 15/588,186, filed May 5, 2017, 12 pages.
Non-Final Office Action dated Sep. 28, 2018, issued in connection with U.S. Appl. No. 15/595,519, filed May 15, 2017, 12 pages.
Non-Final Office Action dated Mar. 29, 2018, issued in connection with U.S. Appl. No. 15/716,313, filed Sep. 26, 2017, 16 pages.
Non-Final Office Action dated May 30, 2017, issued in connection with U.S. Appl. No. 15/478,770, filed Apr. 4, 2017, 9 pages.
Non-Final Office Action dated Nov. 6, 2018, issued in connection with U.S. Appl. No. 15/235,598, filed Aug. 12, 2016, 13 pages.
Non-Final Office Action dated Feb. 7, 2019, issued in connection with U.S. Appl. No. 15/859,311, filed Dec. 29, 2017, 9 pages.
Non-Final Office Action dated Feb. 7, 2019, issued in connection with U.S. Appl. No. 15/865,221, filed Jan. 8, 2018, 10 pages.
Non-Final Office Action dated Jan. 9, 2018, issued in connection with U.S. Appl. No. 15/698,283, filed Sep. 7, 2017, 18 pages.
Non-Final Office Action dated Jan. 9, 2018, issued in connection with U.S. Appl. No. 15/727,913, filed Oct. 9, 2017, 8 pages.
Notice of Allowance dated May 1, 2017, issued in connection with U.S. Appl. No. 14/805,140, filed Jul. 21, 2015, 13 pages.
Notice of Allowance dated Nov. 2, 2016, issued in connection with U.S. Appl. No. 14/884,001, filed Oct. 15, 2015, 8 pages.
Notice of Allowance dated Jun. 3, 2016, issued in connection with U.S. Appl. No. 14/921,799, filed Oct. 23, 2015, 8 pages.
Notice of Allowance dated Nov. 4, 2016, issued in connection with U.S. Appl. No. 14/481,514, filed Sep. 9, 2014, 10 pages.
Notice of Allowance dated Jun. 6, 2018, issued in connection with U.S. Appl. No. 15/727,913, filed Oct. 9, 2017, 5 pages.
Notice of Allowance dated Dec. 7, 2015, issued in connection with U.S. Appl. No. 14/216,325, filed Mar. 17, 2014, 7 pages.
Notice of Allowance dated Nov. 9, 2016, issued in connection with U.S. Appl. No. 14/805,340, filed Jul. 21, 2015, 13 pages.
Notice of Allowance dated Feb. 1, 2018, issued in connection with U.S. Appl. No. 15/480,265, filed Apr. 5, 2017, 8 pages.

(56) References Cited

OTHER PUBLICATIONS

Notice of Allowance dated Apr. 10, 2015, issued in connection with U.S. Appl. No. 13/536,493, filed Jun. 28, 2012, 8 pages.
Notice of Allowance dated Aug. 10, 2018, issued in connection with U.S. Appl. No. 15/785,088, filed Oct. 16, 2017, 6 pages.
Notice of Allowance dated Jul. 10, 2018, issued in connection with U.S. Appl. No. 15/673,170, filed Aug. 9, 2017, 2 pages.
Notice of Allowance dated Dec. 11, 2018, issued in connection with U.S. Appl. No. 15/909,327, filed Mar. 1, 2018, 10 pages.
Notice of Allowance dated Feb. 11, 2019, issued in connection with U.S. Appl. No. 15/588,186, filed May 5, 2017, 5 pages.
Notice of Allowance dated Jul. 11, 2017, issued in connection with U.S. Appl. No. 14/678,248, filed Apr. 3, 2015, 11 pages.
Notice of Allowance dated Mar. 11, 2015, issued in connection with U.S. Appl. No. 13/340,126, filed Dec. 29, 2011, 7 pages.
Notice of Allowance dated Apr. 21, 2016, issued in connection with U.S. Appl. No. 14/681,465, filed Apr. 8, 2015, 13 pages.
Notice of Allowance dated Dec. 12, 2016, issued in connection with U.S. Appl. No. 14/805,140, filed Jul. 21, 2015, 24 pages.
Notice of Allowance dated Dec. 12, 2017, issued in connection with U.S. Appl. No. 14/481,505, filed Sep. 9, 2014, 9 pages.
Notice of Allowance dated Sep. 12, 2016, issued in connection with U.S. Appl. No. 15/066,072, filed Mar. 10, 2016, 7 pages.
Notice of Allowance dated Sep. 12, 2017, issued in connection with U.S. Appl. No. 15/207,682, filed Jul. 12, 2016, 8 pages.
Notice of Allowance dated Feb. 13, 2017, issued in connection with U.S. Appl. No. 14/864,506, filed Sep. 24, 2015, 8 pages.
Notice of Allowance dated Nov. 13, 2017, issued in connection with U.S. Appl. No. 14/726,921, filed Jun. 1, 2015, 8 pages.
Notice of Allowance dated Aug. 31, 2018, issued in connection with U.S. Appl. No. 15/872,979, filed Jan. 16, 2018, 7 pages.
Notice of Allowance dated Aug. 31, 2018, issued in connection with U.S. Appl. No. 16/055,884, filed Aug. 6, 2018, 8 pages.
Notice of Allowance dated Apr. 4, 2017, issued in connection with U.S. Appl. No. 14/682,182, filed Apr. 9, 2015, 8 pages.
Notice of Allowance dated Feb. 4, 2019, issued in connection with U.S. Appl. No. 15/166,241, filed Aug. 26, 2016, 8 pages.
Notice of Allowance dated Feb. 4, 2019, issued in connection with U.S. Appl. No. 16/181,583, filed Nov. 6, 2018, 9 pages.
Notice of Allowance dated Oct. 4, 2018, issued in connection with U.S. Appl. No. 15/166,241, filed May 26, 2016, 7 pages.
Notice of Allowance dated Apr. 5, 2018, issued in connection with U.S. Appl. No. 15/681,640, filed Aug. 21, 2017, 8 pages.
Notice of Allowance dated Mar. 5, 2019, issued in connection with U.S. Appl. No. 16/102,499, filed Aug. 13, 2018, 8 pages.
Notice of Allowance dated May 5, 2017, issued in connection with U.S. Appl. No. 14/826,873, filed Aug. 14, 2015, 5 pages.
Notice of Allowance dated Oct. 5, 2018, issued in connection with U.S. Appl. No. 16/115,524, filed Aug. 28, 2018, 10 pages.
Notice of Allowance dated Feb. 6, 2019, issued in connection with U.S. Appl. No. 15/996,878, filed Jun. 4, 2018, 8 pages.
Notice of Allowance dated Apr. 8, 2019, issued in connection with U.S. Appl. No. 16/011,402, filed Jun. 18, 2018, 8 pages.
Notice of Allowance dated May 8, 2018, issued in connection with U.S. Appl. No. 15/650,386, filed Jul. 14, 2017, 13 pages.
Notice of Allowance dated Apr. 19, 2017, issued in connection with U.S. Appl. No. 14/481,511, filed Sep. 9, 2014, 10 pages.
Palm, Inc., "Handbook for the Palm VII Handheld," May 2000, 311 pages.
Papp Istvan et al. "Adaptive Microphone Array for Unknown Desired Speaker's Transfer Function", The Journal of the Acoustical Society of America, American Institute of Physics for the Acoustical Society of America, New York, NY vol. 122, No. 2, Jul. 19, 2007, pp. 44-49.
Pre-Brief Appeal Conference Decision mailed on Mar. 19, 2019, issued in connection with U.S. Appl. No. 15/806,126, filed Nov. 7, 2017, 2 pages.
Preinterview First Office Action dated Oct. 6, 2016, issued in connection with U.S. Appl. No. 14/726,921, filed Jun. 1, 2015, 6 pages.
Preinterview First Office Action dated Jul. 12, 2017, issued in connection with U.S. Appl. No. 14/793,205, filed Jul. 7, 2015, 5 pages.
Preinterview First Office Action dated May 17, 2016, issued in connection with U.S. Appl. No. 14/481,505, filed Sep. 9, 2014, 7 pages.
Preinterview First Office Action dated May 25, 2016, issued in connection with U.S. Appl. No. 14/481,514, filed Sep. 9, 2014, 7 pages.
Presentations at WinHEC 2000, May 2000, 138 pages.
PRISMIQ, Inc., "PRISMIQ Media Player User Guide," 2003, 44 pages.
Ross, Alex, "Wizards of Sound: Retouching acoustics, from the restaurant to the concert hall," The New Yorker, Feb. 23, 2015. Web. Feb. 26, 2015, 9 pages.
Supplemental Notice of Allowability dated Oct. 27, 2016, issued in connection with U.S. Appl. No. 14/481,511, filed Sep. 9, 2014, 6 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Wikipedia, Server(Computing) https://web.archive.org/web/20160703173710/https://en.wikipedia.org/wiki/Server_(computing), published Jul. 3, 2016, 7 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Japanese Patent Office, Office Action dated May 8, 2018, issued in connection with Japanese Application No. 2017-513241, 8 pages.
Japanese Patent Office, Office Action with English Summary dated Jul. 18, 2017, issued in connection with Japanese Patent Application No. 2017-513171, 4 pages.
Jo et al., "Synchronized One-to-many Media Streaming with Adaptive Playout Control," Proceedings of SPIE, 2002, pp. 71-82, vol. 4861.
John Mark and Paul Hufnagel "What is 1451.4, what are its uses and how does it work?" IEEE Standards Association, The IEEE 1451.4 Standard for Smart Transducers, 14pages.
Jones, Stephen, "Dell Digital Audio Receiver: Digital upgrade for your analog stereo," Analog Stereo, Jun. 24, 2000 retrieved Jun. 18, 2014, 2 pages.
"AuEQ for the iPhone," Mar. 25, 2015, retrieved from the internet: URL:https://web.archive.org/web20150325152629/http://www.hotto.de/mobileapps/iphoneaueq.html [retrieved on Jun. 24, 2016], 6 pages.
Louderback, Jim, "Affordable Audio Receiver Furnishes Homes With MP3," TechTV Vault. Jun. 28, 2000 retrieved Jul. 10, 2014, 2 pages.
Microsoft Corporation, "Using Microsoft Outlook 2003," Cambridge College, 2003.
Motorola, "Simplefi, Wireless Digital Audio Receiver, Installation and User Guide," Dec. 31, 2001, 111 pages.
Mulcahy, John, "Room EQ Wizard: Room Acoustics Software," REW, 2014, retrieved Oct. 10, 2014, 4 pages.
Non-Final Action dated Jan. 29, 2016, issued in connection with U.S. Appl. No. 14/481,511, filed Sep. 9, 2014, 10 pages.
Non-Final Office Action dated Mar. 1, 2017, issued in connection with U.S. Appl. No. 15/344,069, filed Nov. 4, 2016, 20 pages.
Non-Final Office Action dated Nov. 1, 2017, issued in connection with U.S. Appl. No. 15/235,598, filed Aug. 12, 2016, 15 pages.
Non-Final Office Action dated Jun. 2, 2014, issued in connection with U.S. Appl. No. 13/340,126, filed Dec. 29, 2011, 14 pages.
Non-Final Office Action dated Jun. 2, 2017, issued in connection with U.S. Appl. No. 15/229,693, filed Aug. 5, 2016, 18 pages.
Non-Final Office Action dated Nov. 2, 2017, issued in connection with U.S. Appl. No. 15/166,241, filed May 26, 2016, 12 pages.

(56) References Cited

OTHER PUBLICATIONS

Non-Final Office Action dated Oct. 2, 2017, issued in connection with U.S. Appl. No. 15/005,853, filed Jan. 25, 2016, 8 pages.
Non-Final Office Action dated Feb. 3, 2016, issued in connection with U.S. Appl. No. 14/481,522, filed Sep. 9, 2014, 12 pages.
Non-Final Office Action dated Jul. 3, 2018, issued in connection with U.S. Appl. No. 15/909,327, filed Mar. 1, 2018, 30 pages.
Non-Final Office Action dated Jan. 4, 2017, issued in connection with U.S. Appl. No. 15/207,682, filed Jul. 12, 2016, 6 pages.
Non-Final Office Action dated Nov. 4, 2016, issued in connection with U.S. Appl. No. 14/826,856, filed Aug. 14, 2015, 10 pages.
Non-Final Office Action dated Jul. 5, 2017, issued in connection with U.S. Appl. No. 14/481,522, filed Sep. 9, 2014, 8 pages.
Non-Final Office Action dated Jul. 6, 2016, issued in connection with U.S. Appl. No. 15/070,160, filed Mar. 15, 2016, 6 pages.
Non-Final Office Action dated Oct. 6, 2016, issued in connection with U.S. Appl. No. 14/678,263, filed Apr. 3, 2015, 30 pages.
Non-Final Office Action dated Jun. 6, 2018, issued in connection with U.S. Appl. No. 15/005,496, filed Jan. 25, 2016, 16 pages.
Non-Final Office Action dated Dec. 7, 2015, issued in connection with U.S. Appl. No. 14/921,762, filed Oct. 23, 2015, 5 pages.
Non-Final Office Action dated Jul. 7, 2016, issued in connection with U.S. Appl. No. 15/066,049, filed Mar. 10, 2016, 6 pages.
Non-Final Office Action dated Mar. 7, 2017, issued in connection with U.S. Appl. No. 14/481,514, filed Sep. 9, 2014, 24 pages.
Non-Final Office Action dated Sep. 7, 2016, issued in connection with U.S. Appl. No. 14/826,873, filed Aug. 14, 2015, 12 pages.
Non-Final Office Action dated Jul. 8, 2016, issued in connection with U.S. Appl. No. 15/066,072, filed Mar. 10, 2016, 6 pages.
Non-Final Office Action dated Dec. 9, 2016, issued in connection with U.S. Appl. No. 14/678,248, filed Apr. 3, 2015, 22 pages.
Non-Final Office Action dated Apr. 10, 2018, issued in connection with U.S. Appl. No. 15/909,529, filed Mar. 1, 2018, 8 pages.
Non-Final Office Action dated Mar. 10, 2017, issued in connection with U.S. Appl. No. 14/997,868, filed Jan. 18, 2016, 10 pages.
Non-Final Office Action dated Sep. 10, 2018, issued in connection with U.S. Appl. No. 15/056,553, filed Feb. 29, 2016, 8 pages.
Non-Final Office Action dated Apr. 11, 2017, issued in connection with U.S. Appl. No. 15/088,994, filed Apr. 1, 2016, 13 pages.
Non-Final Office Action dated Apr. 11, 2017, issued in connection with U.S. Appl. No. 15/089,004, filed Apr. 1, 2016, 9 pages.
Non-Final Office Action dated Oct. 11, 2017, issued in connection with U.S. Appl. No. 15/480,265, filed Apr. 5, 2017, 8 pages.
Non-Final Office Action dated Oct. 11, 2018, issued in connection with U.S. Appl. No. 15/856,791, filed Dec. 28, 2017, 13 pages.
Non-Final Office Action dated Sep. 12, 2016, issued in connection with U.S. Appl. No. 14/811,587, filed Jul. 28, 2015, 24 pages.
Non-Final Office Action dated Jul. 13, 2016, issued in connection with U.S. Appl. No. 14/940,779, filed Nov. 13, 2015, 16 pages.
Non-Final Office Action dated Dec. 14, 2016, issued in connection with U.S. Appl. No. 14/481,505, filed Sep. 9, 2014, 19 pages.
Non-Final Office Action dated Mar. 14, 2017, issued in connection with U.S. Appl. No. 15/096,827, filed Apr. 12, 2016, 12 pages.
Non-Final Office Action dated Oct. 14, 2015, issued in connection with U.S. Appl. No. 14/216,325, filed Mar. 17, 2014, 7 pages.
Non-Final Office Action dated May 15, 2018, issued in connection with U.S. Appl. No. 15/806,126, filed Nov. 7, 2017, 17 pages.
Non-Final Office Action dated Jun. 16, 2017, issued in connection with U.S. Appl. No. 15/005,496, filed Jan. 25, 2016, 15 pages.
Non-Final Office Action dated Nov. 16, 2018, issued in connection with U.S. Appl. No. 15/996,878, filed Jun. 4, 2018, 8 pages.
Non-Final Office Action dated Dec. 18, 2018, issued in connection with U.S. Appl. No. 16/011,402, filed Jun. 18, 2018, 10 pages.
Non-Final Office Action dated Feb. 18, 2016, issued in connection with U.S. Appl. No. 14/644,136, filed Mar. 10, 2015, 10 pages.
Non-Final Office Action dated Sep. 19, 2017, issued in connection with U.S. Appl. No. 15/056,553, filed Feb. 29, 2016, 7 pages.
Non-Final Office Action dated Apr. 2, 2018, issued in connection with U.S. Appl. No. 15/872,979, filed Jan. 16, 2018, 6 pages.
Japanese Patent Office, Office Action dated Jun. 12, 2018, issued in connection with Japanese Application No. 2018-502729, 4 pages.
Japanese Patent Office, Office Action dated Aug. 21, 2018, issued in connection with Japanese Application No. 2018-514418, 7 pages.
Japanese Patent Office, Office Action dated Jul. 24, 2018, issued in connection with Japanese Application No. 2018-514419, 5 pages.
Advisory Action dated Jul. 10, 2018, issued in connection with U.S. Appl. No. 15/056,553, filed Feb. 29, 2016, 3 pages.
Advisory Action dated Jul. 12, 2018, issued in connection with U.S. Appl. No. 15/166,241, filed May 26, 2016, 3 pages.
Advisory Action dated Jul. 12, 2018, issued in connection with U.S. Appl. No. 15/235,598, filed Aug. 12, 2016, 3 pages.
Advisory Action dated Aug. 16, 2017, issued in connection with U.S. Appl. No. 14/481,505, filed Sep. 9, 2014, 3 pages.
Advisory Action dated Jun. 19, 2018, issued in connection with U.S. Appl. No. 15/229,693, filed Aug. 5, 2016, 3 pages.
Advisory Action dated Sep. 19, 2017, issued in connection with U.S. Appl. No. 14/726,921, filed Jun. 1, 2015, 3 pages.
Advisory Action dated Feb. 7, 2019, issued in connection with U.S. Appl. No. 15/806,126, filed Nov. 7, 2017, 3 pages.
An Overview of IEEE 1451.4 Transducer Electronic Data Sheets (TEDS) National Instruments, 19 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Burger, Dennis, "Automated Room Correction Explained," hometheater-review.com, Nov. 18, 2013, Retrieved Oct. 10, 2014, 3 pages.
Chinese Patent Office, First Office Action dated Aug. 11, 2017, issued in connection with Chinese Patent Application No. 201580013837.2, 8 pages.
Chinese Patent Office, First Office Action dated Nov. 20, 2018, issued in connection with Chinese Application No. 201580047998.3, 21 pages.
Chinese Patent Office, First Office Action dated Sep. 25, 2017, issued in connection with Chinese Patent Application No. 201580013894.0, 9 pages.
Chinese Patent Office, First Office Action dated Nov. 5, 2018, issued in connection with Chinese Application No. 201680044080.8, 5 pages.
Chinese Patent Office, Second Office Action dated Jan. 11, 2019, issued in connection with Chinese Application No. 201680044080.8, 4 pages.
Chinese Patent Office, Second Office Action dated Feb. 3, 2019, issued in connection with Chinese Application No. 201580048594.6, 11 pages.
Chinese Patent Office, Second Office Action with Translation dated Jan. 9, 2018, issued in connection with Chinese Patent Application No. 201580013837.2, 10 pages.
Chinese Patent Office, Third Office Action dated Apr. 11, 2019, issued in connection with Chinese Application No. 201580048594.6, 4 pages.
"Constellation Acoustic System: a revolutionary breakthrough in acoustical design," Meyer Sound Laboratories, Inc. 2012, 32 pages.
"Constellation Microphones," Meyer Sound Laboratories, Inc. 2013, 2 pages.
Corrected Notice of Allowability dated Jan. 19, 2017, issued in connection with U.S. Appl. No. 14/826,873, filed Aug. 14, 2015, 11 pages.
Daddy, B., "Calibrating Your Audio with a Sound Pressure Level (SPL) Meter," Blue-ray.com, Feb. 22, 2008 Retrieved Oct. 10, 2014, 15 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Examination Report dated May 11, 2018, issued in connection with European Application No. 16748186.0, 6 pages.

(56) References Cited

OTHER PUBLICATIONS

European Patent Office, European Extended Search Report dated Oct. 16, 2018, issued in connection with European Application No. 17185193.4, 6 pages.
European Patent Office, European Extended Search Report dated Jun. 26, 2018, issued in connection with European Application No. 18171206.8, 9 pages.
European Patent Office, European Extended Search Report dated Sep. 8, 2017, issued in connection with European Application No. 17000460.0, 8 pages.
European Patent Office, European Office Action dated Dec. 11, 2018, issued in connection with European Application No. 15778787.0, 6 pages.
European Patent Office, European Office Action dated Nov. 2, 2018, issued in connection with European Application No. 18171206.8, 6 pages.
European Patent Office, European Office Action dated Feb. 4, 2019, issued in connection with European Application No. 17703876.7, 9 pages.
European Patent Office, European Search Report dated Jan. 18, 2018, issued in connection with European Patent Application No. 17185193.4, 9 pages.
European Patent Office, Extended European Search Report dated Jan. 5, 2017, issued in connection with European Patent Application No. 15765555.6, 8 pages.
European Patent Office, Extended Search Report dated Jan. 25, 2017, issued in connection with European Application No. 15765548.1, 7 pages.
European Patent Office, Extended Search Report dated Apr. 26, 2017, issued in connection with European Application No. 15765548.1, 10 pages.
European Patent Office, Office Action dated Nov. 12, 2018, issued in connection with European Application No. 17000460.0, 6 pages.
European Patent Office, Office Action dated Jun. 13, 2017, issued in connection with European patent application No. 17000484.0, 10 pages.
European Patent Office, Office Action dated Dec. 15, 2016, issued in connection with European Application No. 15766998.7, 7 pages.
European Patent Office, Summons to Attend Oral Proceedings mailed on Nov. 15, 2018, issued in connection with European Application No. 16748186.0, 57 pages.
Ex Parte Quayle Office Action dated Apr. 15, 2019, issued in connection with U.S. Appl. No. 15/235,598, filed Aug. 12, 2016, 7 pages.
Final Office Action dated Apr. 3, 2017, issued in connection with U.S. Appl. No. 14/678,248, filed Apr. 3, 2015, 22 pages.
Final Office Action dated Jul. 13, 2017, issued in connection with U.S. Appl. No. 14/726,921, filed Jun. 1, 2015, 10 pages.
Final Office Action dated Jun. 13, 2017, issued in connection with U.S. Appl. No. 14/481,505, filed Sep. 9, 2014, 22 pages.
Final Office Action dated Feb. 14, 2019, issued in connection with U.S. Appl. No. 15/005,496, filed Jan. 25, 2016, 16 pages.
Final Office Action dated Feb. 14, 2019, issued in connection with U.S. Appl. No. 15/217,399, filed Jul. 22, 2016, 37 pages.
Notice of Allowance dated Mar. 14, 2019, issued in connection with U.S. Appl. No. 15/343,996, filed Nov. 4, 2016, 8 pages.
Notice of Allowance dated Jan. 15, 2019, issued in connection with U.S. Appl. No. 16/115,524, filed Aug. 28, 2018, 8 pages.
Notice of Allowance dated Jun. 15, 2017, issued in connection with U.S. Appl. No. 15/096,827, filed Apr. 12, 2016, 5 pages.
Notice of Allowance dated Mar. 15, 2017, issued in connection with U.S. Appl. No. 14/826,856, filed Aug. 14, 2015, 7 pages.
Notice of Allowance dated Oct. 15, 2018, issued in connection with U.S. Appl. No. 15/716,313, filed Sep. 26, 2017, 10 pages.
Notice of Allowance dated Jun. 16, 2017, issued in connection with U.S. Appl. No. 14/884,001, filed Oct. 15, 2015, 8 pages.
Notice of Allowance dated Oct. 16, 2017, issued in connection with U.S. Appl. No. 15/478,770, filed Apr. 4, 2017, 10 pages.
Notice of Allowance dated Sep. 16, 2016, issued in connection with U.S. Appl. No. 15/066,049, filed Mar. 10, 2016, 7 pages.
Notice of Allowance dated Dec. 17, 2018, issued in connection with U.S. Appl. No. 16/055,884, filed Aug. 6, 2018, 5 pages.
Notice of Allowance dated May 17, 2017, issued in connection with U.S. Appl. No. 15/339,260, filed Oct. 31, 2016, 7 pages.
Notice of Allowance dated Mar. 18, 2019, issued in connection with U.S. Appl. No. 16/056,862, filed Aug. 7, 2018, 12 pages.
Notice of Allowance dated Aug. 19, 2016, issued in connection with U.S. Appl. No. 14/644,136, filed Mar. 10, 2015, 12 pages.
Notice of Allowance dated Jul. 19, 2017, issued in connection with U.S. Appl. No. 14/793,190, filed Jul. 7, 2015, 5 pages.
Notice of Allowance dated Sep. 19, 2017, issued in connection with U.S. Appl. No. 14/793,205, filed Jul. 7, 2015, 16 pages.
Notice of Allowance dated Sep. 19, 2018, issued in connection with U.S. Appl. No. 14/864,393, filed Sep. 24, 2015, 10 pages.
Notice of Allowance dated Apr. 20, 2017, issued in connection with U.S. Appl. No. 14/940,779, filed Nov. 13, 2015, 11 pages.
Notice of Allowance dated Nov. 20, 2017, issued in connection with U.S. Appl. No. 15/298,115, filed Oct. 19, 2016, 10 pages.
Notice of Allowance dated Sep. 20, 2017, issued in connection with U.S. Appl. No. 14/481,514, filed Sep. 9, 2014, 10 pages.
Notice of Allowance dated Dec. 21, 2016, issued in connection with U.S. Appl. No. 14/682,182, filed Apr. 9, 2015, 8 pages.
Notice of Allowance dated Feb. 21, 2018, issued in connection with U.S. Appl. No. 15/005,853, filed Jan. 25, 2016, 5 pages.
Notice of Allowance dated Jul. 21, 2017, issued in connection with U.S. Appl. No. 15/211,835, filed Jul. 15, 2016, 10 pages.
Notice of Allowance dated Jun. 22, 2017, issued in connection with U.S. Appl. No. 14/644,136, filed Mar. 10, 2015, 12 pages.
Notice of Allowance dated Aug. 23, 2018, issued in connection with U.S. Appl. No. 15/909,529, filed Mar. 1, 2018, 8 pages.
Notice of Allowance dated Jun. 23, 2016, issued in connection with U.S. Appl. No. 14/921,781, filed Oct. 23, 2015, 8 pages.
Notice of Allowance dated May 23, 2018, issued in connection with U.S. Appl. No. 15/698,283, filed Sep. 7, 2017, 8 pages.
Notice of Allowance dated Oct. 23, 2017, issued in connection with U.S. Appl. No. 14/481,522, filed Sep. 9, 2014, 16 pages.
Notice of Allowance dated Sep. 23, 2016, issued in connection with U.S. Appl. No. 15/070,160, filed Mar. 15, 2016, 7 pages.
Notice of Allowance dated May 24, 2017, issued in connection with U.S. Appl. No. 14/997,868, filed Jan. 18, 2016, 5 pages.
Notice of Allowance dated Nov. 24, 2017, issued in connection with U.S. Appl. No. 15/681,640, filed Aug. 21, 2017, 8 pages.
Notice of Allowance dated Apr. 25, 2017, issued in connection with U.S. Appl. No. 14/696,014, filed Apr. 24, 2015, 7 pages.
Notice of Allowance dated Apr. 25, 2017, issued in connection with U.S. Appl. No. 15/207,682, filed Jul. 12, 2016, 7 pages.
Notice of Allowance dated Oct. 25, 2016, issued in connection with U.S. Appl. No. 14/826,873, filed Aug. 14, 2015, 5 pages.
Notice of Allowance dated Feb. 26, 2016, issued in connection with U.S. Appl. No. 14/921,762, filed Oct. 23, 2015, 7 pages.
Notice of Allowance dated Jul. 26, 2016, issued in connection with U.S. Appl. No. 14/481,511, filed Sep. 9, 2014, 12 pages.
Notice of Allowance dated Oct. 26, 2016, issued in connection with U.S. Appl. No. 14/811,587, filed Jul. 28, 2015, 11 pages.
Notice of Allowance dated Feb. 27, 2017, issued in connection with U.S. Appl. No. 14/805,340, filed Jul. 21, 2015, 9 pages.
Notice of Allowance dated Jul. 27, 2017, issued in connection with U.S. Appl. No. 15/005,853, filed Jan. 25, 2016, 5 pages.
Notice of Allowance dated Jun. 27, 2017, issued in connection with U.S. Appl. No. 15/344,069, filed Nov. 4, 2016, 8 pages.
Notice of Allowance dated Aug. 28, 2017, issued in connection with U.S. Appl. No. 15/089,004, filed Apr. 1, 2016, 5 pages.
Notice of Allowance dated Jul. 28, 2017, issued in connection with U.S. Appl. No. 14/678,263, filed Apr. 3, 2015, 10 pages.
Notice of Allowance dated Jul. 28, 2017, issued in connection with U.S. Appl. No. 15/211,822, filed Jul. 15, 2016, 9 pages.
Notice of Allowance dated Mar. 28, 2018, issued in connection with U.S. Appl. No. 15/673,170, filed Aug. 9, 2017, 5 pages.
Notice of Allowance dated Aug. 29, 2018, issued in connection with U.S. Appl. No. 15/357,520, filed Nov. 21, 2016, 11 pages.
Notice of Allowance dated Aug. 29, 2018, issued in connection with U.S. Appl. No. 15/718,556, filed Sep. 28, 2017, 8 pages.

US 10,750,303 B2

Page 9

(56) References Cited

OTHER PUBLICATIONS

Notice of Allowance dated Dec. 29, 2017, issued in connection with U.S. Appl. No. 14/793,205, filed Jul. 7, 2015, 5 pages.
Notice of Allowance dated Jul. 29, 2016, issued in connection with U.S. Appl. No. 14/481,522, filed Sep. 9, 2014, 11 pages.
Notice of Allowance dated Oct. 29, 2015, issued in connection with U.S. Appl. No. 14/216,306, filed Mar. 17, 2014, 9 pages.
Notice of Allowance dated Aug. 30, 2017, issued in connection with U.S. Appl. No. 15/088,994, filed Apr. 1, 2016, 10 pages.
Notice of Allowance dated Dec. 30, 2016, issued in connection with U.S. Appl. No. 14/696,014, filed Apr. 24, 2015, 13 pages.
Notice of Allowance dated Jan. 30, 2017, issued in connection with U.S. Appl. No. 15/339,260, filed Oct. 31, 2016, 8 pages.
Final Office Action dated Oct. 14, 2016, issued in connection with U.S. Appl. No. 14/682,182, filed Apr. 9, 2015, 16 pages.
Final Office Action dated Oct. 17, 2016, issued in connection with U.S. Appl. No. 14/678,248, filed Apr. 3, 2015, 22 pages.
Final Office Action dated Apr. 18, 2017, issued in connection with U.S. Appl. No. 14/678,263, filed Apr. 3, 2015, 16 pages.
Final Office Action dated Apr. 18, 2018, issued in connection with U.S. Appl. No. 15/056,553, filed Feb. 29, 2016, 8 pages.
Final Office Action dated Dec. 18, 2014, issued in connection with U.S. Appl. No. 13/340,126, filed Dec. 29, 2011, 12 pages.
Final Office Action dated Jan. 19, 2017, issued in connection with U.S. Appl. No. 14/940,779, filed Nov. 13, 2015, 15 pages.
Final Office Action dated Apr. 2, 2018, issued in connection with U.S. Appl. No. 15/166,241, filed May 26, 2016, 14 pages.
Final Office Action dated Oct. 21, 2016, issued in connection with U.S. Appl. No. 14/696,014, filed Apr. 24, 2015, 13 pages.
Final Office Action dated Jan. 25, 2018, issued in connection with U.S. Appl. No. 15/005,496, filed Jan. 25, 2016, 17 pages.
Final Office Action dated Mar. 25, 2019, issued in connection with U.S. Appl. No. 15/856,791, filed Dec. 28, 2017, 11 pages.
Final Office Action dated Apr. 3, 2018, issued in connection with U.S. Appl. No. 15/235,598, filed Aug. 12, 2016, 12 pages.
Final Office Action dated Feb. 5, 2018, issued in connection with U.S. Appl. No. 15/229,693, filed Aug. 5, 2016, 21 pages.
Final Office Action dated Mar. 5, 2019, issued in connection with U.S. Appl. No. 15/056,553, filed Feb. 29, 2016, 9 pages.
Final Office Action dated Dec. 6, 2018, issued in connection with U.S. Appl. No. 15/806,126, filed Nov. 7, 2017, 18 pages.
Final Office Action dated Apr. 9, 2018, issued in connection with U.S. Appl. No. 15/229,693, filed Aug. 5, 2016, 33 pages.
First Action Interview Office Action dated Mar. 3, 2017, issued in connection with U.S. Appl. No. 14/726,921, filed Jun. 1, 2015, 9 pages.
First Action Interview Office Action dated Jul. 12, 2016, issued in connection with U.S. Appl. No. 14/481,514, filed Sep. 9, 2014, 10 pages.
First Action Interview Office Action dated Jun. 30, 2016, issued in connection with U.S. Appl. No. 14/481,505, filed Sep. 9, 2014, 9 pages.
First Action Interview Pilot Program Pre-Interview Communication dated Apr. 5, 2017, issued in connection with U.S. Appl. No. 14/793,190, filed Jul. 7, 2015, 4 pages.
First Action Interview Pilot Program Pre-Interview Communication dated Oct. 7, 2015, issued in connection with U.S. Appl. No. 14/216,306, filed Mar. 17, 2014, 5 pages.
First Action Interview Pilot Program Pre-Interview Communication dated Feb. 16, 2016, issued in connection with U.S. Appl. No. 14/681,465, filed Apr. 8, 2015, 5 pages.
Gonzalez et al., "Simultaneous Measurement of Multichannel Acoustic Systems," J. Audio Eng. Soc., 2004, pp. 26-42, vol. 52, No. 1/2.
International Bureau, International Preliminary Report on Patentability, dated Sep. 24, 2015, issued in connection with International Application No. PCT/US2014/030560, filed on Mar. 17, 2014, 7 pages.
International Bureau, International Preliminary Report on Patentability dated Sep. 29, 2016, issued in connection with International Application No. PCT/US2015/020993, filed on Mar. 17, 2015, 8 pages.
International Bureau, International Preliminary Report on Patentability dated Sep. 29, 2016, issued in connection with International Application No. PCT/US2015/021000, filed on Mar. 17, 2015, 9 pages.
International Bureau, International Preliminary Report on Patentability, dated Aug. 9, 2018, issued in connection with International Application No. PCT/US2017/014596, filed on Jan. 23, 2017, 11 pages.
International Searching Authority, International Preliminary Report on Patentability dated Mar. 23, 2017, issued in connection with International Patent Application No. PCT/US2015/048944, filed on Sep. 8, 2015, 8 pages.
International Searching Authority, International Preliminary Report on Patentability dated Oct. 24, 2017, issued in connection with International Application No. PCT/US2016/028994 filed on Apr. 22, 2016, 7 pages.
International Searching Authority, International Search Report and Written Opinion dated Jul. 4, 2016, issued in connection with International Application No. PCT/US2016/028994, filed on Apr. 22, 2016, 12 pages.
International Searching Authority, International Search Report and Written Opinion dated Jul. 5, 2016, issued in connection with International Application No. PCT/US2016/028997, filed on Apr. 22, 2016, 13 pages.
International Searching Authority, International Search Report and Written Opinion dated Jun. 5, 2015, issued in connection with International Application No. PCT/US2015/021000, filed on Mar. 17, 2015, 12 pages.
International Searching Authority, International Search Report and Written Opinion dated Oct. 12, 2016, issued in connection with International Application No. PCT/US2016/041179 filed on Jul. 6, 2016, 9 pages.
International Searching Authority, International Search Report and Written Opinion dated Jun. 16, 2015, issued in connection with International Application No. PCT/US2015/020993, filed on Mar. 17, 2015, 11 pages.
International Searching Authority, International Search Report and Written Opinion dated Nov. 18, 2015, issued in connection with International Application No. PCT/US2015/048954, filed on Sep. 8, 2015, 11 pages.
International Searching Authority, International Search Report and Written Opinion dated Oct. 18, 2016, issued in connection with International Application No. PCT/US2016/043116, filed on Jul. 20, 2016, 14 pages.
International Searching Authority, International Search Report and Written Opinion dated Oct. 18, 2016, issued in connection with International Application No. PCT/US2016/043840, filed on Jul. 25, 2016, 14 pages.
International Searching Authority, International Search Report and Written Opinion dated Nov. 23, 2015, issued in connection with International Application No. PCT/US2015/048942, filed on Sep. 8, 2015, 14 pages.
International Searching Authority, International Search Report and Written Opinion dated Nov. 23, 2015, issued in connection with International Application No. PCT/US2015/048944, filed on Sep. 8, 2015, 12 pages.
International Searching Authority, International Search Report and Written Opinion dated Nov. 23, 2016, issued in connection with International Patent Application No. PCT/US2016/052266, filed on Sep. 16, 2016, 11 pages.
International Searching Authority, International Search Report and Written Opinion dated Jan. 24, 2017, issued in connection with International Application No. PCT/US2016/052264, filed on Sep. 16, 2016, 17 pages.
International Searching Authority, International Search Report and Written Opinion dated Oct. 25, 2016, issued in connection with International Application No. PCT/US2016/043109, filed on Jul. 20, 2016, 12 pages.

(56) References Cited

OTHER PUBLICATIONS

International Searching Authority, International Search Report and Written Opinion dated Sep. 25, 2017, issued in connection with International Application No. PCT/US2017/042191, filed on Jul. 14, 2017, 16 pages.
International Searching Authority, International Search Report and Written Opinion dated Aug. 3, 2017, in connection with International Application No. PCT/US2017014596, 20 pages.
Japanese Patent Office, English Translation of Office Action dated May 8, 2018, issued in connection with Japanese Application No. 2017-513241, 4 pages.
Japanese Patent Office, Japanese Office Action dated Oct. 3, 2017, issued in connection with Japanese Application No. 2017-501082, 7 pages.
Japanese Patent Office, Non-Final Office Action with Translation dated Apr. 25, 2017, issued in connection with Japanese Patent Application No. 2016-568888, 7 pages.
Japanese Patent Office, Non-Final Office Action with Translation dated Oct. 3, 2017, issued in connection with Japanese Patent Application No. 2017-501082, 3 pages.
Advisory Action dated Jul. 1, 2019, issued in connection with U.S. Appl. No. 15/229,693, filed Aug. 5, 2016, 2 pages.
Advisory Action dated Apr. 30, 2019, issued in connection with U.S. Appl. No. 15/005,496, filed Jan. 25, 2016, 3 pages.
Chinese Patent Office, First Office Action and Translation dated Jun. 19, 2019, issued in connection with Chinese Application No. 201680054189.X, 11 pages.
Chinese Patent Office, Second Office Action and Translation dated Aug. 26, 2019, issued in connection with Chinese Application No. 201580047998.3, 25 pages.
European Patent Office, European Extended Search Report dated Jul. 17, 2019, issued in connection with European Application No. 19167365.6, 7 pages.
European Patent Office, European Office Action dated Jul. 11, 2019, issued in connection with European Application No. 15778787.0, 10 pages.
European Patent Office, European Office Action dated May 9, 2019, issued in connection with European Application No. 18171206.8, 7 pages.
European Patent Office, European Partial Search Report dated Jun. 7, 2019, issued in connection with European Application No. 19161826.3, 17 pages.
European Patent Office, European Search Report dated Jun. 13, 2019, issued in connection with European Application No. 18204450.3, 11 pages.
European Patent Office, European Search Report dated Sep. 13, 2019, issued in connection with European Application No. 19161826.3, 13 pages.
European Patent Office, European Search Report dated Jul. 9, 2019, issued in connection with European Application No. 19168800.1, 12 pages.
European Patent Office, Summons to Attend Oral Proceedings mailed on Sep. 24, 2019, issued in connection with European Application No. 17000460.0, 5 pages.
Japanese Patent Office, Office Action dated May 14, 2019, issued in connection with Japanese Patent Application No. 2018-500529, 8 pages.
Japanese Patent Office, Office Action dated Jun. 4, 2019, issued in connection with Japanese Patent Application No. 2018-112810, 4 pages.
Japanese Patent Office, Translation of Office Action dated May 14, 2019, issued in connection with Japanese Patent Application No. 2018-500529, 5 pages.
Non-Final Office Action dated Sep. 4, 2019, issued in connection with U.S. Appl. No. 16/213,552, filed Dec. 7, 2018, 16 pages.
Non-Final Office Action dated May 14, 2019, issued in connection with U.S. Appl. No. 15/955,545, filed Apr. 17, 2018, 15 pages.
Non-Final Office Action dated Jun. 18, 2019, issued in connection with U.S. Appl. No. 15/005,496, filed Jan. 25, 2016, 15 pages.
Non-Final Office Action dated May 24, 2019, issued in connection with U.S. Appl. No. 16/401,981, filed May 2, 2019, 14 pages.
Non-Final Office Action dated Aug. 30, 2019, issued in connection with U.S. Appl. No. 16/115,525, filed Aug. 28, 2018, 13 pages.
Non-Final Office Action dated May 31, 2019, issued in connection with U.S. Appl. No. 16/185,906, filed Nov. 9, 2018, 7 pages.
Notice of Allowance dated Aug. 12, 2019, issued in connection with U.S. Appl. No. 16/416,648, filed May 20, 2019, 7 pages.
Notice of Allowance dated May 15, 2019, issued in connection with U.S. Appl. No. 16/113,032, filed Aug. 27, 2018, 9 pages.
Notice of Allowance dated May 16, 2019, issued in connection with U.S. Appl. No. 16/181,213, filed Nov. 5, 2018, 10 pages.
Notice of Allowance dated Jun. 21, 2019, issued in connection with U.S. Appl. No. 15/235,598, filed Aug. 12, 2016, 11 pages.
Notice of Allowance dated Jul. 24, 2019, issued in connection with U.S. Appl. No. 15/229,693, filed Aug. 5, 2016, 13 pages.
Notice of Allowance dated Apr. 25, 2019, issued in connection with U.S. Appl. No. 15/806,126, filed Nov. 7, 2017, 8 pages.
Notice of Allowance dated Aug. 29, 2019, issued in connection with U.S. Appl. No. 16/185,906, filed Nov. 9, 2018, 8 pages.
Notice of Allowance dated May 3, 2019, issued in connection with U.S. Appl. No. 15/217,399, filed Jul. 22, 2016, 7 pages.
Notice of Allowance dated May 3, 2019, issued in connection with U.S. Appl. No. 16/181,583, filed Nov. 6, 2018, 7 pages.
Notice of Allowance dated Jun. 5, 2019, issued in connection with U.S. Appl. No. 15/859,311, filed Dec. 29, 2017, 8 pages.
Notice of Allowance dated Jun. 5, 2019, issued in connection with U.S. Appl. No. 15/865,221, filed Jan. 8, 2018, 8 pages.
Notice of Allowance dated Jul. 8, 2019, issued in connection with U.S. Appl. No. 15/856,791, filed Dec. 28, 2017, 5 pages.
Notice of Allowance dated May 9, 2019, issued in connection with U.S. Appl. No. 15/996,878, filed Jun. 4, 2018, 7 pages.

\* cited by examiner

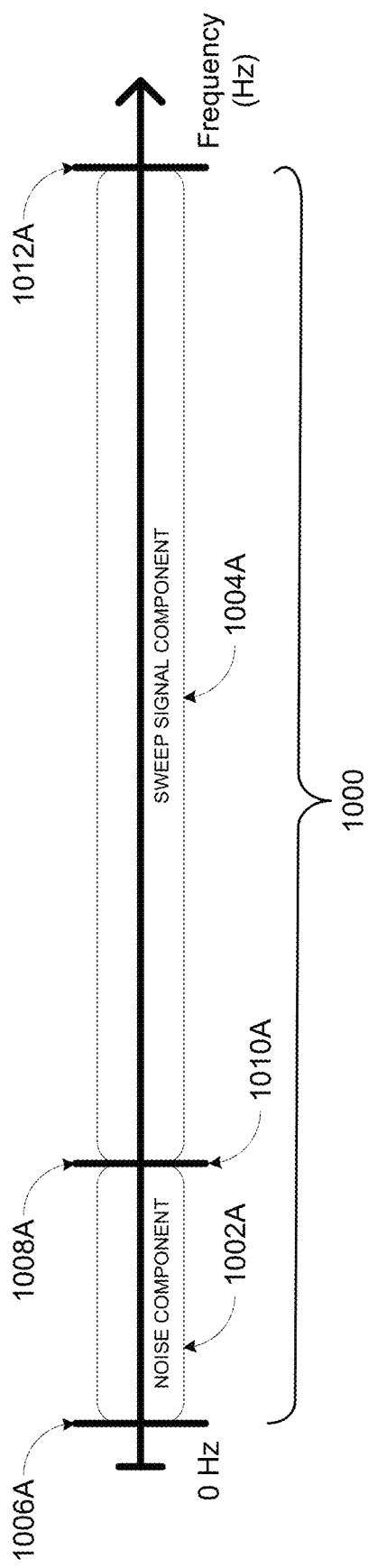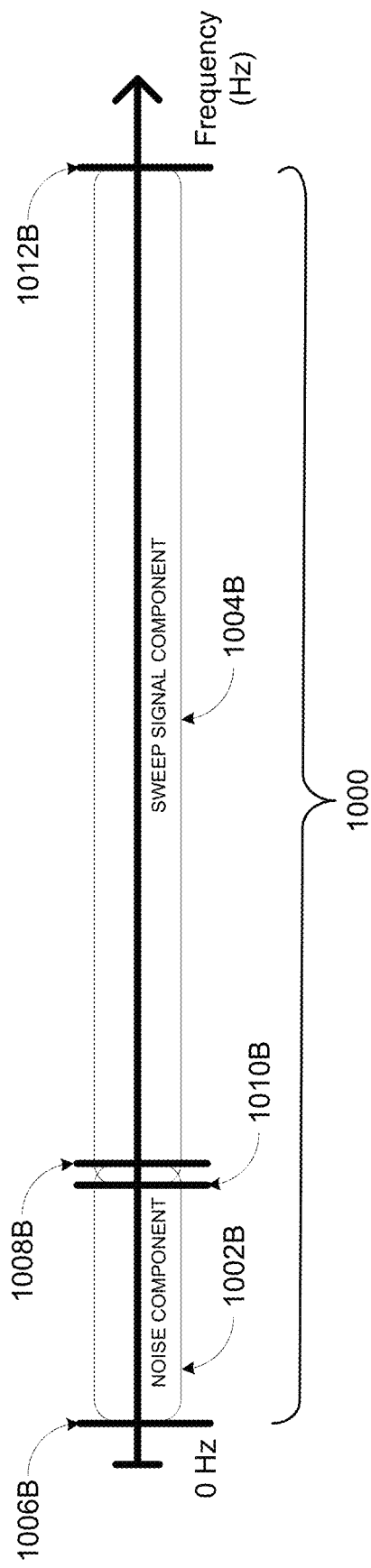

SPATIAL AUDIO CORRECTION

CROSS-REFERENCE TO RELATED APPLICATIONS

This application claims priority under 35 U.S.C. § 120 to, and is a continuation of, U.S. non-provisional patent application Ser. No. 15/785,088, filed on Oct. 16, 2017, entitled "Spatial Audio Correction," which is incorporated herein by reference in its entirety.

U.S. non-provisional patent application Ser. No. 15/785,088 claims priority under 35 U.S.C. § 120 to, and is a continuation of, U.S. non-provisional patent application Ser. No. 15/211,822, filed on Jul. 15, 2016, entitled "Spatial Audio Correction," issued as U.S. Pat. No. 9,794,710 on Oct. 17, 2017, which is incorporated herein by reference in its entirety.

The present application incorporates herein by reference in its entirety U.S. application Ser. No. 15/211,835, filed Jul. 15, 2016, titled "Spectral Correction Using Spatial Calibration." Additional incorporations by reference are made throughout the disclosure.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIGS. 10A and 10B illustrate transition frequency ranges of example hybrid calibration sounds;

Figure 1:
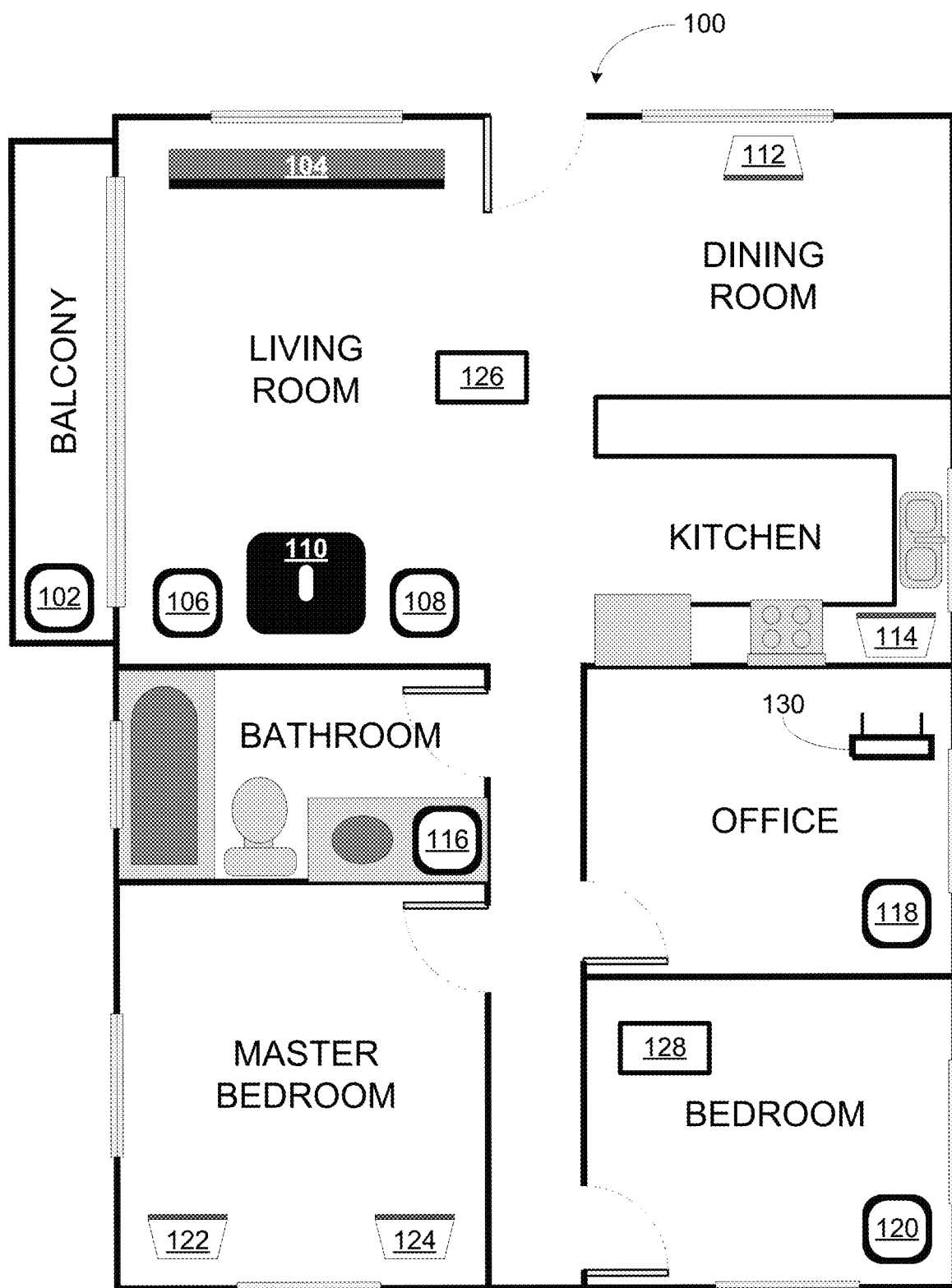
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Embodiments described herein involve, inter alia, techniques to facilitate calibration of a media playback system. Some calibration procedures contemplated herein involve a recording device (e.g., a networked microphone device (NMD)) detecting sound waves (e.g., one or more calibration sounds) that were emitted by one or more playback devices of a media playback system. A processing device, such as a recording device, a playback device or another device that is communicatively coupled to the media playback system, may analyze the detected sound waves to determine one or more calibrations for the one or more playback devices of the media playback system. When applied, such calibrations may configure the one or more playback devices to a given listening area (i.e., the environment in which the playback device(s) were positioned while emitting the sound waves).

In some embodiments contemplated herein, the processing device may determine a first type of calibration. For instance, the processing device may determine a spatial calibration that configures the one or more playback devices to a given listening area spatially. Such a calibration may configure the one or more playback devices to one or more particular locations within the environment (e.g., one or more preferred listening positions, such as favorite seating location), perhaps by adjusting time-delay and/or loudness for those particular locations. A spatial calibration might include one or more filters that include delay and/or phase adjustment, gain adjustment, and/or any other adjustment to correct for the spatial placement of the playback device(s) relative to the one or more particular locations within the environment.

As noted above, during a calibration procedure, one or more playback devices of a media playback system may output calibration sounds. Some example media playback systems may include multiple audio drivers, which may be divided among the playback device(s) of a media playback system in various arrangements. For instance, an example media playback system may include a soundbar-type playback device with multiple audio drivers (e.g., nine audio drivers). Another playback device might include multiple audio drivers of different types (e.g., tweeters and woofers, perhaps of varying size). Other example playback devices may include a single audio driver (e.g., a single full-range woofer in a playback device, or a large low-frequency woofer in a subwoofer-type device).

In operation, multiple audio drivers of a media playback system may form multiple "sound axes." Each such "sound axis" may correspond to a respective input channel of audio content. In some implementations, two or more audio drivers may be arrayed to form a sound axis. For instance, a sound-bar type device might include nine audio drivers which form multiple sound axes (e.g., front, left, and right surround sound channels). Any audio driver may contribute to any number of sound axes. For example, a left axis of a surround sound system may be formed by contributions from all nine audio drivers in the example sound-bar type device. Alternatively, an axis may be formed by a single audio driver.

Example media playback systems described herein may adopt various playback configurations representing respective sets of sound axes. Example playback configurations may include respective configurations based on the number of input channels (e.g., mono, stereo, surround, or any of the above in combination with a subwoofer). Other example playback configurations may be based on the content type. For instance, a first set of axes may be formed by audio drivers of a media playback system when playing music and a second set of axes formed by the audio drivers when playing audio that is paired with video (e.g., television audio). Other playback confirmations may be invoked by various groupings of playback devices within the media playback system. Many examples are possible.

During some example calibration procedures, the multiple audio drivers of the media playback system may form the multiple sound axes, such that each sound axis outputs sound during the calibration procedure. For instance, calibration audio emitted by multiple audio drivers may be divided into constituent frames. Each frame may in turn be divided into slots. During each slot of a given frame, a respective sound axis may be formed by outputting audio. In this manner, an NMD that is recording the audio output of the audio drivers can obtain samples from each sound axis. The frames may repeat, so as to produce multiple samples for each sound axis when recorded by the NMD.

Another type of calibration that may be produced by example calibration procedures described herein is a spectral calibration. A spectral calibration may configure the playback device(s) of a media playback system across a given listening area spectrally. Such a calibration may help offset acoustic characteristics of the environment generally instead of being relatively more directed to particular listening locations like the spatial calibrations. A spectral calibration may include one or more filters that adjust the frequency response of the playback devices. In operation, one of the two or more calibrations may be applied to playback by the one or more playback devices, perhaps for different use cases. Example uses cases might include music playback or surround sound (i.e., home theater), among others.

In some example calibration procedures contemplated herein, a media playback system may perform a first calibration to determine a spatial calibration for playback device(s) of the media playback system. The media playback system may then apply the spatial calibration while the playback devices are emitting audio during a second calibration to determine a spectral calibration. Such a calibration procedure may yield a calibration that includes both spatial and spectral correction.

Example techniques may involve performing aspects of a spatial calibration. A first implementation may include detecting a trigger condition that initiates calibration of a media playback system including multiple audio drivers that form multiple sound axes, each sound axis corresponding to a respective channel of multi-channel audio content The first implementation may also include causing the multiple audio drivers to emit calibration audio that is divided into constituent frames, the multiple sound axes emitting calibration audio during respective slots of each constituent frame. The first implementation may further include recording, via a microphone, the emitted calibration audio. The first implementation may include causing delays for each sound axis of the multiple sound axes to be determined, the determined delay for each sound axis based on the slots of recorded calibration audio corresponding to the sound axes and causing the multiple sound axes to be calibrated. Calibrating the multiple sound axes may involve causing audio output of the multiple sound axes to be delayed according to the respective determined delays.

A second implementation may include receiving data representing one or more spatial filters that correspond to respective playback configurations. Each playback configuration may represents a particular set of sound axes formed via one or more audio drivers and each sound axis may correspond to a respective channel of audio content. The second implementation may also involve causing the one or more audio drivers to output calibration audio that is divided into a repeating set of frames, the set of frames including a respective frame for each playback configuration. Causing the one or more audio drivers to output the calibration audio may involve causing an audio stage to apply, during each frame, the spatial filter corresponding to the respective playback configuration. The second implementation may also include receiving data representing one or more spectral filters that correspond to respective playback configurations, the one or more spectral filters based on the calibration audio output by the one or more audio drivers. When playing back audio content in a given playback configuration, the audio stage may apply a particular spectral filter corresponding to the given playback configuration.

A third implementation may include detecting a trigger condition that initiates calibration of a media playback system for multiple playback configurations. Each playback configuration represents a particular set of sound axes formed via multiple audio drivers of the media playback system and each sound axis may correspond to a respective channel of audio content. The third implementation may also involve causing the multiple audio drivers to output calibration audio that is divided into a repeating set of frames, the set of frames including a respective frame for each playback configuration. Causing the multiple audio drivers to output the calibration audio may involve causing, during each frames of the set of frames, a respective set of spatial filters to be applied to the multiple audio drivers, each set of spatial filters including a respective spatial filter for each sound axis. The third implementation may further involve recording, via the microphone, the calibration audio output by the multiple audio drivers and causing a processing device to determine respective sets of spectral filters for the multiple playback configurations based on the recorded calibration audio, each set of spectral filters including a respective spectral filter for each sound axis.

Each of the these example implementations may be embodied as a method, a device configured to carry out the implementation, a system of devices configured to carry out the implementation, or a non-transitory computer-readable medium containing instructions that are executable by one or more processors to carry out the implementation, among other examples. It will be understood by one of ordinary skill in the art that this disclosure includes numerous other embodiments, including combinations of the example features described herein. Further, any example operation described as being performed by a given device to illustrate a technique may be performed by any suitable devices, including the devices described herein. Yet further, any device may cause another device to perform any of the operations described herein.

While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 illustrates an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
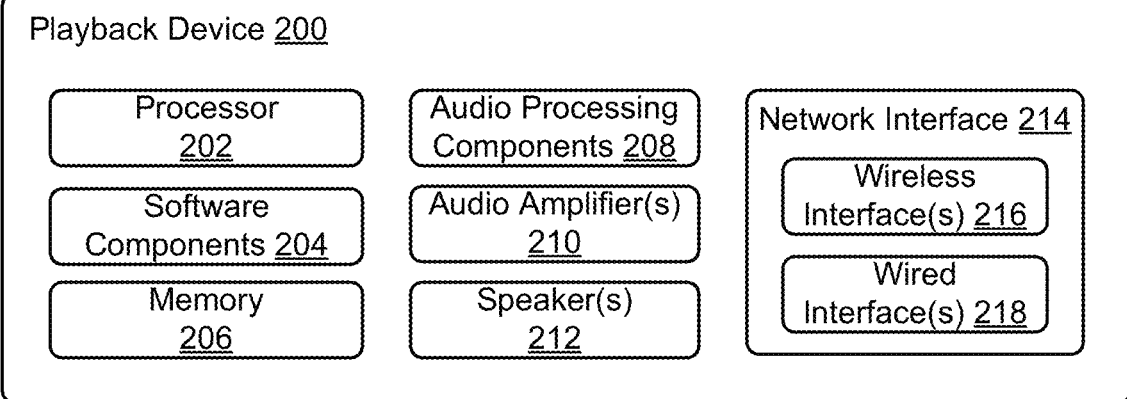
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
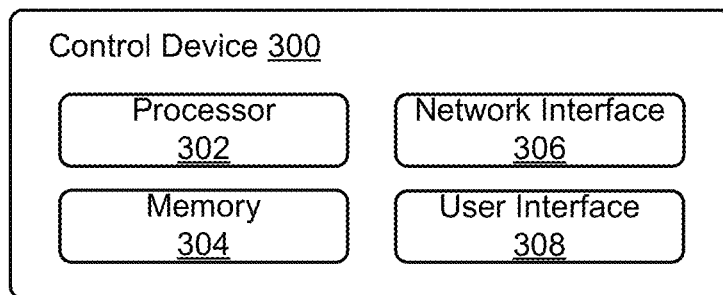
FIG. 3 shows a functional block diagram of an example control device.

FIG. 3 shows a functional block diagram of an example control device 300 that may be configured to be one or both of the control devices 126 and 128 of the media playback system 100. Control device 300 may also be referred to as a controller 300. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
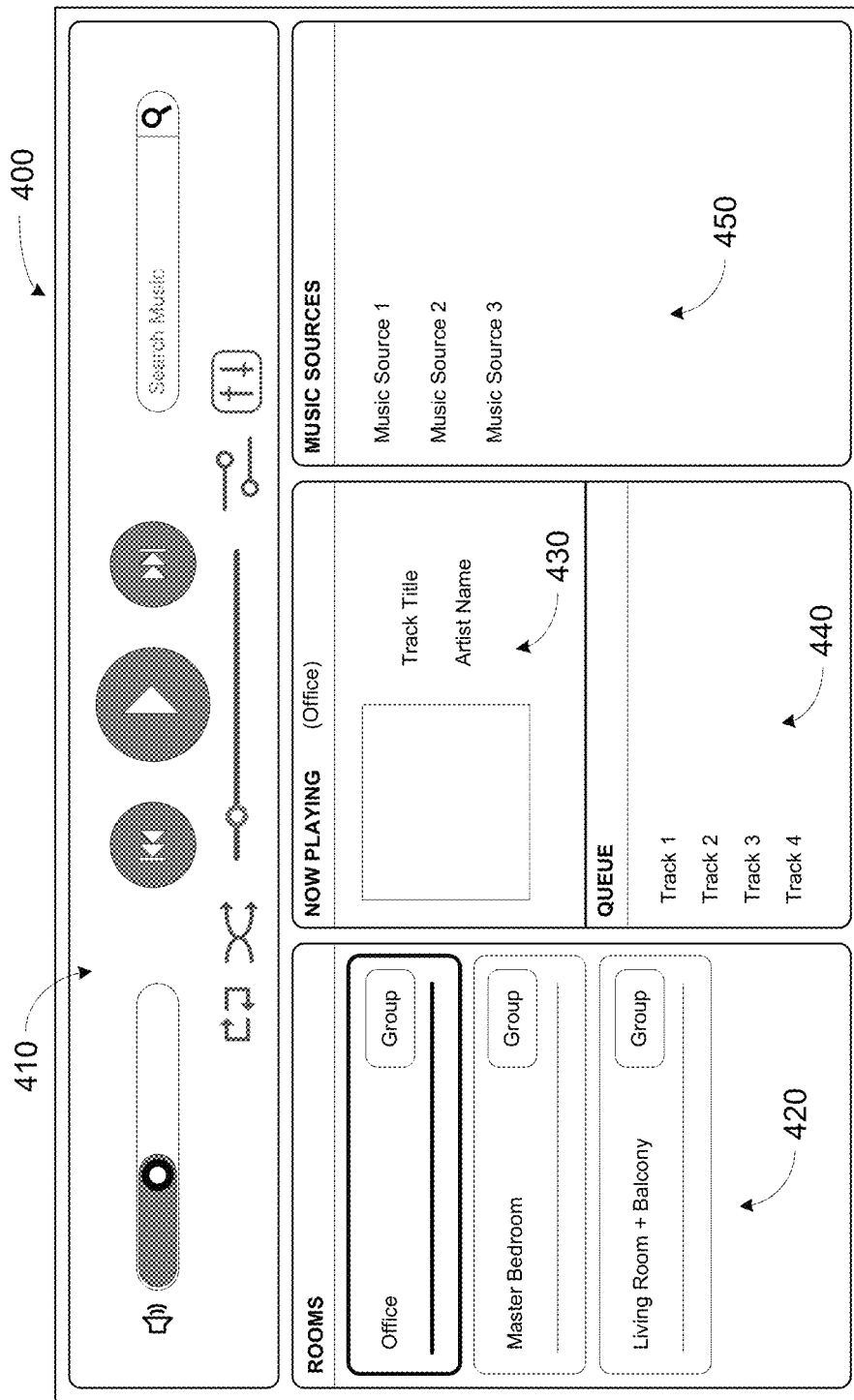
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The audio content sources region 450 may include graphical representations of selectable audio content sources from which audio content may be retrieved and played by the selected playback zone or zone group. Discussions pertaining to audio content sources may be found in the following section.

Figure 5:
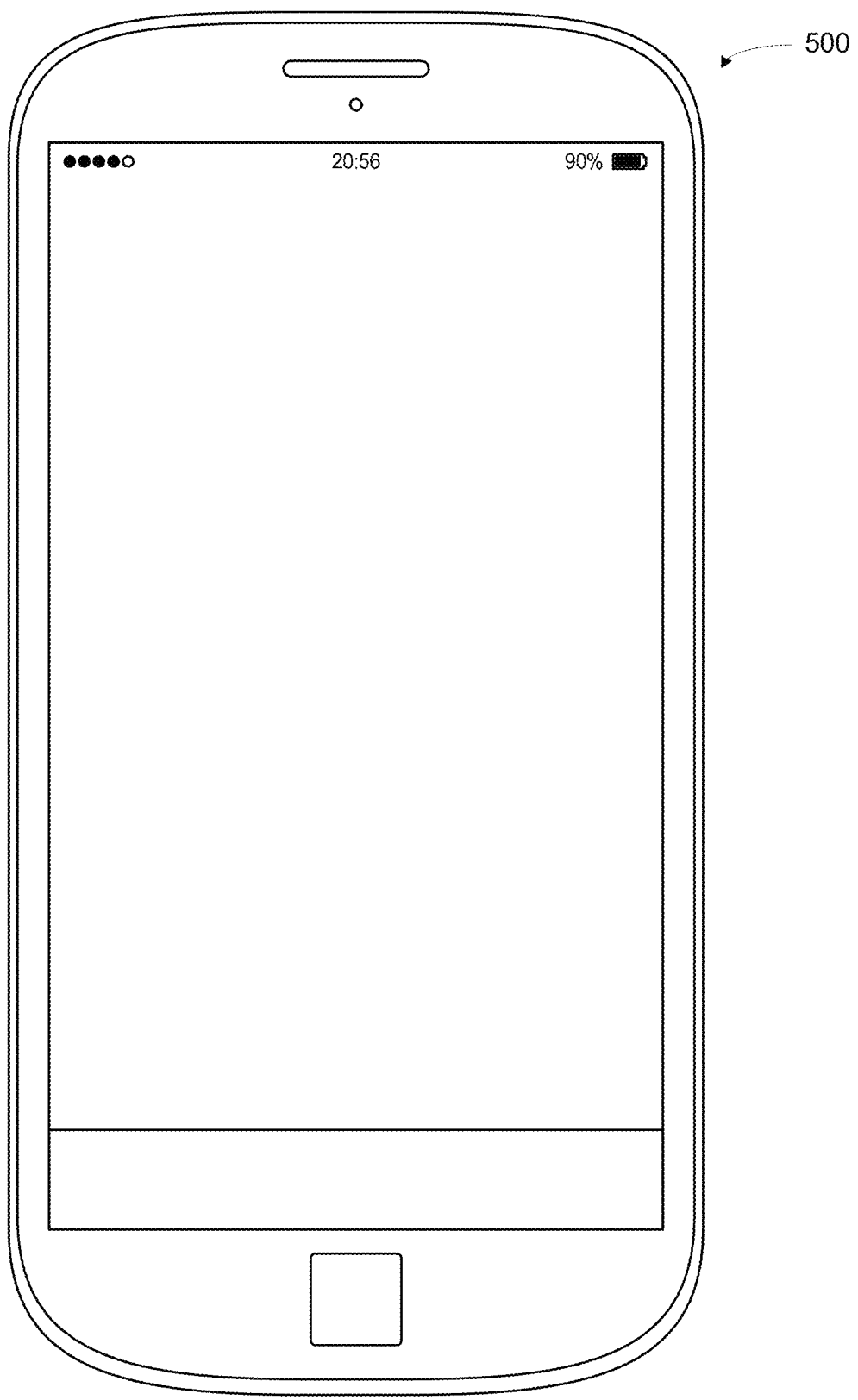
FIG. 5 shows an example control device.

FIG. 5 depicts a smartphone 500 that includes one or more processors, a tangible computer-readable memory, a network interface, and a display. Smartphone 500 might be an example implementation of control device 126 or 128 of FIG. 1, or control device 300 of FIG. 3, or other control devices described herein. By way of example, reference will be made to smartphone 500 and certain control interfaces, prompts, and other graphical elements that smartphone 500 may display when operating as a control device of a media playback system (e.g., of media playback system 100). Within examples, such interfaces and elements may be displayed by any suitable control device, such as a smartphone, tablet computer, laptop or desktop computer, personal media player, or a remote control device.

While operating as a control device of a media playback system, smartphone 500 may display one or more controller interface, such as controller interface 400. Similar to playback control region 410, playback zone region 420, playback status region 430, playback queue region 440, and/or audio content sources region 450 of FIG. 4, smartphone 500 might display one or more respective interfaces, such as a playback control interface, a playback zone interface, a playback status interface, a playback queue interface, and/or an audio content sources interface. Example control devices might display separate interfaces (rather than regions) where screen size is relatively limited, such as with smartphones or other handheld devices.

d. Example Audio Content Sources

As indicated previously, one or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

e. Example Calibration Sequence

As indicated above, example calibration procedures may involve one or more playback devices emitting a calibration sound, which may be detected by a recording device (or multiple recording devices).

In some embodiments, the detected calibration sounds may be analyzed across a range of frequencies over which the playback device is to be calibrated (i.e., a calibration range). Accordingly, the particular calibration sound that is emitted by a playback device covers the calibration frequency range. The calibration frequency range may include a range of frequencies that the playback device is capable of emitting (e.g., 15-30,000 Hz) and may be inclusive of frequencies that are considered to be in the range of human hearing (e.g., 20-20,000 Hz). By emitting and subsequently detecting a calibration sound covering such a range of frequencies, a frequency response that is inclusive of that range may be determined for the playback device. Such a frequency response may be representative of the environment in which the playback device emitted the calibration sound.

In some embodiments, a playback device may repeatedly emit the calibration sound during the calibration procedure such that the calibration sound covers the calibration frequency range during each repetition. With a moving microphone, repetitions of the calibration sound are continuously detected at different physical locations within the environment. For instance, the playback device might emit a periodic calibration sound. Each period of the calibration sound may be detected by the recording device at a different physical location within the environment thereby providing a sample (i.e., a frame representing a repetition) at that location. Such a calibration sound may therefore facilitate a space-averaged calibration of the environment. When multiple microphones are utilized, each microphone may cover a respective portion of the environment (perhaps with some overlap).

Yet further, the recording devices may measure both moving and stationary samples. For instance, while the one or more playback devices output a calibration sound, a recording device may move within the environment. During such movement, the recording device may pause at one or more locations to measure stationary samples. Such locations may correspond to preferred listening locations. In another example, a first recording device and a second recording device may include a first microphone and a second microphone respectively. While the playback device emits a calibration sound, the first microphone may move and the second microphone may remain stationary, perhaps at a particular listening location within the environment (e.g., a favorite chair).

In some cases, the one or more playback devices may be joining into a grouping, such as a bonded zone or zone group. In such cases, the calibration procedure may calibrate the one or more playback devices as a group. Example groupings include zone groups or bonded pairs, among other example configurations.

The playback device(s) under calibration may initiate the calibration procedure based on a trigger condition. For instance, a recording device, such as control device 126 of media playback system 100, may detect a trigger condition that causes the recording device to initiate calibration of one or more playback devices (e.g., one or more of playback devices 102-124). Alternatively, a playback device of a media playback system may detect such a trigger condition (and then perhaps relay an indication of that trigger condition to the recording device).

In some embodiments, detecting the trigger condition may involve detecting input data indicating a selection of a selectable control. For instance, a recording device, such as control device 126, may display an interface (e.g., control interface 400 of FIG. 4), which includes one or more controls that, when selected, initiate calibration of a playback device, or a group of playback devices (e.g., a zone).

Figure 6:
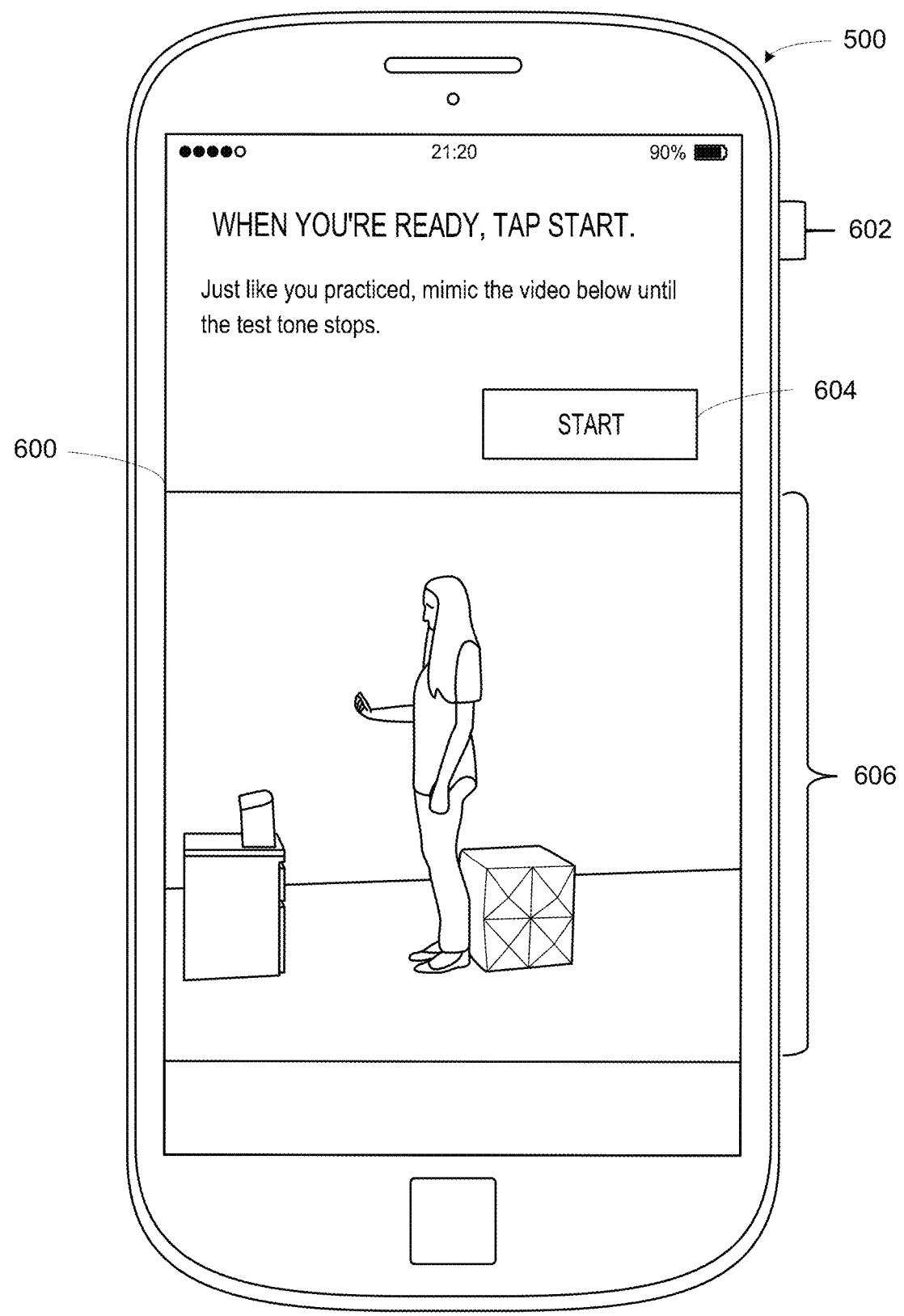
FIG. 6 shows a smartphone that is displaying an example control interface, according to an example implementation.

To illustrate such a control, FIG. 6 shows smartphone 500 which is displaying an example control interface 600. Control interface 600 includes a graphical region 602 that prompts to tap selectable control 604 (Start) when ready. When selected, selectable control 604 may initiate the calibration procedure. As shown, selectable control 604 is a button control. While a button control is shown by way of example, other types of controls are contemplated as well.

Control interface 600 further includes a graphical region 606 that includes a video depicting how to assist in the calibration procedure. Some calibration procedures may involve moving a microphone through an environment in order to obtain samples of the calibration sound at multiple physical locations. In order to prompt a user to move the microphone, the control device may display a video or animation depicting the step or steps to be performed during the calibration.

Figure 7:
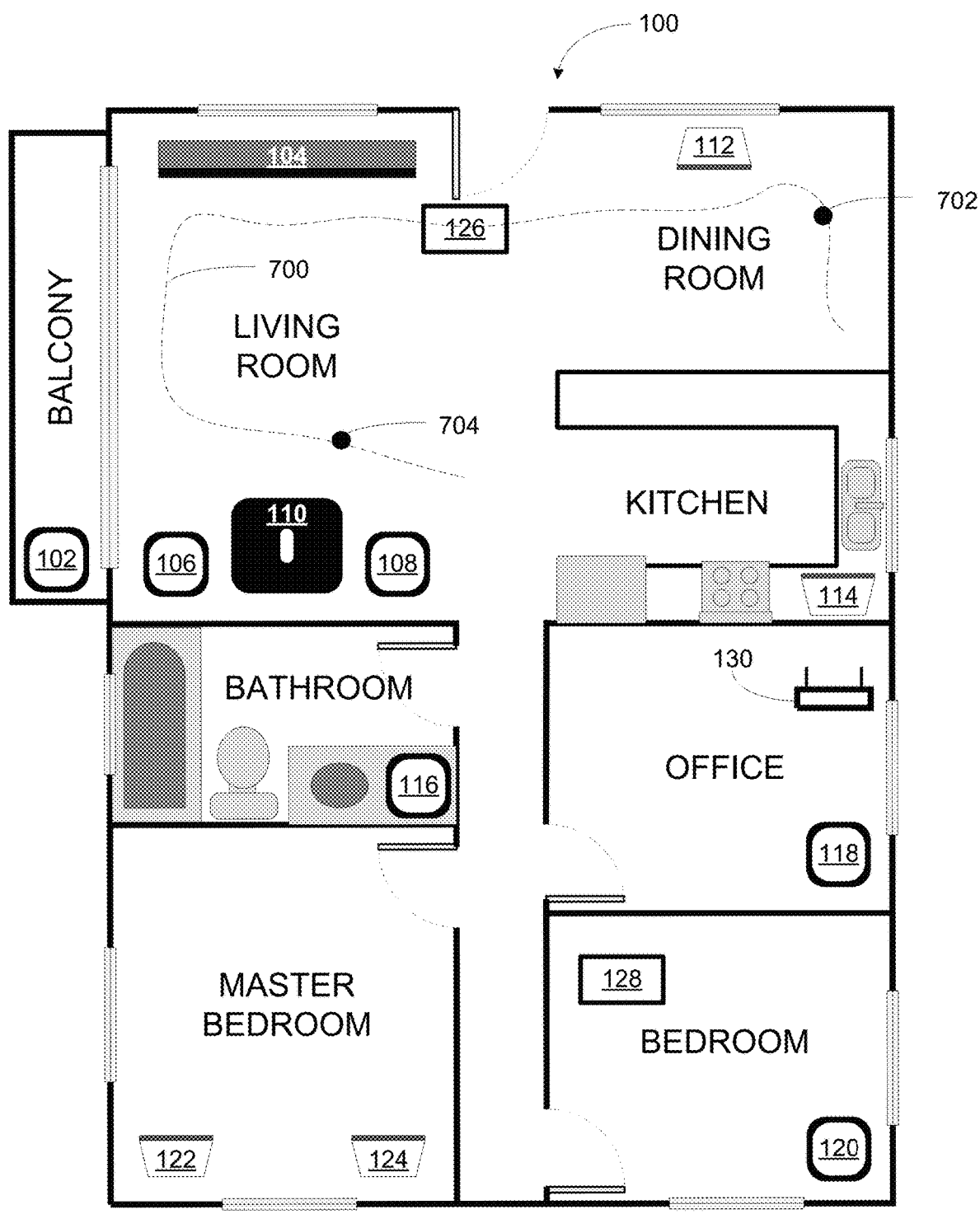
FIG. 7 illustrates an example movement through an example environment in which an example media playback system is positioned.

To illustrate movement of the control device during calibration, FIG. 7 shows media playback system 100 of FIG. 1. FIG. 7 shows a path 700 along which a recording device (e.g., control device 126) might be moved during calibration. As noted above, the recording device may indicate how to perform such a movement in various ways, such as by way of a video or animation, among other examples. A recording device might detect iterations of a calibration sound emitted by one or more playback devices of media playback system 100 at different points along the path 700, which may facilitate a space-averaged calibration of those playback devices.

In other examples, detecting the trigger condition may involve a playback device detecting that the playback device has become uncalibrated, which might be caused by moving the playback device to a different position. For example, the playback device may detect physical movement via one or more sensors that are sensitive to movement (e.g., an accelerometer). As another example, the playback device may detect that it has been moved to a different zone (e.g., from a "Kitchen" zone to a "Living Room" zone), perhaps by receiving an instruction from a control device that causes the playback device to leave a first zone and join a second zone.

In further examples, detecting the trigger condition may involve a recording device (e.g., a control device or playback device) detecting a new playback device in the system. Such a playback device may have not yet been calibrated for the environment. For instance, a recording device may detect a new playback device as part of a set-up procedure for a media playback system (e.g., a procedure to configure one or more playback devices into a media playback system). In other cases, the recording device may detect a new playback device by detecting input data indicating a request to configure the media playback system (e.g., a request to configure a media playback system with an additional playback device).

In some cases, the first recording device (or another device) may instruct the one or more playback devices to emit the calibration sound. For instance, a recording device, such as control device 126 of media playback system 100, may send a command that causes a playback device (e.g., one of playback devices 102-124) to emit a calibration sound. The control device may send the command via a network interface (e.g., a wired or wireless network interface). A playback device may receive such a command, perhaps via a network interface, and responsively emit the calibration sound.

Acoustics of an environment may vary from location to location within the environment. Because of this variation, some calibration procedures may be improved by positioning the playback device to be calibrated within the environment in the same way that the playback device will later be operated. In that position, the environment may affect the calibration sound emitted by a playback device in a similar manner as playback will be affected by the environment during operation.

Further, some example calibration procedures may involve one or more recording devices detecting the calibration sound at multiple physical locations within the environment, which may further assist in capturing acoustic variability within the environment. To facilitate detecting the calibration sound at multiple points within an environment, some calibration procedures involve a moving microphone. For example, a microphone that is detecting the calibration sound may be moved through the environment while the calibration sound is emitted. Such movement may facilitate detecting the calibration sounds at multiple physical locations within the environment, which may provide a better understanding of the environment as a whole.

In some embodiments, the one or more playback devices may repeatedly emit the calibration sound during the calibration procedure such that the calibration sound covers the calibration frequency range during each repetition. With a moving microphone, repetitions of the calibration sound are detected at different physical locations within the environment, thereby providing samples that are spaced throughout the environment. In some cases, the calibration sound may be periodic calibration signal in which each period covers the calibration frequency range.

To facilitate determining a frequency response, the calibration sound should be emitted with sufficient energy at each frequency to overcome background noise. To increase the energy at a given frequency, a tone at that frequency may be emitted for a longer duration. However, by lengthening the period of the calibration sound, the spatial resolution of the calibration procedure is decreased, as the moving microphone moves further during each period (assuming a relatively constant velocity). As another technique to increase the energy at a given frequency, a playback device may increase the intensity of the tone. However, in some cases, attempting to emit sufficient energy in a short amount of time may damage speaker drivers of the playback device.

Some implementations may balance these considerations by instructing the playback device to emit a calibration sound having a period that is approximately ⅜th of a second in duration (e.g., in the range of ¼ to 1 second in duration). In other words, the calibration sound may repeat at a frequency of 2-4 Hz. Such a duration may be long enough to provide a tone of sufficient energy at each frequency to overcome background noise in a typical environment (e.g., a quiet room) but also be short enough that spatial resolution is kept in an acceptable range (e.g., less than a few feet assuming normal walking speed).

In some embodiments, the one or more playback devices may emit a hybrid calibration sound that combines a first component and a second component having respective waveforms. For instance, an example hybrid calibration sound might include a first component that includes noises at certain frequencies and a second component that sweeps through other frequencies (e.g., a swept-sine). A noise component may cover relatively low frequencies of the calibration frequency range (e.g., 10-50 Hz) while the swept signal component covers higher frequencies of that range (e.g., above 50 Hz). Such a hybrid calibration sound may combine the advantages of its component signals.

Figure 8:
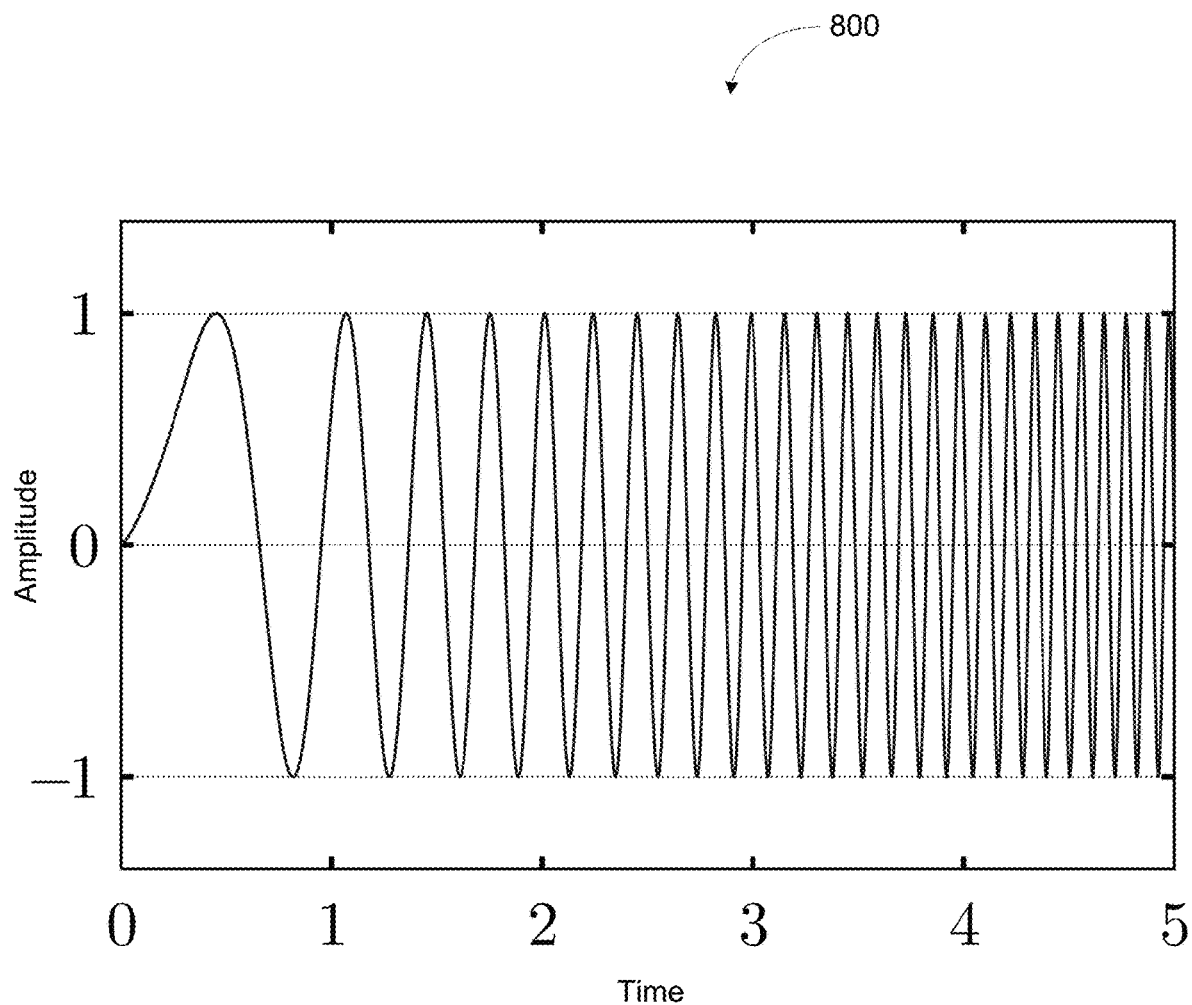
FIG. 8 illustrates an example chirp that increases in frequency over time.

A swept signal (e.g., a chirp or swept sine) is a waveform in which the frequency increases or decreases with time. Including such a waveform as a component of a hybrid calibration sound may facilitate covering a calibration frequency range, as a swept signal can be chosen that increases or decreases through the calibration frequency range (or a portion thereof). For example, a chirp emits each frequency within the chirp for a relatively short time period such that a chirp can more efficiently cover a calibration range relative to some other waveforms. FIG. 8 shows a graph 800 that illustrates an example chirp. As shown in FIG. 8, the frequency of the waveform increases over time (plotted on the X-axis) and a tone is emitted at each frequency for a relatively short period of time.

However, because each frequency within the chirp is emitted for a relatively short duration of time, the amplitude (or sound intensity) of the chirp must be relatively high at low frequencies to overcome typical background noise. Some speakers might not be capable of outputting such high intensity tones without risking damage. Further, such high intensity tones might be unpleasant to humans within audible range of the playback device, as might be expected during a calibration procedure that involves a moving microphone. Accordingly, some embodiments of the calibration sound might not include a chirp that extends to relatively low frequencies (e.g., below 50 Hz). Instead, the chirp or swept signal may cover frequencies between a relatively low threshold frequency (e.g., a frequency around 50-100 Hz) and a maximum of the calibration frequency range. The maximum of the calibration range may correspond to the physical capabilities of the channel(s) emitting the calibration sound, which might be 20,000 Hz or above.

A swept signal might also facilitate the reversal of phase distortion caused by the moving microphone. As noted above, a moving microphone causes phase distortion, which may interfere with determining a frequency response from a detected calibration sound. However, with a swept signal, the phase of each frequency is predictable (as Doppler shift). This predictability facilitates reversing the phase distortion so that a detected calibration sound can be correlated to an emitted calibration sound during analysis. Such a correlation can be used to determine the effect of the environment on the calibration sound.

As noted above, a swept signal may increase or decrease frequency over time. In some embodiments, the recording device may instruct the one or more playback devices to emit a chirp that descends from the maximum of the calibration range (or above) to the threshold frequency (or below). A descending chirp may be more pleasant to hear to some listeners than an ascending chirp, due to the physical shape of the human ear canal. While some implementations may use a descending swept signal, an ascending swept signal may also be effective for calibration.

As noted above, example calibration sounds may include a noise component in addition to a swept signal component. Noise refers to a random signal, which is in some cases filtered to have equal energy per octave. In embodiments where the noise component is periodic, the noise component of a hybrid calibration sound might be considered to be pseudorandom. The noise component of the calibration sound may be emitted for substantially the entire period or repetition of the calibration sound. This causes each frequency covered by the noise component to be emitted for a longer duration, which decreases the signal intensity typically required to overcome background noise.

Moreover, the noise component may cover a smaller frequency range than the chirp component, which may increase the sound energy at each frequency within the range. As noted above, a noise component might cover frequencies between a minimum of the frequency range and a threshold frequency, which might be, for example around a frequency around 50-100 Hz. As with the maximum of the calibration range, the minimum of the calibration range may correspond to the physical capabilities of the channel(s) emitting the calibration sound, which might be 20 Hz or below.

Figure 9:
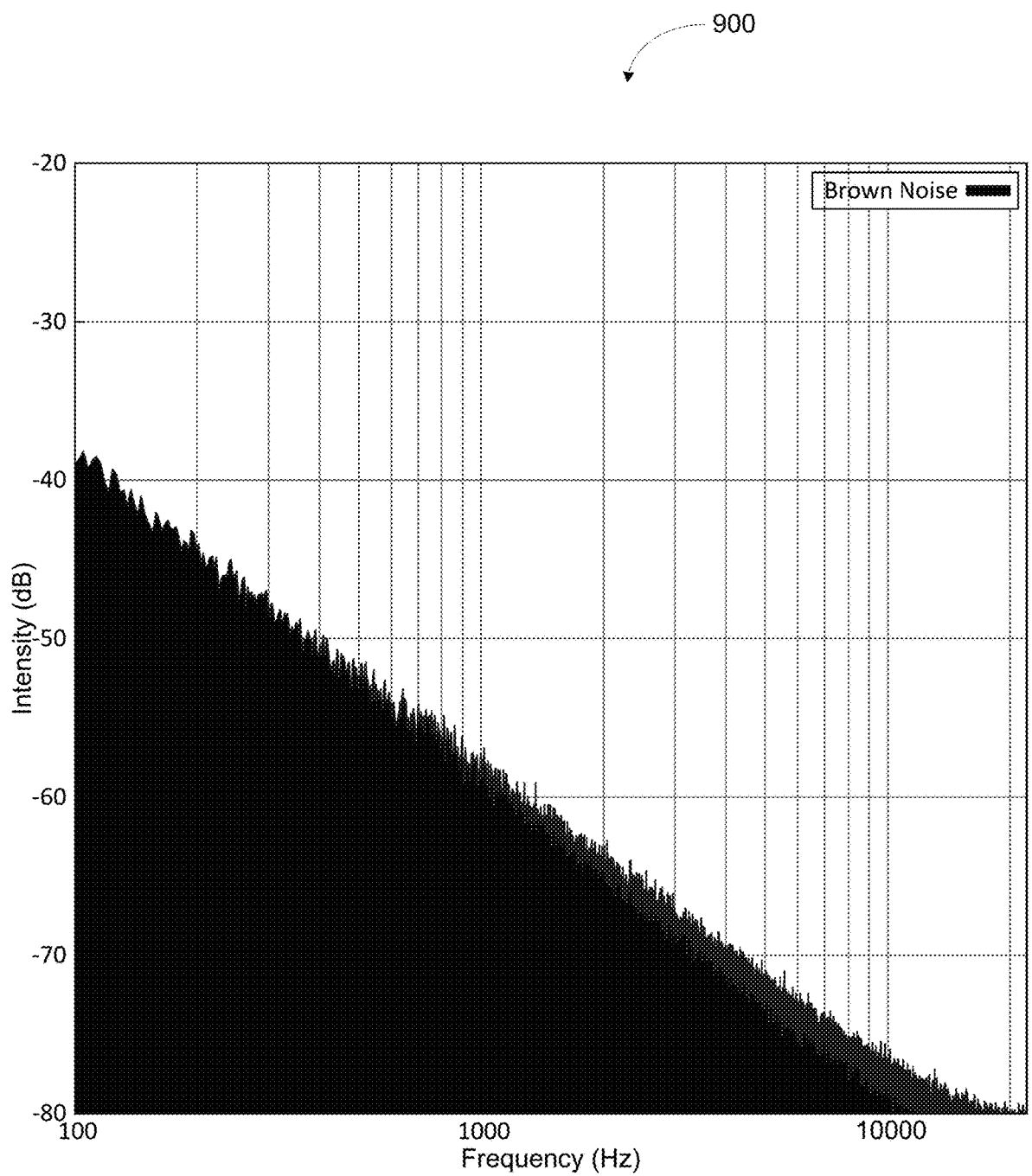
FIG. 9 shows an example brown noise spectrum.

FIG. 9 shows a graph 900 that illustrates an example brown noise. Brown noise is a type of noise that is based on Brownian motion. In some cases, the playback device may emit a calibration sound that includes a brown noise in its noise component. Brown noise has a "soft" quality, similar to a waterfall or heavy rainfall, which may be considered pleasant to some listeners. While some embodiments may implement a noise component using brown noise, other embodiments may implement the noise component using other types of noise, such as pink noise or white noise. As shown in FIG. 9, the intensity of the example brown noise decreases by 6 dB per octave (20 dB per decade).

Some implementations of a hybrid calibration sound may include a transition frequency range in which the noise component and the swept component overlap. As indicated above, in some examples, the control device may instruct the playback device to emit a calibration sound that includes a first component (e.g., a noise component) and a second component (e.g., a sweep signal component). The first component may include noise at frequencies between a minimum of the calibration frequency range and a first threshold frequency, and the second component may sweep through frequencies between a second threshold frequency and a maximum of the calibration frequency range.

To overlap these signals, the second threshold frequency may a lower frequency than the first threshold frequency. In such a configuration, the transition frequency range includes frequencies between the second threshold frequency and the first threshold frequency, which might be, for example, 50-100 Hz. By overlapping these components, the playback device may avoid emitting a possibly unpleasant sound associated with a harsh transition between the two types of sounds.

FIGS. 10A and 10B illustrate components of example hybrid calibration signals that cover a calibration frequency range 1000. FIG. 10A illustrates a first component 1002A (i.e., a noise component) and a second component 1004A of an example calibration sound. Component 1002A covers frequencies from a minimum 1008A of the calibration range 1000 to a first threshold frequency 1008A. Component 1004A covers frequencies from a second threshold 1010A to a maximum of the calibration frequency range 1000. As shown, the threshold frequency 1008A and the threshold frequency 1010A are the same frequency.

FIG. 10B illustrates a first component 1002B (i.e., a noise component) and a second component 1004B of another example calibration sound. Component 1002B covers frequencies from a minimum 1008B of the calibration range 1000 to a first threshold frequency 1008A. Component 1004A covers frequencies from a second threshold 1010B to a maximum 1012B of the calibration frequency range 1000. As shown, the threshold frequency 1010B is a lower frequency than threshold frequency 1008B such that component 1002B and component 1004B overlap in a transition frequency range that extends from threshold frequency 1010B to threshold frequency 1008B.

Figure 11:
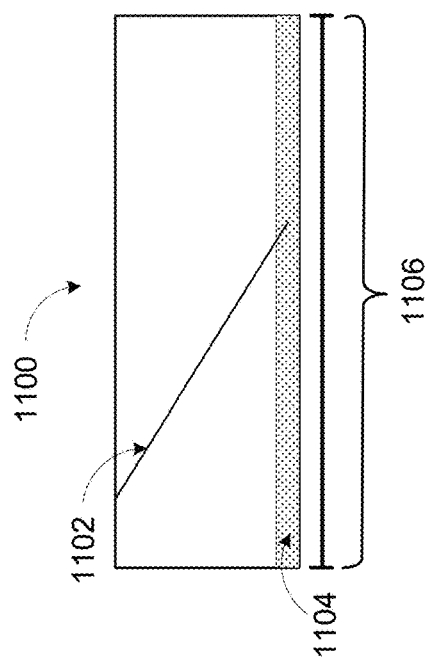
FIG. 11 shows a frame illustrating an iteration of an example periodic calibration sound.

FIG. 11 illustrates one example iteration (e.g., a period or cycle) of an example hybrid calibration sound that is represented as a frame 1100. The frame 1100 includes a swept signal component 1102 and noise component 1104. The swept signal component 1102 is shown as a downward sloping line to illustrate a swept signal that descends through frequencies of the calibration range. The noise component 1104 is shown as a region to illustrate low-frequency noise throughout the frame 1100. As shown, the swept signal component 1102 and the noise component overlap in a transition frequency range. The period 1106 of the calibration sound is approximately ⅜ths of a second (e.g., in a range of ¼ to ½ second), which in some implementation is sufficient time to cover the calibration frequency range of a single channel.

Figure 12:
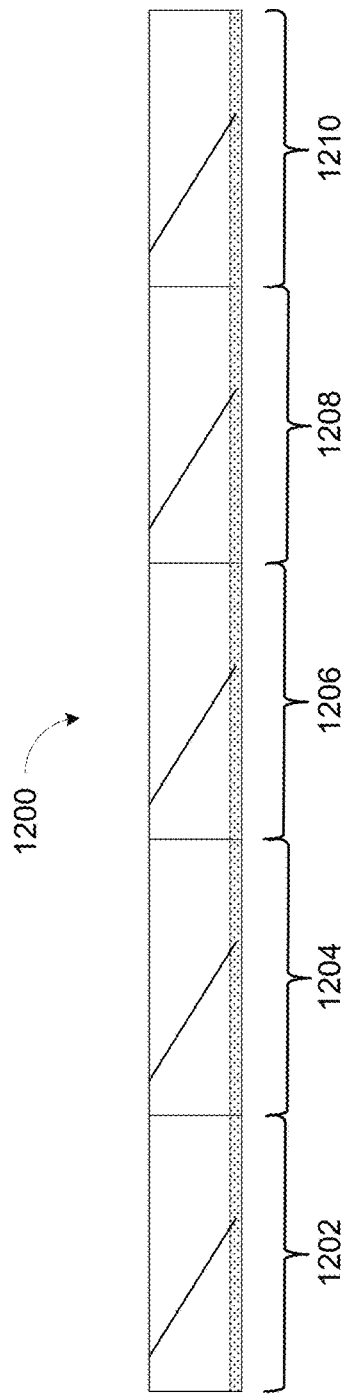
FIG. 12 shows a series of frames illustrating iterations of an example periodic calibration sound.

FIG. 12 illustrates an example periodic calibration sound 1200. Five iterations (e.g., periods) of hybrid calibration sound 1100 are represented as a frames 1202, 1204, 1206, 1208, and 1210. In each iteration, or frame, the periodic calibration sound 1200 covers a calibration frequency range using two components (e.g., a noise component and a swept signal component).

In some embodiments, a spectral adjustment may be applied to the calibration sound to give the calibration sound a desired shape, or roll off, which may avoid overloading speaker drivers. For instance, the calibration sound may be filtered to roll off at 3 dB per octave, or 1/f. Such a spectral adjustment might not be applied to vary low frequencies to prevent overloading the speaker drivers.

In some embodiments, the calibration sound may be pre-generated. Such a pre-generated calibration sound might be stored on the control device, the playback device, or on a server (e.g., a server that provides a cloud service to the media playback system). In some cases, the control device or server may send the pre-generated calibration sound to the playback device via a network interface, which the playback device may retrieve via a network interface of its own. Alternatively, a control device may send the playback device an indication of a source of the calibration sound (e.g., a URI), which the playback device may use to obtain the calibration sound.

Alternatively, the control device or the playback device may generate the calibration sound. For instance, for a given calibration range, the control device may generate noise that covers at least frequencies between a minimum of the calibration frequency range and a first threshold frequency and a swept sine that covers at least frequencies between a second threshold frequency and a maximum of the calibration frequency range. The control device may combine the swept sine and the noise into the periodic calibration sound by applying a crossover filter function. The cross-over filter function may combine a portion of the generated noise that includes frequencies below the first threshold frequency and a portion of the generated swept sine that includes frequencies above the second threshold frequency to obtain the desired calibration sound. The device generating the calibration sound may have an analog circuit and/or digital signal processor to generate and/or combine the components of the hybrid calibration sound.

Further example calibration procedures are described in U.S. patent application Ser. No. 14/805,140 filed Jul. 21, 2015, entitled "Hybrid Test Tone For Space-Averaged Room Audio Calibration Using A Moving Microphone," U.S. patent application Ser. No. 14/805,340 filed Jul. 21, 2015, entitled "Concurrent Multi-Loudspeaker Calibration with a Single Measurement," and U.S. patent application Ser. No. 14/864,393 filed Sep. 24, 2015, entitled "Facilitating Calibration of an Audio Playback Device," which are incorporated herein in their entirety.

Calibration may be facilitated via one or more control interfaces, as displayed by one or more devices. Example interfaces are described in U.S. patent application Ser. No. 14/696,014 filed Apr. 24, 2015, entitled "Speaker Calibration," and U.S. patent application Ser. No. 14/826,873 filed Aug. 14, 2015, entitled "Speaker Calibration User Interface," which are incorporated herein in their entirety.

Figure 13:
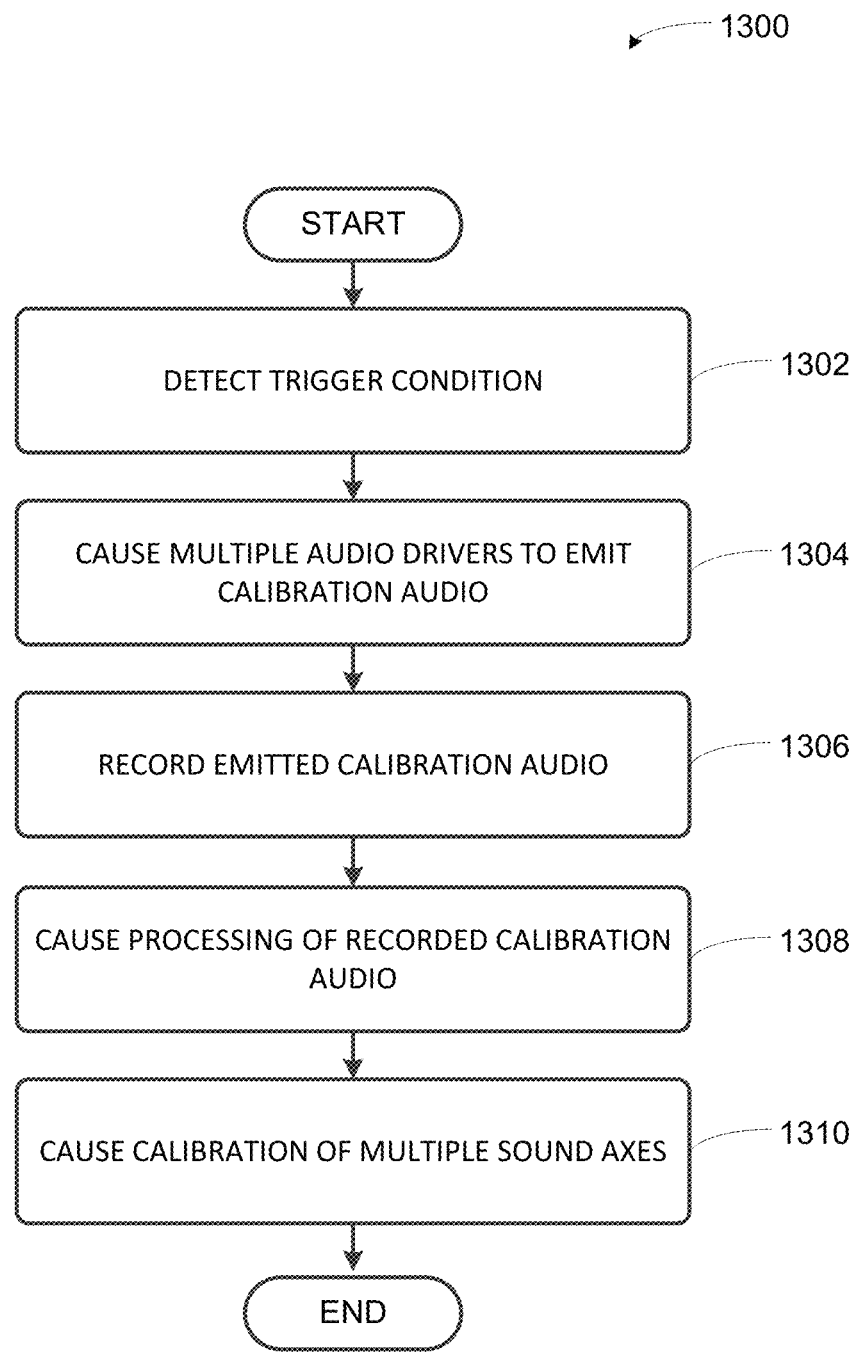
FIG. 13 shows an example flow diagram to facilitate a spatial calibration.
Figure 19:
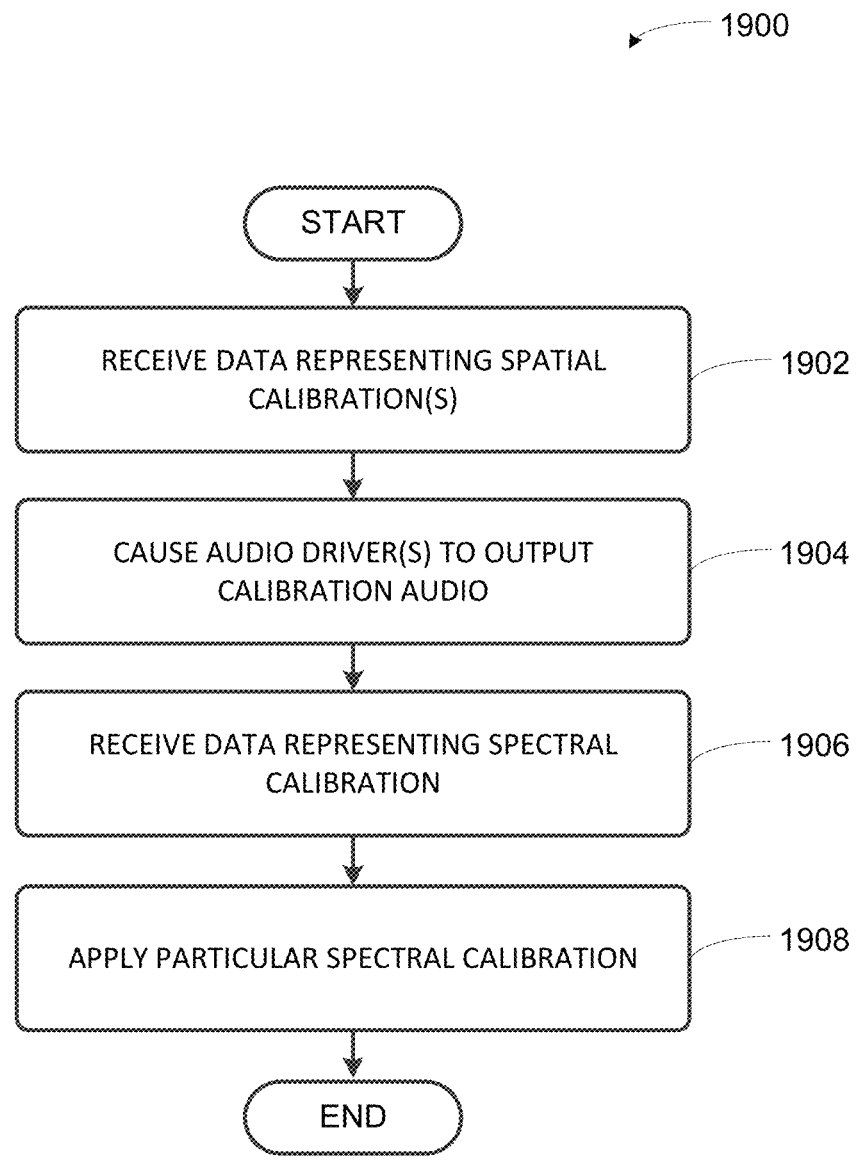
FIG. 19 shows an example flow diagram to facilitate a spatial calibration using an applied spatial calibration.
Figure 20:
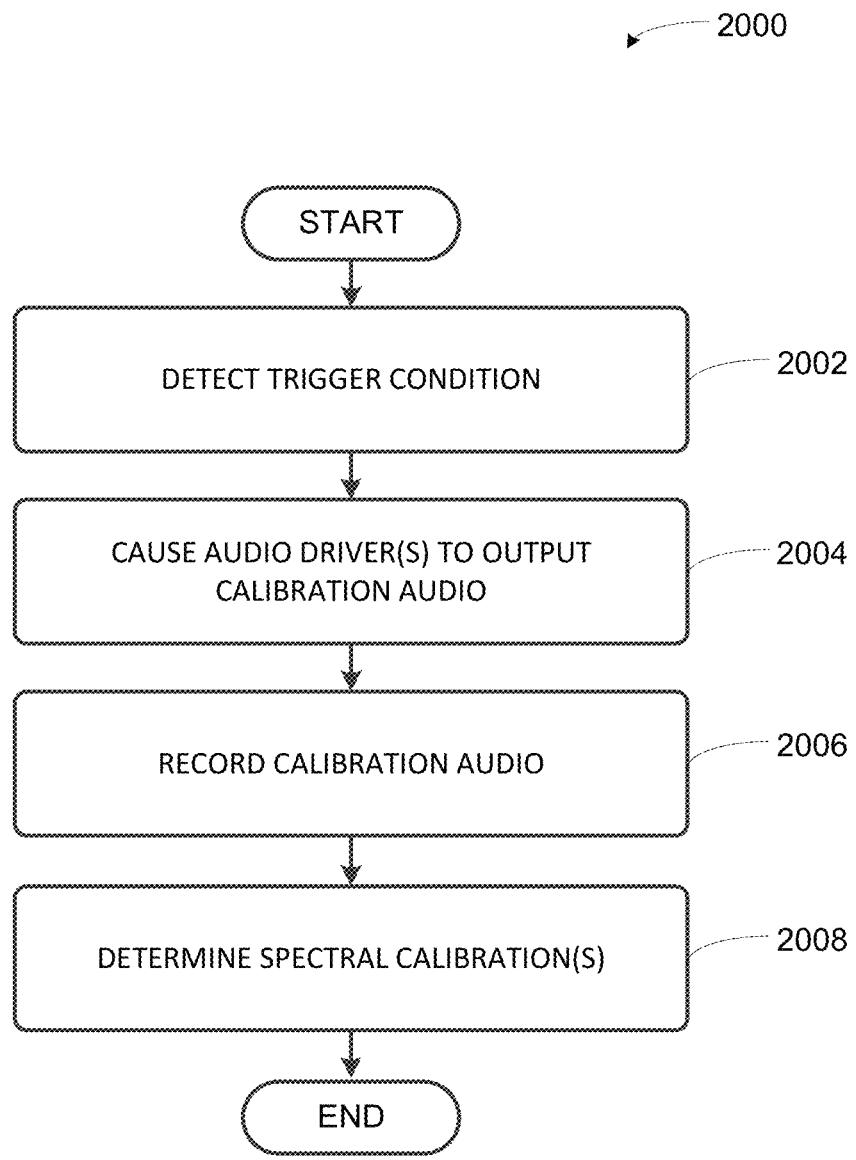
FIG. 20 shows an example flow diagram to facilitate a spatial calibration using an applied spatial calibration.

Moving now to several example implementations, implementations 1300, 1900, and 2000 shown in FIGS. 13, 19 and 20, respectively present example embodiments of techniques described herein. These example embodiments that can be implemented within an operating environment including, for example, the media playback system 100 of FIG. 1, one or more of the playback device 200 of FIG. 2, or one or more of the control device 300 of FIG. 3, as well as other devices described herein and/or other suitable devices. Further, operations illustrated by way of example as being performed by a media playback system can be performed by any suitable device, such as a playback device or a control device of a media playback system. Implementations 1300, 1900, and 2000 may include one or more operations, functions, or actions as illustrated by one or more of blocks shown in FIGS. 13, 19, and 20. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementations disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementations disclosed herein, each block may represent circuitry that is wired to perform the specific logical functions in the process.

III. Example Techniques to Facilitate Spatial Calibration

As discussed above, embodiments described herein may facilitate the calibration of one or more playback devices by determining a spatial calibration. FIG. 13 illustrates an example implementation 1300 by which a media playback system facilitates such a calibration.

a. Detect Trigger Condition

At block 1302, implementation 1300 involves detecting a trigger condition. For instance, a networked microphone device may detect a trigger condition that initiates calibration of a media playback system (or perhaps a set of playback devices in a media playback system). Example networked microphone devices include any suitable device that includes a network interface and a microphone. For instance, playback devices (e.g., playback device 200) and control devices (e.g., control device 300) may each operate as a networked microphone device. Other example networked microphone devices include control devices 126 and 128 of FIG. 1.

The trigger condition may initiate calibration of multiple audio drivers. In some cases, the multiple audio drivers may be housed in a single playback device. For instance, a soundbar-type playback device may include multiple audio drivers (e.g., nine audio drivers). In other cases, the multiple audio drivers may be divided among two or more playback devices. For example, a soundbar with multiple audio drivers may be calibrated with one or more other playback devices each with one or more respective audio drivers. Some example playback devices include multiple audio drivers of different types (e.g., tweeters and woofers, perhaps of varying size).

The particular playback devices (and audio drivers) under calibration may correspond to zones of a media playback system. For instance, an example trigger condition may initiate calibration of a given zone of a media playback system (e.g., the Living Room zone of media playback system 100 shown in FIG. 1). According to this example, the Living Room zone includes playback devices 104, 106, 108, and 110 that together include multiple audio drivers, and the example trigger condition may therefore initiate calibration of multiple audio drivers.

As noted above in connection with the example calibration sequence, various trigger conditions are contemplated herein. Some example triggers conditions include input data instructing the media playback system to initiate calibration. Such input data may be received via a user interface (e.g., control interface 600 of FIG. 6) of a networked microphone device, as illustrated in FIG. 6 or perhaps via another device that relays the instruction to the networked microphone device and/or the playback devices under calibration.

Other example trigger conditions might be based on sensor data. For instance, sensor data from an accelerometer or other suitable sensor may indicate that a given playback device has moved, which may prompt calibration of that playback device (and perhaps other playback devices associated with the given playback device, such as those in a bonded zone or zone group with the playback device).

Some trigger conditions may involve a combination of input data and sensor data. For instance, sensor data may indicate a change in the operating environment of a media playback system, which may cause a prompt to initiate calibration to be displayed on a networked microphone device. The media playback system might proceed with calibration after receiving input data at the prompt indicating confirmation to initiate calibration.

Further example trigger conditions may be based on changes in configuration of a media playback system. For instance, example trigger conditions include addition or removal of a playback device from a media playback system (or grouping thereof). Other example trigger conditions include receiving new types of input content (e.g., receiving multi-channel audio content).

In operation, multiple audio drivers may form multiple sound axes. For instance, two playback devices each with a respective audio driver may form respective sound axes. In some cases, two or more audio drivers may be arrayed to form a sound axis. For example, a playback device with multiple audio drivers (e.g., a soundbar with nine audio drivers) may form multiple sound axes (e.g., three sound axes). Any audio driver may contribute to any number of sound axes. For example, a given sound axis may be formed by contributions from all nine audio drivers of a soundbar.

Each sound axis may correspond to a respective input channel of audio content. For instance, audio drivers of a media playback system may form two sound axes corresponding, respectively, to left and right channels of stereo content. As another example, the audio drivers may form sound axes corresponding to respective channels of surround sound content (e.g., center, front left, front right, rear left, and rear right channels).

Arraying two or more audio drivers to form a given sound axis may enable the two or more audio drivers to "direct" the sound output for the given sound axis in a certain direction. For instance, where nine audio drivers of a soundbar are each contributing a portion of a sound axis corresponding to a left channel of surround sound content, the nine audio drivers may be arrayed (i.e., acoustically summed, perhaps using a DSP) in such a way that the net polar response of the nine audio drivers directs sound to the left. Concurrently with the sound axis corresponding to the left channel, the nine audio drivers may also form sound axes corresponding to center and right channels of the surround sound content to direct sound to the center and to the right, respectively.

A particular set of sound axes formed by playback devices of a media playback system may be referred to as a playback configuration. In operation, playback devices of a media playback system may be configured into a given one of multiple possible playback configurations. While in a given playback configuration, the audio drivers of the playback devices may form a particular set of sound axes. In some cases, configuration of playback devices into a new playback configuration may act as a trigger condition to initiate calibration of the playback devices.

To illustrate, referring back to FIG. 1, playback devices 104, 106, 108, and 110 of the Living Room zone may be configurable into multiple playback configurations. In a first playback configuration, perhaps associated with surround sound audio content, playback device 104 may form one or more sound axes (e.g., front, left, and right channels) while playback devices 108 and 110 form respective sound axes (e.g., left and right surround channels). Playback device 110, being a subwoofer-type device, may contribute a separate low-frequency sound axis or a low-frequency portion of the sound axes formed by playback devices 104, 106, and/or 108. In another playback configuration, the audio drivers of playback devices 104, 106, 108, and 110 may combine to form sound axes corresponding to left and right channels of stereo audio content. Another playback configuration may involve the audio drivers forming a single sound axis corresponding to mono audio content.

In operation, playback devices may utilize a given playback configuration according to various factors. Such factors may include the zone configuration (e.g., whether the playback devices are in a 5.1, 5.0, or other surround sound configuration, a stereo pair configuration, a playbar-only configuration, among others). The factors may also include the specific types and capabilities of the playback devices. The factors may further include the specific type of content provided to the playback devices (or expected to be provided). For instance, playback devices may adopt a first playback configuration when playing surround sound content and another when playing stereo content. As another example, playback devices may use a given playback configuration when playing music and another when playing audio that is paired with video (e.g., television content). Further example playback configurations include any of the above example configurations with (or without) a subwoofer-type playback device, as addition (or subtraction) of such a device from the playback configuration may change the acoustic characteristics and/or allocation of playback responsibilities in the playback configuration.

Some example calibration sequences involve calibrating playback devices for multiple playback configurations. Such calibration sequences may yield multiple calibration profiles that are applied the playback devices are in a given playback configuration. For instance, a given calibration procedure may calibrate the Living Room zone of media playback system 100 for a surround sound playback configuration and a music playback configuration. While in the surround sound playback configuration, the playback devices of the Living Room zone may apply a first calibration profile (e.g., one or more filters that adjusts one or more of magnitude response, frequency response, phase, etc.) corresponding to the surround sound playback configuration. Likewise, while in the music playback configuration, the playback devices of the Living Room zone may apply a second calibration profile corresponding to the music playback configuration.

b. Cause Multiple Audio Drivers to Emit Calibration Audio

In FIG. 13, at block 1304, implementation 1300 involves causing the multiple audio drivers to emit calibration audio. For instance, the NMD may instruct the playback device(s) that include the multiple audio drivers to emit calibration audio via the multiple audio drivers. For instance, control device 126 of media playback system 100 may send a command that causes a playback device (e.g., one of playback devices 102-124) to emit calibration audio. The NMD may send the command via a network interface (e.g., a wired or wireless network interface). A playback device may receive such a command, perhaps via a network interface, and responsively emit the calibration audio.

The calibration audio may include one or more calibration sounds, such as a frequency sweep ("chirp"), brown noise or other types of noise, or a song, among other example sounds. Additional details on example calibration sounds are noted above in connection with the example calibration sequence described in section II. e, as well as generally throughout the disclosure.

In some examples, the calibration audio is divided into frames. As illustrated in FIGS. 11 and 12 and described herein, frames may represent iterations (e.g., a period or cycle) of an example calibration sound. When recorded, frames may produce respective samples of the calibration sound as emitted by one or more audio drivers.

As noted above, in some instances, a calibration sequence involves calibration of multiple sound axes. Example calibration audio to calibrate multiple sound axes may be divided into constituent frames, wherein each frame includes calibration audio for every sound axis under calibration. Accordingly, when recorded, each frame may include samples of the calibration audio produced by each sound axis. The frames may repeat to produce multiple samples for each sound axis.

To include the calibration audio for every sound axis under calibration, each frame may be further divided into slots. Each slot may include the calibration audio for a respective sound axis under calibration. For instance, an example frame for a playbar-type playback device (e.g., playback device 104 shown in FIG. 1) that forms three sound axes (such as left, right, and center channels) may include three slots. If, for example, that device was to be calibrated with a subwoofer-type device, each frame might include four slots, one for each sound axis formed by the playbar-type playback device and one for the sound axis produced by the subwoofer. As a further example, where the playbar-type playback device is calibrated with two additional playback devices that produce respective sound axes (e.g., rear left and right channels), each frame may include five slots (or six slots if calibrated with a subwoofer).

As noted above, each slot may include the calibration audio for a respective sound axis under calibration. The calibration audio in each slot may include a frequency sweep ("chirp"), brown noise or other types of noise, among other examples. For instance, referring back to FIGS. 11 and 12, the calibration audio in each sound may include a hybrid calibration sound. Slots may occur sequentially in a known order, so as to facilitate matching slots within recorded calibration audio to respective sound axes. Each slot may have a known duration, which may also facilitate matching slots within recorded calibration audio to respective sound axis. In further examples, each slot and/or frame may include a watermark (e.g., a particular pattern of sound) to identify the slot or frame, which may be used to match slots within recorded calibration audio to respective sound axes.

Figure 14:
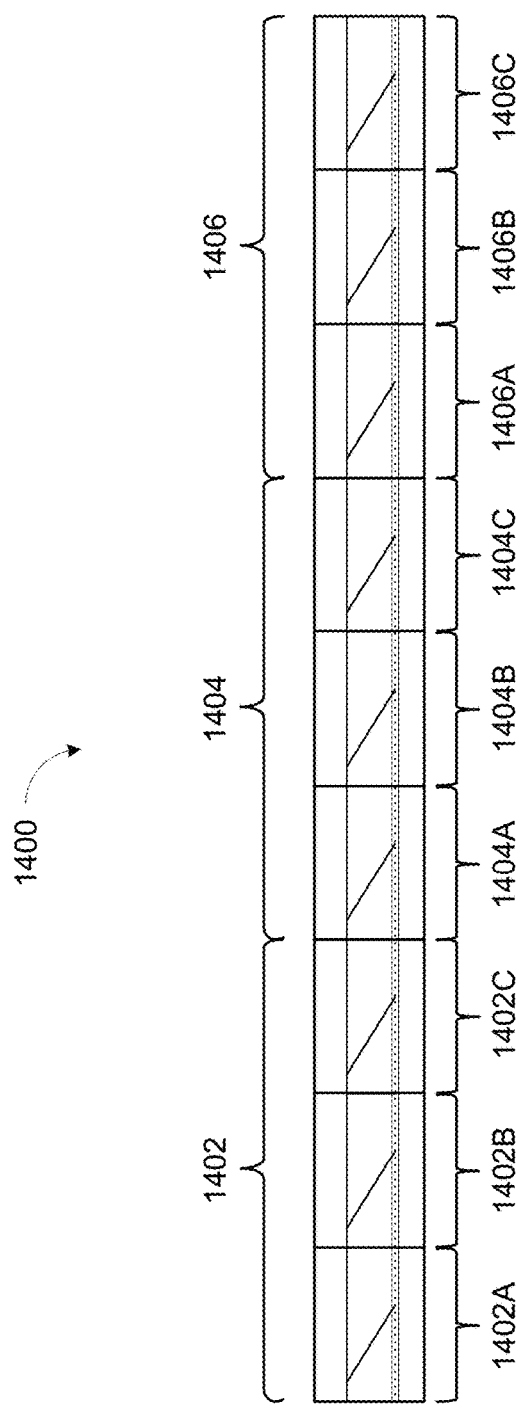
FIG. 14 shows example frames illustrating calibration audio that is divided into frames and slots.

To illustrate, FIG. 14 shows an example calibration audio 1400. Calibration sound 1400 includes frames 1402, 1404, and 1406. Frames 1402, 1404, and 1406 are divided into respective three respective slots. In particular, frame 1402 includes slots 1402A, 1402B and 1402C. Likewise, frames 1404 and 1406 include slots 1404A, 1404B, & 1404C and 1406A, 1406B, & 1406C, respectively. Each slot includes an iteration of hybrid calibration sound 1100 of FIG. 11. During a calibration procedure, the calibration sound in each slot may be emitted by a respective sound axis (perhaps formed via multiple audio drivers). For instance, slots 1402A, 1404A, and 1406A may correspond to a first sound axis (e.g., a left channel) while slots 1402B, 1404B, and 1406B correspond to a second sound axis (and slots 1402C, 1404C, and 1406C to a third sound axis). In such manner, when recorded, calibration audio 1400 may produce three samples of each sound axis, provided that a sufficient portion of frames 1402, 1404 and 1406 are recorded.

As noted above, in some example calibration procedures, the playback devices of a media playback system may be calibrated for multiple playback configurations. Alternatively, different playback configurations for a set of audio drivers may be calibrated in respective calibration sequences. Example calibration audio to calibrate multiple playback configurations may include a repeating series of frames. Each frame in a series may correspond to a respective playback configuration. For instance, example calibration audio to calibrate three playback configurations may include a series of three frames (e.g., frames 1402, 1404, and 1406 of FIG. 14).

As shown in FIG. 14, each frame in the series may be divided into slots corresponding to the sound axes of the playback configuration corresponding to that frame. Since different playback configurations might form different sets of sound axes perhaps with different numbers of total axes, frames in a series may have different numbers of slots. The series of frames may repeat so as to produce multiple samples for each sound axis of each playback configuration.

c. Record Calibration Audio

In FIG. 13, at block 1306, implementation 1300 involves recording the emitted calibration audio. For instance, an NMD may record calibration audio as emitted by playback devices of a media playback system (e.g., media playback system 100) via a microphone. As noted above, example NMDs include control devices (e.g., control device 126 or 128 of FIG. 1), playback devices, or any suitable device with a microphone or other sensor to record calibration audio. In some cases, multiple NMDs may record the calibration audio via respective microphones.

In practice, some of the calibration sound may be attenuated or drowned out by the environment or by other conditions, which may interfere with the recording device recording all of the calibration sound. As such, the NMD may measure a portion of the calibration sounds as emitted by playback devices of a media playback system. The calibration audio may be any of the example calibration sounds described above with respect to the example calibration procedure, as well as any suitable calibration sound.

In some cases, the NMD(s) may remain more or less stationary while recording the calibration audio. For instance, the NMDs may be positioned at one or more particular locations (e.g., a preferred listening location). Such positioning may facilitate recording the calibration audio as would be perceived by a listener at that particular location.

Certain playback configurations may suggest particular preferred listening locations. For example, playback configurations corresponding to surround sound audio or audio that is coupled with video may suggest the location at which users will watch television while listening to the playback devices (e.g., on a couch or chair). In some examples, an NMD may prompt to move to a particular location (e.g., a preferred listening location) to begin the calibration. When calibration multiple playback configurations, the NMD may prompt to move to certain listening locations corresponding to each playback configurations.

Figure 15:
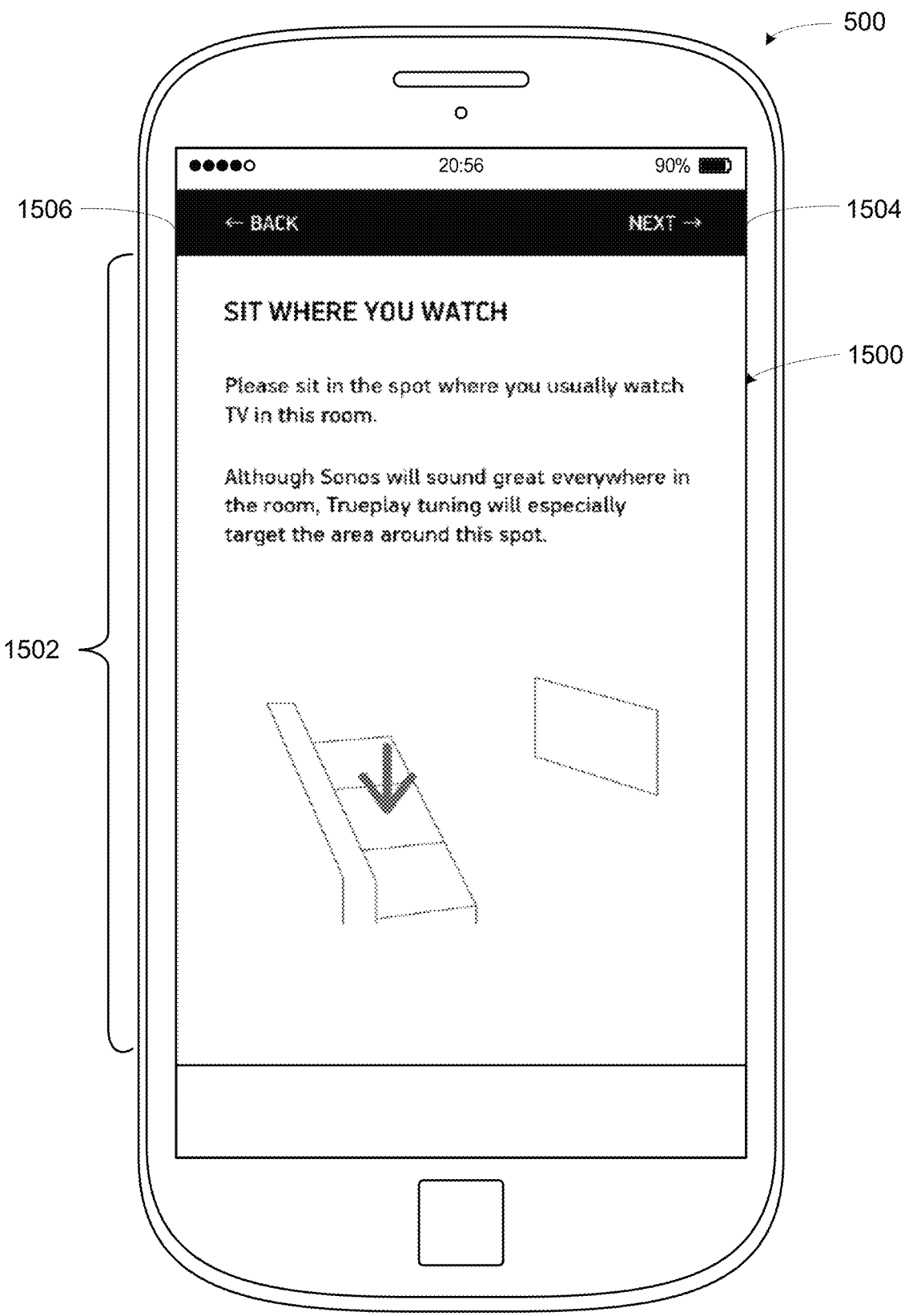
FIG. 15 shows a smartphone that is displaying an example control interface, according to an example implementation

To illustrate such prompts, in FIG. 15, smartphone 500 is displaying control interface 1500 which includes graphical region 1502. Graphical region 1502 prompts to move to a particular location (i.e., where the user will usually watch TV in the room). Such a prompt may be displayed to guide a user to begin the calibration sequence in a preferred location. Control interface 1500 also includes selectable controls 1504 and 1506, which respectively advance and step backward in the calibration sequence.

Figure 16:
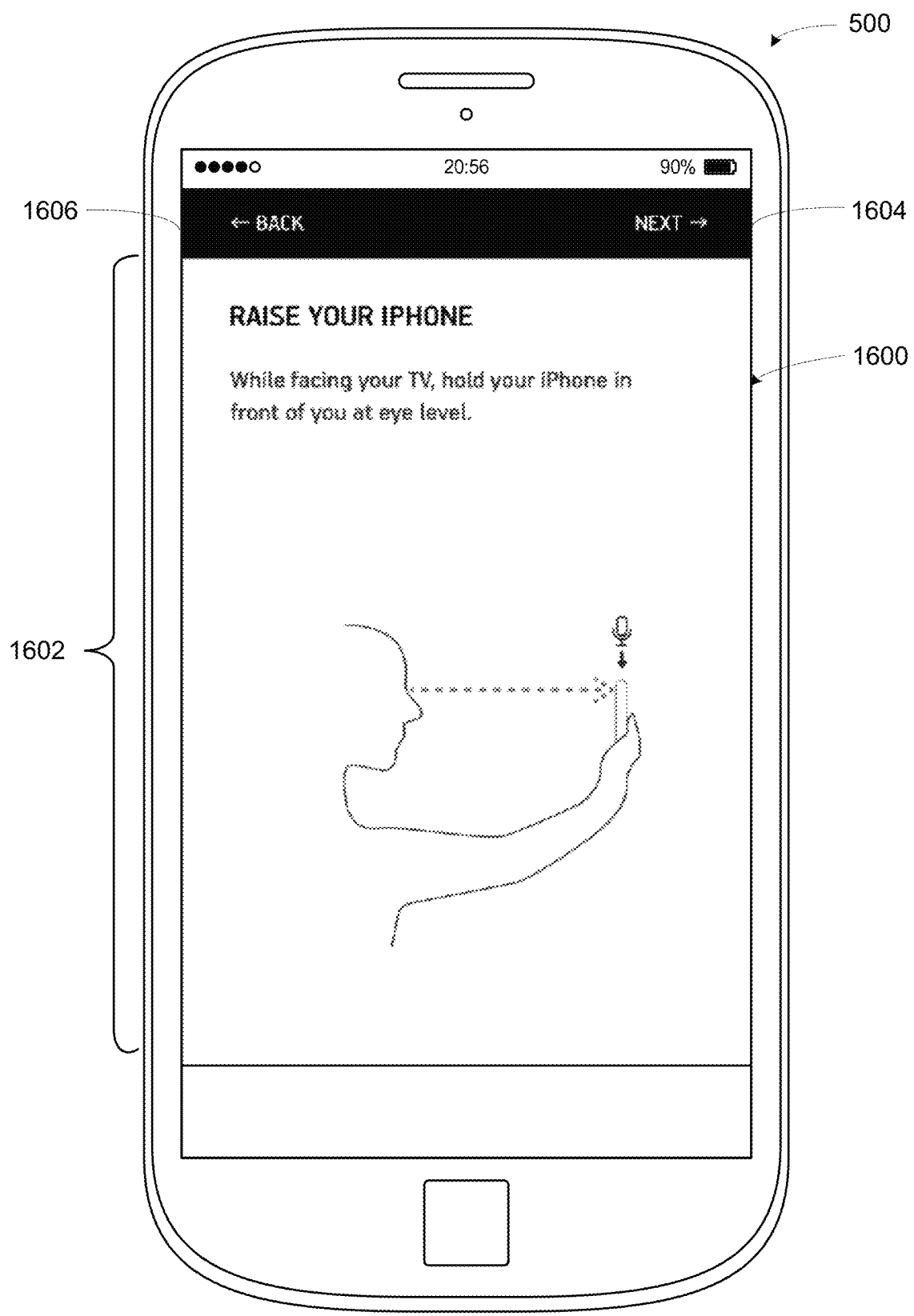
FIG. 16 shows a smartphone that is displaying an example control interface, according to an example implementation

FIG. 16 depicts smartphone 500 displaying control interface 1600 which includes graphical region 1602. Graphical region 1602 prompts the user to raise the recording device to eye level. Such a prompt may be displayed to guide a user to position the phone in a position that facilitates measurement of the calibration audio. Control interface 1600 also includes selectable controls 1604 and 1606, which respectively advance and step backward in the calibration sequence.

Figure 17:
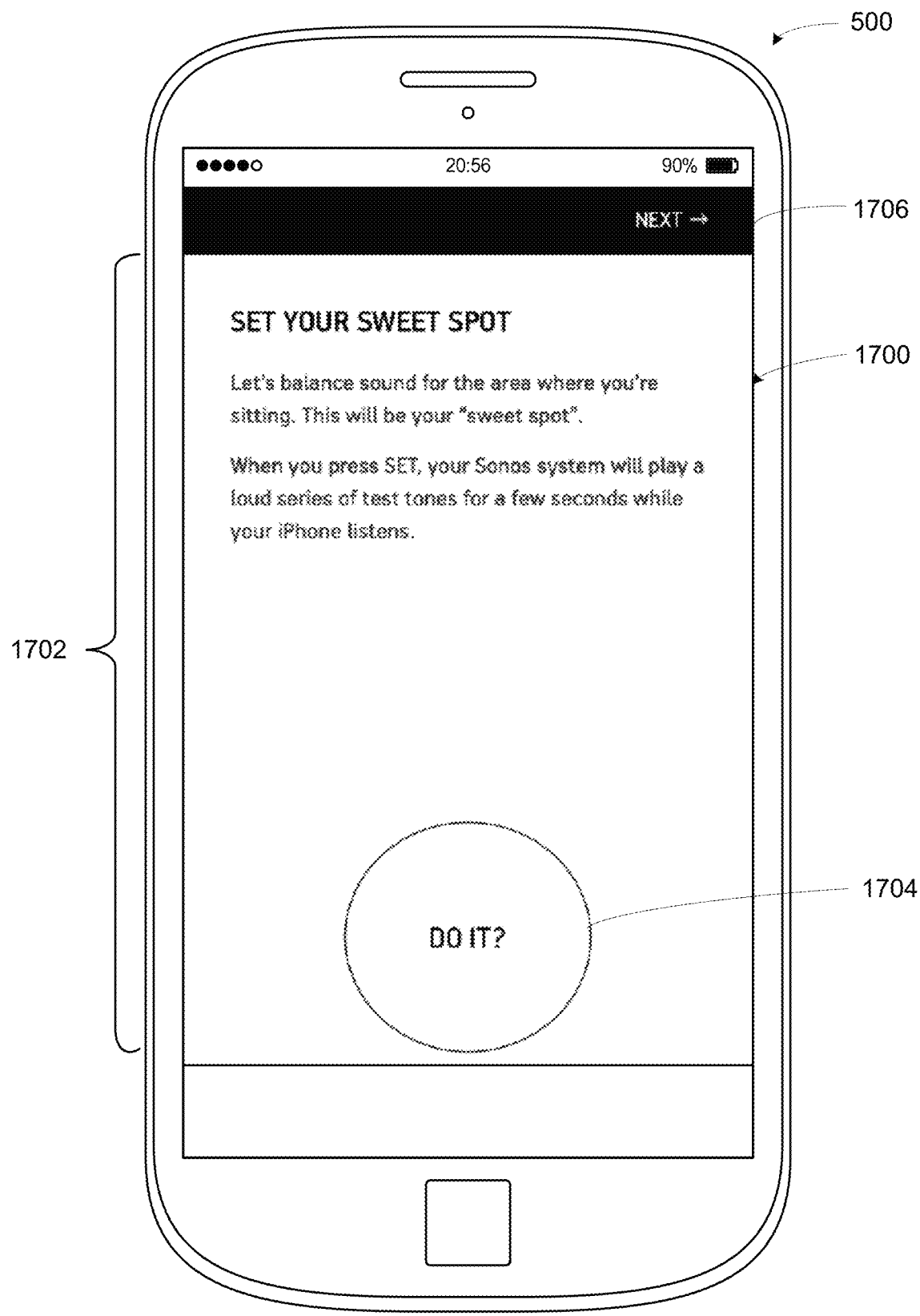
FIG. 17 shows a smartphone that is displaying an example control interface, according to an example implementation.

Next, FIG. 17 depicts smartphone 500 displaying control interface 1700 which includes graphical region 1702. Graphical region 1702 prompts the user to "set the sweet spot." (i.e., a preferred location within the environment). After smartphone 500 detects selection of selectable control 1704, smartphone 500 may begin measuring the calibration sound at its current location (and perhaps also instruct one or more playback devices to output the calibration audio). As shown, control interface 1700 also includes selectable control 1706, which advances the calibration sequence (e.g., by causing smartphone to begin measuring the calibration sound at its current location, as with selectable control 1704).

Figure 18:
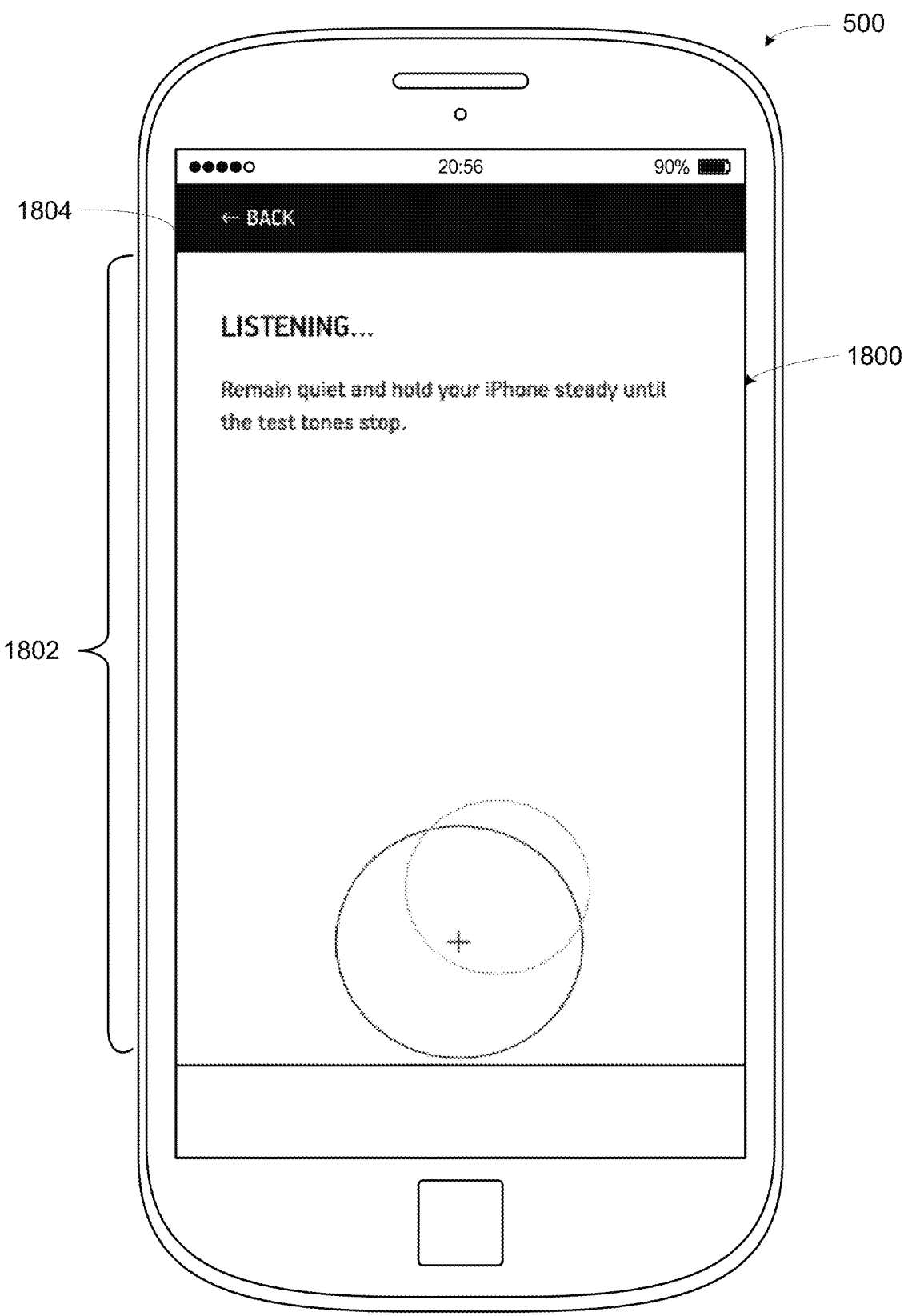
FIG. 18 shows a smartphone that is displaying an example control interface, according to an example implementation.

In FIG. 18, smartphone 500 is displaying control interface 1800 which includes graphical region 1802. Graphical region 1802 indicates that smartphone 500 is recording the calibration audio. Control interface 1800 also includes selectable control 1804, which steps backwards in the calibration sequence.

d. Cause Processing of Recorded Calibration Audio

In FIG. 13, at block 1308, implementation 1300 involves causing the recorded calibration audio to be processed. For instance, the NMD may cause a processing device to process the recorded calibration audio. In some cases, the NMD may include the processing device. Alternatively, the NMD may transmit the recorded audio to one or more other processing devices for processing. Example processing devices include playback devices, control devices, a computing device connected to the media playback system via a local area network, a remote computing device such as a cloud server, or any combination of the above.

Processing of the calibration audio may involve determining one or more calibrations for each of the multiple sound axes. Each calibration of the multiple sound axes may involve modifying one or more of magnitude response, frequency response, phase adjustment, or any other acoustic characteristic. Such modifications may spatially calibrate the multiple sound axes to one or more locations (e.g., one or more preferred listening locations).

Such modifications may be applied using one or more filters implemented in a DSP or as analog filters. The calibration data may include the parameters to implement the filters (e.g., as the coefficients of a bi-quad filter). Filters may be applied per audio driver or per set of two or more drivers (e.g., two or more drivers that form a sound axis or two or more of the same type of audio driver, among other examples). In some cases, respective calibrations may be determined for the multiple playback configurations under calibration.

The recorded calibration audio may be processed as it is recorded or after recording is complete. For instance, where the calibration audio is divided into frames, the frames may be transmitted to the processing device as they are recorded, possibly in groups of frames. Alternatively, the recorded frames may be transmitted to the processing device after the playback devices finish emitting the calibration audio.

Processing may involve determining respective delays for each sound axis of the multiple sound axes. Ultimately, such delays may be used to align time-of-arrival of respective sound from each sound axis at a particular location (e.g., a preferred listening location). For instance, a calibration profile for a given playback configuration may include filters that delay certain sound axes of the playback configuration to align time-of-arrival of the sound axes of the playback configuration at a preferred listening location. Sound axes may have different times-of-arrival at a particular location because they are formed by audio drivers at different distances from the particular location. Further, some sound axes may be directed away from the particular location (e.g., left and right channels of a soundbar-type playback device), and as such, reflect off of the environment before arriving at the particular location. Such a sound path may increase the effective distance between the audio drivers forming a sound axis and the particular location, which may cause a later time-of-arrival as compared to sound axes that have a more direct path. As noted above, such a preferred listening location might be a couch or chair for a surround sound playback configuration.

Within examples, the processing device may separate the recorded audio into parts corresponding to the different sound axes and/or playback configurations that emitted each part. For instance, where the calibration sound emitted by the playback devices was divided into frames, the processing device may divide the recorded audio back into the constituent frames. Where the calibration sound included a series of frames, the processing device may attribute the frames from each series to the respective playback configuration corresponding to those frames. Further, the processing device may divide each frame into respective slots corresponding to each sound axis. As noted above, the playback devices may emit frames and slots in a known sequence and each slot may have a known duration to facilitate dividing the recorded audio into its constituent parts. In some examples, each slot and/or frame may include a watermark to identify the slot or frame, which may be used to match frames within recorded calibration audio to respective playback configurations and/or slots to respective sound axes.

The processing device may determine an impulse response for each sound axis. Each impulse response may be further processed by generating frequency filtered responses so as to divide the impulse responses into frequency bands. Audio drivers of different types may array better at different frequency bands. For instance, mid-range woofers may array well to form a sound axis in a range from 300 Hz to 2.5 kHz. As another example, tweeters may array well in a range from 8 kHz to 14 kHz. Where an example sound axis is configured to form a center channel of a surround sound configuration, the sound axis should be maximum on-axis and attenuated to the right and left. Conversely, for sound axes forming left and right channels of the surround sound configuration, each array should be attenuated (e.g., NULL) on-axis and maximum to the left or right, respectively. Outside of the certain ranges such as those provided above, the audio drivers might not form the sound axis as well in the intended direction. Such frequency ranges are provided by way of example and may vary according to capabilities and characteristics of different audio drivers.

As a further example, in a playback device with multiple audio drivers of different types (e.g., tweeters and woofers), a processing device may determine three band-limited responses. Such responses might include a full-range response, a response covering a mid-range for woofers (e.g., 300 Hz to 2.5 kHz), and a response covering high frequencies for the tweeters (e.g., 8 kHz to 14 kHz). Such frequency-filtered responses may facilitate further processing by more clearly representing each sound axis.

Processing the recorded audio may involve comparisons between the responses for each sound axis. To facilitate such comparisons, the impulse responses for each slot may be time-aligned with one another (as they were emitted during different periods of time). For instance, the impulse responses may be aligned to a first reference point, such as the beginning of each slot. Such time-alignment of the impulse responses facilitates identification of particular reference points in each response.

In an example implementation, identification of particular reference points in each response involves identifying a given second reference point in an impulse response of a reference sound axis. By way of example, the reference sound axis may be a sound axis corresponding to a center channel of a surround sound system (e.g., a 3.0, 3.1, 5.0, 5.1 or other multi-channel playback configuration). This sound axis may be used as the reference sound axis because sound from this axis travels more directly to typical preferred listening locations than other sound axes (e.g., sound axis that form left and right channels). The given second reference point in this impulse response may be the first peak value. The first peak can be assumed to correspond to the direct signal from the audio driver(s) to the NMD (rather than a reflection). This given second reference point (i.e., the first peak) is used as a reference for subsequent times-of-arrival of other sound axes at the NMD.

To compare times-of-arrival other sound axes at the NMD to the reference sound axis, the processing device may identify second reference points in the other impulse responses. These other second reference points correspond to the same second reference point as in the reference sound axis. For instance, if the first peak in the impulse response of the reference sound axis was used as the given second reference point, then the first peaks in the other impulse responses are identified as the second reference points.

Where the approximate physical configuration of the multiple audio drivers is known, a time window may be applied to limit the portion of each impulse response where the second reference points are to be identified. For instance, where the sound axes form left, right, and center channels, the impulse responses for the sound axes forming the left and right channels can be limited to a time window subsequent to the peak value in the impulse response for the sound axis forming the center channels. Sound from the sound axes forming the left and right channels travels outward to the left and right (rather than on-axis) and thus the peak value of interest will be a reflection of the sound from these axes off the environment. However, sound axes forming left and/or right surround channels and/or a subwoofer channel may have been physically closer to the NMD than the audio driver(s) forming the center channel. As such, a window for impulse responses corresponding to those axes may encompass time before and after the given reference point in the reference sound axis so as to account for the possibility of either positive or negative delay relative to that reference sound axis.

Once respective second reference points in the impulse responses have been identified, the respective times-of-arrival of sound from each sound axis at the NMD (i.e., the microphone of the NMD) can be determined. In particular, the processing device may determine the respective times-of-arrival at the microphone by comparing respective differences from the first reference point to the second reference points in each impulse response.

With respective times-of-arrival of sound from each sound axis at the NMD determined, the processing device may determine respective delays to be applied for each sound axis. The processing device may determine the delays relative to a delay target. This delay target may be the sound axis that has the latest time-of-arrival. The sound axis acting as the delay target might not receive any delay. Other sound axes may be assigned a delay to match the time-of-arrival of the sound axis acting as the delay target. A sound axis that forms a center channel may not be used as the delay target in some instances because sound axes with later times-of-arrival cannot be assigned "negative" delay to match the time-of-arrival of the sound axis forming the center channel.

In some cases, the delay for any given sound axis may be capped at a maximum delay threshold. Such capping may prevent issues with large amounts of delay causing apparent mismatch between audio content output by the sound axes and video content that is coupled to that audio content (e.g., lip-sync issues). Such capping may be applied only to playback configurations that include audio paired with video, as large delays may not impact user experience when the audio is not paired with video. Alternatively, if the video display is synchronized with the playback device(s), then the video might be delayed to avoid apparent mismatch between audio content output by the sound axes and video content that is coupled to that audio content, which may eliminate the need for a maximum delay threshold.

As noted above, the NMD that recorded the calibration audio might not perform certain portions of the processing (or might not process the calibration audio at all). Rather, the NMD may transmit data representing the recorded calibration audio to a processing device, perhaps with one or more instructions on how to process the recorded calibration audio. In other cases, the processing device may be programmed to process recorded calibration audio using certain techniques. In such embodiments, transmitting data representing the recorded calibration audio (e.g., data representing raw samples of calibration audio and/or data representing partially processed calibration audio) may cause the processing device to determine calibration profiles (e.g., filter parameters).

e. Cause Calibration of Multiple Sound Axes

In FIG. 13, at block 1310, implementation 1300 involves causing calibration of the multiple sound axes. For instance, the NMD may send calibration data to the playback device(s) that form the multiple sound axes. Alternatively, the NMD may instruct another processing device to transmit calibration data to the playback device. Such calibration data may causes the playback device(s) to calibrate the multiple sound axes to a certain response.

As noted above, calibration of the multiple sound axes may involve modifying one or more of magnitude response, frequency response, phase adjustment, or any other acoustic characteristic. Such modifications may be applied using one or more filters implemented in a DSP or as analog filters. The calibration data may include the parameters to implement the filters (e.g., as the coefficients of a bi-quad filter). Filters may be applied per audio driver or per set of two or more drivers (e.g., two or more drivers that form a sound axis or two or more of the same type of audio driver, among other examples).

Calibrating the multiple sound axes may include causing audio output of the multiple sound axes to be delayed according to the respective determined delays for the sound axes. Such delays may be formed by causing respective filters to delay audio output of the multiple audio drivers according to the respective determined delays for the multiple sound axes. Such filters may implement a circular buffer delay line, among other examples.

In some cases, the delays are dynamic. For instance, the response of one axis may overlap with the response of another in a given range, yet the sound axes may have different times-of-arrival (thus suggesting different delays). In such situations, the delays of each sound axis may be smoothed across the overlapping range. For instance, a delay curve may be implemented across the range to smooth the delay. Such smoothing may improve user experience by avoiding possibly sharp differences in delay between sound axes in overlapping ranges.

As noted above, in some cases, sound produced by certain sounds axes may reflect off of the environment before

IV. Example Techniques to Facilitate Spectral Calibration Using Applied Spatial Calibration As noted above, embodiments described herein may facilitate the calibration of one or more playback devices. FIG. 19 illustrates an example implementation 1900 by which a playback device facilitates spectral calibration using applied spatial calibration.

a. Receive Data Representing Spatial Calibration(s)

At block 1902, implementation 1900 involves receiving data representing one or spatial calibrations. For instance, a playback device (e.g., any playback device of media playback system 100 in FIG. 1 or playback device 300 in FIG. 3) may receive data representing one or more spatial calibrations (e.g., any of the multiple calibrations described above in connection with implementation 1300 of FIG. 13) via a network interface from a device such as a processing device or a NMD, among other possible sources. Each calibration may have been previously determined by way of a calibration sequence, such as the example calibration sequences described above.

A calibration may include one or more filters. Such filters may modify one or more of magnitude response, frequency response, phase adjustment, or any other acoustic characteristic. Further, such filters may calibrate the playback device(s) under calibration to one or more particular listening locations within a listening area. As noted above, the filters may be implemented in a DSP (e.g., as the coefficients of a bi-quad filter) or as an analog filter, or a combination thereof. The received calibration data may include a filter for each audio channel, axis or device under calibration. Alternatively, a filter may be applied to more than one audio channel, axis or device.

In some cases, multiple calibrations may correspond to respective playback configurations. As noted above, a playback configuration refers to a specific set of sound axes formed by multiple audio drivers. Further, an example spatial calibration may include calibration of audio drivers in multiple playback configurations. As such, there may be more than one filter (or set of filters) for each audio channel, axis or device. Each filter (or set of filters) may correspond to a different playback configuration.

As noted above, playback configurations may involve variance in the assignment of audio drivers to form sound axes. Each sound axis in a playback configuration may correspond to a respective input channel of audio content. Example playback configurations may correspond to difference numbers of input channels, such as mono, stereo, surround (e.g., 3.0, 5.0, 7.0) or any of the above in combination with a subwoofer (e.g., 3.1, 5.1, 7.1). Other playback configurations may be based on input content type. For instance, example playback configurations may correspond to input audio content including music, home theater (i.e., audio paired with video), surround sound audio content, spoken word, etc. These example playback configurations should not be considered limiting. The received calibrations may include filter(s) corresponding to any individual playback configuration or any combination of playback configurations.

The playback device may maintain these calibrations in data storage. Alternatively, such calibrations may be maintained on a device or system that is communicatively coupled to the playback device via a network. The playback device may receive the calibrations from this device or system, perhaps upon request from the playback device.

b. Cause Audio Driver(s) to Output Calibration Audio

In FIG. 19, at block 1904, implementation 1900 involves causing the audio driver(s) to output calibration audio. For instance the playback device may cause an audio stage to drive the audio drivers to output calibration audio. An example audio stage may include amplifier(s), signal processing (e.g., a DSP), as well as other possible components. In some cases, the playback device may instruct other playback devices under calibration to output calibration audio, perhaps when acting as a group coordinator for the playback devices under calibration.

The calibration audio may include one or more calibration sounds, such as a frequency sweep ("chirp"), brown noise or other types of noise, or a song, among other examples. Additional details on example calibration sounds are noted above in connection with the example calibration sequences described above.

The calibration audio may be divided into frames. As illustrated in FIGS. 11 and 12 and described herein, frames may represent iterations of an example calibration sound. When recorded, frames may produce respective samples of the calibration sound as emitted by one or more audio drivers. The frames may repeat to produce multiple samples.

As noted above, a calibration sequence may involve calibration of multiple sound axes. In such cases, the calibration audio output may be divided into constituent frames, wherein each frame includes calibration audio for every sound axis under calibration. Accordingly, when recorded, each frame may include samples of the calibration audio produced by each sound axis. The frames may repeat to produce multiple samples for each sound axis.

As noted above, in some example calibration procedures, the playback devices of a media playback system may be calibrated for multiple playback configurations. Alternatively, different playback configurations for a set of audio drivers may be calibrated in respective calibration sequences. Example calibration audio to calibrate multiple playback configurations may include a repeating set of frames. Each frame in a set may correspond to a respective playback configuration. For instance, example calibration audio to calibrate three playback configurations may include a series of three frames (e.g., frames 1402, 1404, and 1406 of FIG. 14).

During each frame, the playback device may apply a spatial calibration corresponding to a respective playback configuration. Applying a spatial calibration may involve causing an audio stage (or multiple audio stages) to apply respective filter(s) corresponding to each playback configuration. As the input signal passes through the filter(s), the calibration is applied to modify one or more of magnitude response, frequency response, phase adjustment, or any other acoustic characteristic of the audio driver(s) as the calibration audio is emitted. As noted above, such filters may modify the emitted calibration audio to suit a particular listening location. For instance, example spatial filters may at least partially balance time-of-arrival of sound from multiple sound axes at the particular listening location.

In other embodiments, the spatial calibration may be applied to calibration audio by a device other than the playback device. A spatial calibration may be applied by any device that stores and/or generates the calibration audio for output by the audio drivers using a processor or DSP of that device. Yet further, a spatial calibration may be applied by any intermediary device between the device that stores the calibration audio and the playback device(s) under calibration.

To include the calibration audio for every sound axis under calibration, each frame may be further divided into slots. Each slot may include the calibration audio for a respective sound axis under calibration. For instance, an example frame for a playbar-type playback device (e.g., playback device 104 shown in FIG. 1) that forms three sound axes (such as left, right, and center channels) may include three slots. If, for example, that device was to be calibrated with a subwoofer-type device, each frame might include four slots, one for each sound axis formed by the playbar-type playback device and one for the sound axis produced by the subwoofer. As a further example, where the playbar-type playback device is calibrated with two additional playback devices that produce respective sound axes (e.g., surround left and right channels), each frame may include five slots (or six slots if calibrated with a subwoofer). FIG. 14 illustrates example calibration audio with constituent frames that are divided into slots.

As noted above, each slot may include the calibration audio for a respective sound axis under calibration. The calibration audio in each slot may include a frequency sweep ("chirp"), brown noise or other types of noise, among other examples. For instance, as shown in FIGS. 11 and 12, the calibration audio in each sound may include a hybrid calibration sound. Slots may occur sequentially in a known order, so as to facilitate matching slots within recorded calibration audio to respective sound axes. Each slot may have a known duration, which may also facilitate matching slots within recorded calibration audio to respective sound axis. In further examples, each slot and/or frame may include a watermark (e.g., a particular pattern of sound) to identify the slot or frame, which may be used to match slots within recorded calibration audio to respective sound axes.

c. Receive Data Representing Spectral Calibration(s)

In FIG. 19, at block 1906, implementation 1900 involves receiving data representing one or spectral calibrations. For instance, the playback device may receive data representing one or more spectral calibrations from a processing device. These spectral calibrations may be based on the calibration audio output by the audio driver(s). In particular, the calibration audio output from the audio driver(s) may be recorded by one or more recording devices (e.g., an NMD). Before being recorded, the calibration audio may be interact (e.g., be reflected or absorbed) by the surrounding environment and thereby represent characteristics of the environment.

Example spectral calibrations may offset acoustics characteristics of the environment to achieve a given response (e.g., a flat response, a response that is considered desirable, or a set equalization). For instance, if a given environment attenuates frequencies around 500 Hz and amplifies frequencies around 14000 Hz, a calibration might boost frequencies around 500 Hz and cut frequencies around 14000 Hz so as to offset these environmental effects.

Some example techniques for determining a calibration are described in U.S. patent application Ser. No. 13/536,493 filed Jun. 28, 2012, entitled "System and Method for Device Playback Calibration" and published as US 2014/0003625 A1, which is incorporated herein in its entirety. Example techniques are described in paragraphs [0019]-[0025] and [0068]-[0118] as well as generally throughout the specification.

Further example techniques for determining a calibration are described in U.S. patent application Ser. No. 14/216,306 filed Mar. 17, 2014, entitled "Audio Settings Based On Environment" and published as US 2015/0263692 A1, which is incorporated herein in its entirety. Example techniques are described in paragraphs [0014]-[0025] and [0063]-[0114] as well as generally throughout the specification.

Additional example techniques for determining a calibration are described in U.S. patent application Ser. No. 14/481,511 filed Sep. 9, 2014, entitled "Playback Device Calibration" and published as US 2016/0014534 A1, which is incorporated herein in its entirety. Example techniques are described in paragraphs [0017]-[0043] and [0082]-[0184] as well as generally throughout the specification.

Example processing devices include NMDs, other playback devices, control devices, a computing device connected to the media playback system via a local area network, a remote computing device such as a cloud server, or any combination of the above. In some cases, the processing device(s) may transmit the spatial calibrations to one or more intermediary devices which may transmit the spatial calibrations to the playback device. Such intermediary devices may store the data representing one or spatial calibrations.

d. Apply Particular Spectral Filter

At block 1908, implementation 1900 involves applying a particular spectral calibration. For instance, the playback device may apply a particular filter corresponding to a given playback configuration when playing back audio content in that playback configuration. The playback device may maintain or have access to respective spectral calibrations corresponding to multiple playback configurations.

In some examples, the playback device may be instructed to enter a particular playback configuration and accordingly apply a particular calibration corresponding to that playback configuration. For instance, a control device may transit a command to form a specific set of sound axes corresponding to a given playback configuration.

Alternatively, the playback device may detect the proper spectral calibration to apply based on its current configuration. As noted above, playback devices may be joined into various groupings, such as a zone group or bonded zone. Each grouping may represent a playback configuration. In some implementations, upon being joined into a grouping with another playback device, the playback device may apply a particular calibration associated with the playback configuration of that grouping. For instance, based on detecting that the playback device has joined a particular zone group, the playback device may apply a certain calibration associated with zone groups (or with the particular zone group).

The playback device may detect the spectral calibration to apply based the audio content being provided to the playback device (or that it has been instructed to play back). For instance, the playback device may detect that it is playing back media content that consists of only audio (e.g., music).

In such cases, the playback device may apply a particular calibration associated with a playback configuration that corresponds to music playback. As another example, the playback device may receive media content that is associated with both audio and video (e.g., a television show or movie). When playing back such content, the playback device may apply a particular calibration corresponding to audio that is paired with video, or perhaps a calibration corresponding to home theater (e.g., surround sound).

The playback device may apply a certain calibration based on the source of the audio content. Receiving content via a particular one of these sources may trigger a particular playback configuration. For instance, receiving content via a network interface may indicate music playback. As such, while receiving content via the network interface, the playback device may apply a particular calibration associated with a particular playback configuration corresponding to music playback. As another example, receiving content via a particular physical input may indicate home theater use (i.e., playback of audio from a television show or movie). While playing back content from that input, the playback device may apply a different calibration associated with a playback configuration corresponding to home theater playback.

A given zone scene may be associated with a particular playback configuration. Upon entering a particular zone scene and thus the particular playback configuration, the playback device may apply a particular calibration associated with that playback configuration. Alternatively, the content or configuration associated with a zone scene may cause the playback device to apply a particular calibration. For example, a zone scene may involve playback of a particular media content or content source, which causes the playback device to apply a particular calibration.

In yet further examples, the playback configuration may be indicated to the playback device by way of one or more messages from a control device or another playback device. For instance, after receiving input that selects a particular playback configuration, a device may indicate to the playback device that a particular playback configuration is selected. The playback device may apply a calibration associated with that playback configuration. As another example, the playback device may be a member of a group, such as a bonded zone group. Another playback device, such as a group coordinator device of that group, may detect a playback configuration of the group and send a message indicating that playback configuration (or the calibration for that configuration) to the playback device.

In some cases, the playback device may also apply the calibration to one or more additional playback devices. For instance, the playback device may be a member (e.g., the group coordinator) of a group (e.g., a zone group). The playback device may send messages instructing other playback devices in the group to apply the calibration. Upon receiving such a message, these playback devices may apply the calibration.

In some examples, the calibration or calibration state may be shared among devices of a media playback system using one or more state variables. Some examples techniques involving calibration state variables are described in U.S. patent application Ser. No. 14/793,190 filed Jul. 7, 2015, entitled "Calibration State Variable," and U.S. patent application Ser. No. 14/793,205 filed Jul. 7, 2015, entitled "Calibration Indicator," which are incorporated herein in their entirety.

V. Example Techniques to Facilitate Spectral Calibration Using Applied Spatial Calibration As noted above, embodiments described herein may facilitate the calibration of one or more playback devices. FIG. 20 illustrates an example implementation 200 by which an NMD facilitates spectral calibration of a media playback system using applied spatial calibration.

a. Detect Trigger Condition

At block 2002, implementation 2000 involves detecting a trigger condition that initiates calibration. For instance, a NMD may detect a trigger condition that initiates calibration of a media playback system. The trigger condition may initiate calibration of the playback device(s) in the media playback system for multiple playback configurations, either explicitly or perhaps because the audio driver(s) of the playback device(s) have been set up with multiple playback configurations. Example trigger conditions to initiate a calibration are described above in section III. a, as well as generally throughout the disclosure.

b. Cause Audio Driver(s) to Output Calibration Audio

In FIG. 20, at block 2004, implementation 2000 involves causing audio driver(s) to output calibration audio. For instance the NMD may cause multiple audio drivers to output calibration audio. The NMD transmit an instruction the playback device(s) under calibration, perhaps via a network interface. Example calibration audio is described above in connection with the example calibration techniques.

c. Record Calibration Audio

In FIG. 20, at block 2006, implementation 2000 involves recording the calibration audio. For instance, the NMD may record the calibration audio as output by the audio driver(s) of the playback device(s) under calibration via a microphone. In some cases, multiple NMDs may record the calibration audio via respective microphones.

The NMD may be moving through the environment while recording the calibration audio so as to measure the calibration sounds at different locations. With a moving microphone, repetitions of the calibration sound are detected at different physical locations within the environment. Samples of the calibration sound at different locations may provide a better representation of the surrounding environment as compared to samples in one location. For example, referring back to FIG. 7, control device 126 of media playback system 100 may detect calibration audio emitted by one or more playback devices (e.g., playback devices 104, 106, 108, and/or 110 of the Living Room Zone) at various points along the path 700 (e.g., at point 702 and/or point 704). Alternatively, the control device may record the calibration signal along the path.

Figure 21:
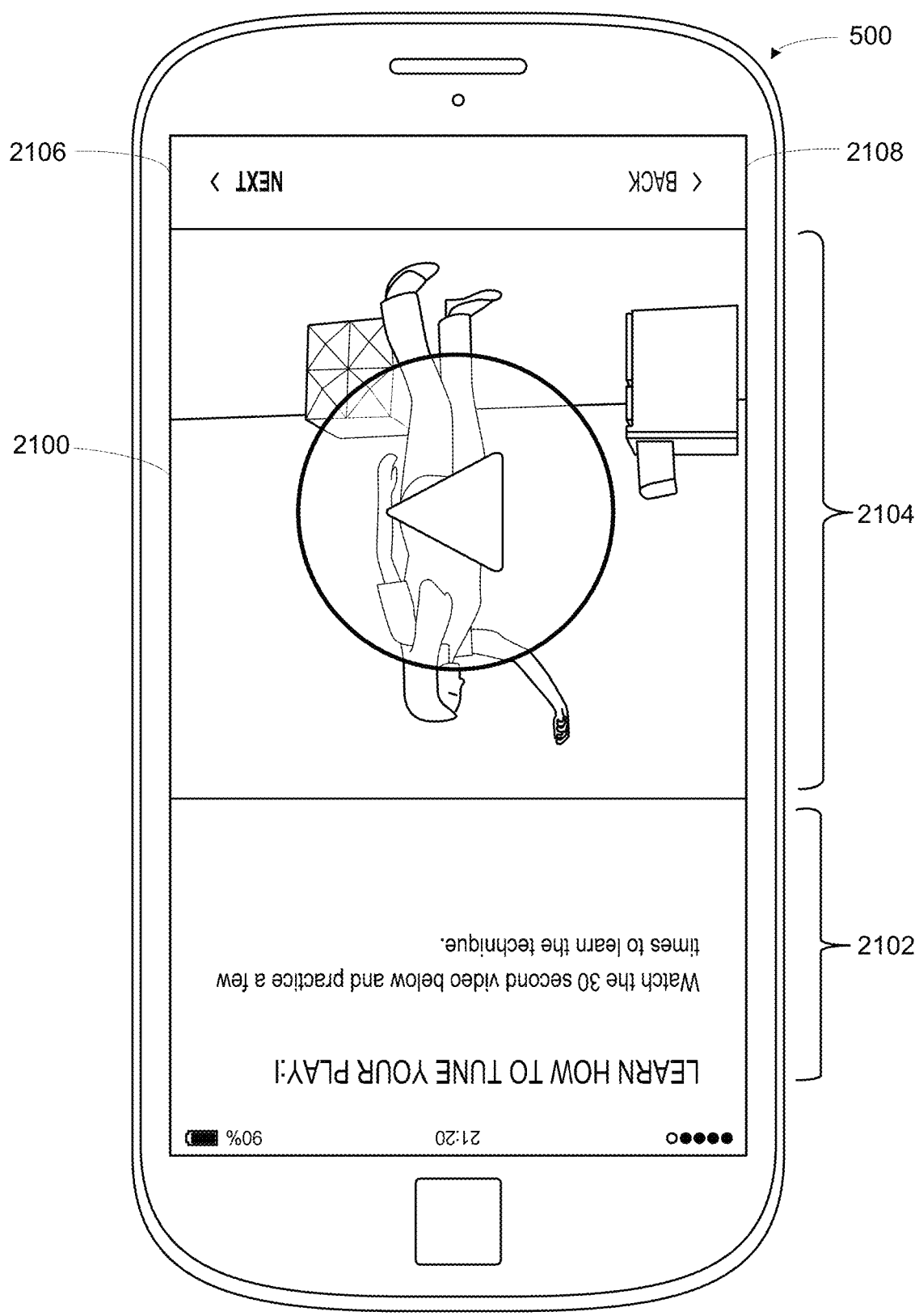
FIG. 21 shows a smartphone that is displaying an example control interface, according to an example implementation.

As such, an NMD may display one or more prompts to move the NMD while the calibration audio is being emitted. Such prompts may guide a user in moving the recording device during the calibration. To illustrate, in FIG. 21, smartphone 500 is displaying control interface 2100 which includes graphical regions 2102 and 2104. Graphical region 2102 prompts to watch an animation in graphical region 2104. Such an animation may depict an example of how to move the smartphone within the environment during calibration to measure the calibration audio at different locations. While an animation is shown in graphical region 2104 by way of example, the control device may alternatively show a video or other indication that illustrates how to move the control device within the environment during calibration. Control interface 2100 also includes selectable controls

2106 and 2108, which respectively advance and step backward in the calibration sequence.

Further examples for recording calibration audio are described above in section III a. as well as generally throughout the disclosure.

d. Determine Spectral Calibration(s)

At block 2008, implementation 2000 involves determining spectral calibrations. For instance, the NMD may cause a processing device to determine respective sets of spectral filters for the multiple playback configurations under calibrations. These spectral calibrations may be based on the recorded calibration audio output by the audio driver(s). In some cases, the NMD may include the processing device. Alternatively, the NMD may transmit the recorded audio to one or more other processing devices. Example processing devices and processing techniques are described above.

The NMD may causing a particular calibration (e.g., a particular set of spectral filters) corresponding to a given playback configuration to be applied to the sound axes formed by the multiple audio drivers when the media playback system is playing back audio content in the given playback configuration. Additional examples of applying calibrations are described above.

VI. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

(Feature 1) A method comprising detecting a trigger condition that initiates calibration of a media playback system comprising multiple audio drivers that form multiple sound axes, each sound axis corresponding to a respective channel of multi-channel audio content; causing, via a network interface, the multiple audio drivers to emit calibration audio that is divided into constituent frames, the multiple sound axes emitting calibration audio during respective slots of each constituent frame; recording, via a microphone, the emitted calibration audio; causing respective delays for each sound axis of the multiple sound axes to be determined based on the slots of recorded calibration audio corresponding to the sound axis; and causing the multiple sound axes to be calibrated, wherein calibrating the multiple sound axes comprises causing audio output of the multiple sound axes to be delayed according to the respective determined delays.

(Feature 2) The method of feature 1, wherein causing respective delays for each sound axis of the multiple sound axes to be determined comprises causing a processing device to determine respective times-of-arrival at the microphone for each sound axis of the multiple sound axes from the slots of recorded calibration audio corresponding to each sound axis; and causing the delays for each sound axis of the multiple sound axes to be determined, each determined delay corresponding to the determined time-of-arrival of a respective sound axis.

(Feature 3) The method of feature 2, wherein causing audio output of the multiple sound axes to be delayed according to the respective determined delays comprises causing respective filters to delay audio output of the multiple audio drivers according to the respective determined delays for the multiple sound axes.

(Feature 4) The method of feature 2, wherein the NMD comprises the processing device, and wherein causing the processing device to determine respective times-of-arrival at the microphone for each sound axis of the multiple sound axes comprises: dividing the recorded calibration audio into the constituent frames and each constituent frame into the respective slots for each sound axis; determining respective impulse responses for the sound axes from the respective slots corresponding to the each sound axis; aligning the respective impulse responses to a first reference point; identifying respective second reference points in each impulse response; and determining the respective times-of-arrival at the microphone based on respective differences from the first reference point to the second reference points in each impulse response.

(Feature 5) The method of feature 4, wherein the sound axes consist of a reference sound axis and one or more other sound axes, and wherein identifying respective second reference points in each impulse response comprises: identifying, as a given second reference point, a peak value in the impulse response of the reference sound axis; and identifying, as the other second reference points, respective peak values of the impulse responses of the one or more other sound axes in a time window subsequent to the given second reference point.

(Feature 6) The method of feature 2, wherein the processing device is connected to the NMD via one or more networks, and wherein causing the processing device to determine respective times-of-arrival at the microphone for each sound axis of the multiple sound axes comprises: sending, via the network interface to the processing device, (i) the recorded calibration audio, and (ii) an instruction to determine respective times-of-arrival at the microphone for each sound axis of the multiple sound axes; and receiving, via the network interface, the determine respective times-of-arrival.

(Feature 7) The method of feature 1, wherein the each sound axis of the multiple sound axes corresponds to a respective channel of surround sound audio content.

(Feature 8) The method of feature 7, wherein the media playback system comprises multiple playback devices each comprising a subset of the multiple audio drivers.

(Feature 9) The method of feature 8, wherein the multiple playback devices comprise a given playback device comprising a particular subset of the multiple audio drivers, wherein the particular subset of the multiple audio drivers forms three sound axes, the three sound axes corresponding respectively to a left channel of the surround sound audio content, a right channel of the surround sound audio content, and a center channel of the audio content.

(Feature 10) The method of feature 1, wherein detecting the trigger condition that initiates calibration of a media playback system comprises detecting, via a user interface, input data indicating a command to initiate calibration of the media playback system.

(Feature 11). The method of feature 1, wherein detecting the trigger condition that initiates calibration of the media playback system comprises detecting configuration of the media playback system into a particular axis configuration, wherein the multiple audio drivers form a particular set of sound axes.

(Feature 12) The method of feature 1, wherein causing delays for each sound axis of the multiple sound axes to be determined comprises: determining that time-of-arrival of a given sound axis exceeds a maximum delay threshold; and causing delay of the given sound axis to be set at the maximum delay threshold when the media playback system is playing back audio content that is paired to video content.

(Feature 13) A tangible, non-transitory computer-readable medium having stored therein instructions executable by one or more processors to cause a device to perform the method of any of features 1-12.

(Feature 14) A device configured to perform the method of any of features 1-12.

(Feature 15) A media playback system configured to perform the method of any of features 1-12.

(Feature 16) A method comprising: receiving, via a network interface, data representing one or more spatial filters that correspond to respective playback configurations, wherein each playback configuration represents a particular set of sound axes formed via the one or more audio drivers, and wherein each sound axis corresponds to a respective channel of audio content; causing, via the audio stage, the one or more audio drivers to output calibration audio that is divided into a repeating set of frames, the set of frames comprising a respective frame for each playback configuration, wherein causing the one or more audio drivers to output the calibration audio comprises causing the audio stage to apply, during each frame, the spatial filter corresponding to the respective playback configuration; receiving, via the network interface, data representing one or more spectral filters that correspond to respective playback configurations, the one or more spectral filters based on the calibration audio output by the one or more audio drivers; and when playing back audio content in a given playback configuration, causing the audio stage to apply a particular spectral filter corresponding to the given playback configuration.

(Feature 17) The method of feature 16, wherein receiving data representing one or more spatial filters comprises receiving data representing one or more spatial filters that calibrate the playback device to a particular listening location within a listening area of the playback device, and wherein receiving data representing one or more spectral filters comprises receiving data representing one or more spectral filters that offset acoustic characteristics of the listening area.

(Feature 18) The method of feature 16 wherein receiving data representing one or more spatial filters comprises receiving data representing one or more sets of spatial filters, each set of spatial filter comprising a respective spatial filter for each sound axis, and wherein receiving data representing one or more spectral filters comprises receiving data representing one or more sets of spectral filters, each spectral filter comprising a respective spectral filter for each sound axis.

(Feature 19) The method of feature 18, wherein the one or more spatial filters comprise at least one of: (i) a first filter that corresponds to a mono playback configuration, the one or more audio drivers configured to form a sound axis to output mono audio content when playing back audio content in the mono playback configuration, (ii) a second filter that corresponds to a stereo playback configuration, the one or more audio drivers configured to form one or more sound axes to output one or more channels of stereo audio content when playing back audio content in the stereo playback configuration, and (iii) a third filter that corresponds to a surround sound playback configuration, the one or more audio drivers configured to form one or more sound axes to output one or more channels of surround sound audio content when playing back audio content in the surround sound playback configuration.

(Feature 20) The method of feature 18, wherein the mono playback configuration is a first mono playback configuration, the stereo playback configuration is a first stereo playback configuration, and the surround sound playback configuration is a first surround sound configuration, and wherein the one or more spatial filters comprise at least one of: (i) a fourth filter that corresponds to a second mono playback configuration, the one or more audio drivers configured to form a sound axis to output mono audio content in synchrony with a subwoofer device when playing back audio content in the second mono playback configuration, (ii) a fifth filter that corresponds to a second stereo playback configuration, the one or more audio drivers configured to form one or more sound axes to output one or more channels of stereo audio content in synchrony with the subwoofer device when playing back audio content in the second stereo playback configuration, and (iii) a sixth filter that corresponds to a second surround sound playback configuration, the one or more audio drivers configured to form one or more sound axes to output one or more channels of surround sound audio content in synchrony with a subwoofer device when playing back audio content in the second surround sound playback configuration.

(Feature 21) The method of feature 16, wherein the one or more spatial filters comprise: (i) a first filter that corresponds to a music playback configuration, the one or more audio drivers configured to form one or more sound axes to output music content when playing back audio content in the music playback configuration, and (ii) a second filter that corresponds to a home theater playback configuration, the one or more audio drivers configured to form one or more sound axes to output audio content that is paired to video content when playing back audio content in the home theater playback configuration.

(Feature 22) The method of feature 16, wherein the one or more audio drivers comprise multiple audio drivers that form multiple sound axes in a given playback configuration and wherein causing the one or more audio drivers to output the calibration audio comprises causing the multiple sound axes to output calibration audio during respective slots of each frame that corresponds to the given playback configuration.

(Feature 23) The method of feature 22, wherein each sound axis of the multiple sound axes corresponds to a respective channel of surround sound audio content.

(Feature 24) The method of feature 22, wherein each sound axis of the multiple sound axes corresponds to a respective channel of stereo audio content.

(Feature 25) The method of feature 16, wherein the one or more audio drivers form a single sound axis in a given playback configuration.

(Feature 26) A tangible, non-transitory computer-readable medium having stored therein instructions executable by one or more processors to cause a device to perform the method of any of features 16-25.

(Feature 27) A device configured to perform the method of any of features 16-25.

(Feature 28) A media playback system configured to perform the method of any of features 16-25.

(Feature 29) A method comprising: detecting a trigger condition that initiates calibration of a media playback system for multiple playback configurations, wherein each playback configuration represents a particular set of sound axes formed via multiple audio drivers of the media playback system, and wherein each sound axis corresponds to a respective channel of audio content; causing, via a network interface, the multiple audio drivers to output calibration audio that is divided into a repeating set of frames, the set of frames comprising a respective frame for each playback configuration, wherein causing the multiple audio drivers to output the calibration audio comprises causing, during each frames of the set of frames, a respective set of spatial filters to be applied to the multiple audio drivers, each set of spatial filters comprising a respective spatial filter for each sound axis; recording, via a microphone, the calibration audio output by the multiple audio drivers; causing a processing device to determine respective sets of spectral filters for the multiple playback configurations based on the recorded calibration audio, each set of spectral filters comprising a respective spectral filter for each sound axis.

(Feature 30) The method of feature 29, the method further comprising: when the media playback system is playing back audio content in a given playback configuration, causing a particular set of spectral filters corresponding to the given playback configuration to be applied to the sound axes formed by the multiple audio drivers.

(Feature 31) The method of feature 29, wherein the calibration audio is second calibration audio, the method further comprising: before causing the multiple audio drivers to output the second calibration audio, causing, via the network interface, the multiple drivers to output first calibration audio that is divided into a repeating set of frames, the set of frames comprising a respective frame for each playback configuration of the multiple playback configurations; recording, via the microphone, the first calibration audio output by the multiple audio drivers; and causing the processing device to determine the respective sets of spatial filters for the multiple playback configurations based on recorded first calibration audio, each set of spatial filters comprising a respective spatial filter for each sound axis.

(Feature 32) The method of feature 29, wherein causing the multiple audio drivers to output the calibration audio comprises causing the multiple audio drivers to form respective sound axes of the multiple sound axes during respective slots of each frame.

(Feature 33) The method of feature 29, wherein the multiple playback configurations comprise two or more of: (i) a mono playback configuration, the multiple audio drivers configured to form sound axes to synchronously output mono audio content when playing back audio content in the mono playback configuration, (ii) a stereo playback configuration, the multiple audio drivers configured to form sound axes to output channels of stereo audio content when playing back audio content in the stereo playback configuration, and (iii) a surround sound playback configuration, the multiple audio drivers configured to form sound axes to output respective channels of surround sound audio content when playing back audio content in the surround sound playback configuration.

(Feature 34) The method of feature 33, wherein the mono playback configuration is a first mono playback configuration, the stereo playback configuration is a first stereo playback configuration, and the surround sound playback configuration is a first surround sound configuration, wherein the multiple playback configurations comprise at least one of: (i) a second mono playback configuration, the multiple audio drivers configured to form one or more full range sound axes and a subwoofer sound axis to synchronously output mono audio content when playing back audio content in the mono playback configuration, (ii) a second stereo playback configuration, the multiple audio drivers configured to form one or more full range sound axes to synchronously output channels of stereo content audio content with a subwoofer sound axis when playing back audio content in the second stereo playback configuration, and (iii) a second surround sound playback configuration, the multiple audio drivers configured to form one or more full range sound axes to synchronously output respective channels of surround sound content audio content with a subwoofer sound axis when playing back audio content in the second surround sound playback configuration.

(Feature 35) The method of feature 29, wherein the multiple playback configurations comprise two or more of: (i) a music playback configuration, the multiple audio drivers configured to form sound axes to output music content when playing back audio content in the music playback configuration, and (ii) a home theater playback configuration, the multiple audio drivers configured to form sound axes to output audio content that is paired to video content when playing back audio content in the home theater playback configuration.

(Feature 36) The method of feature 29, wherein causing, during each frames of the set of frames, the respective set of spatial filters to be applied to the multiple audio drivers comprises causing the processing device to apply the spatial filters to the calibration audio and transmit the calibration audio with the applied spatial filters to one or more playback devices comprising the multiple audio drivers.

(Feature 37) The method of feature 29, wherein the media playback system comprises multiple playback devices each comprising a subset of the multiple audio drivers.

(Feature 38) A tangible, non-transitory computer-readable medium having stored therein instructions executable by one or more processors to cause a device to perform the method of any of features 29-37.

(Feature 39) A device configured to perform the method of any of features 29-37.

(Feature 40) A media playback system configured to perform the method of any of features 29-37.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A tangible, non-transitory computer-readable medium storing instructions executable by one or more processors to cause a network microphone device (NMD) to perform operations comprising:

recording, via a microphone of the NMD, periodic calibration audio emitted via respective audio drivers of two or more playback devices configured to output multi-channel audio content in synchrony, wherein the respective audio drivers of the two or more playback devices are configured to form a plurality of sound axes including a first sound axis and one or more second sound axes, wherein one or more audio drivers of a first playback device of the two or more playback devices form the first sound axis and one or more audio drivers of a second playback device of the two or more playback devices form the one or more second sound axes, wherein each sound axis corresponds to a respective channel of the multi-channel audio content, and wherein the NMD is communicatively coupled with a media playback system that includes the two or more playback devices;

arranging the recorded calibration audio into constituent frames representing respective periods of the calibration audio, each frame having a first slot and one or more second slots, wherein the first slot comprises a portion of the recorded calibration audio corresponding to the first sound axis, and wherein the one or more second slots comprise respective portions of the recorded calibration audio corresponding to each of the second sound axes;

based on a first frame of the constituent frames, determining a first arrival time and respective second arrival times of the respective portions of the recorded calibration audio in the first slot and the one or more second slots of the first frame;

determining a first delay for the first sound axis and one or more respective second delays for the one or more second sound axes, wherein the first delay and the one or more respective second delays are based on the first arrival time and the second arrival times, respectively;

causing, via a network interface, audio output of the first sound axis and the one or more second sound axes to be delayed according to the first delay and the one or more respective second delays, respectively, wherein causing audio output of the first sound axis and the one or more second sound axes to be delayed according to the respective first and second delays comprises:
sending, via the network interface to the first playback device, instructions to delay audio output of the first sound axis according to the first delay; and
sending, via the network interface to the second playback device, instructions to delay audio output of the one or more second sound axes according to the one or more respective second delays.

2. The tangible, non-transitory computer-readable medium of claim 1, wherein two or more first audio drivers of the respective audio drivers form the first sound axis and wherein two or more second audio drivers of the respective audio drivers form a given second sound axis.

3. The tangible, non-transitory computer-readable medium of claim 2, wherein the two or more first audio drivers and the two or more second audio drivers include at least one audio driver in common.

4. The tangible, non-transitory computer-readable medium of claim 2, wherein the instructions are executable to perform operations further comprising:
detecting a trigger condition that initiates calibration of the media playback system, wherein detecting the trigger condition comprises detecting a configuration of the media playback system in which the two or more first audio drivers form the first sound axis and the two or more second audio drivers form the second sound axis.

5. The tangible, non-transitory computer-readable medium of claim 1, wherein causing audio output of the first sound axis and the one or more second sound axes to be delayed comprises:
causing, via the network interface, one or more first filters to delay audio output of the first playback device according to the first delay; and
causing, via the network interface, one or more second filters to delay audio output of the second playback device according to the one or more respective second delays.

6. The tangible, non-transitory computer-readable medium of claim 1, wherein determining the first arrival time and the respective second arrival times comprises:
determining a first impulse response corresponding to the first slot and one or more second impulse responses corresponding to respective second slots;
aligning the first impulse response and the one or more second impulse responses to a first reference point;
identifying respective second reference points in the first and second impulse responses;
determining a first difference between the first and second reference point of the first impulse response;
determining respective second differences between the first and second reference points of the one or more second impulse responses; and
determining first and second arrival times based on the first difference and the respective second differences.

7. The tangible, non-transitory computer-readable medium of claim 1, wherein the one or more audio drivers of the second playback device comprise multiple audio drivers configured to form multiple second sound axes corresponding to left, center, and right channels of the multi-channel audio content, respectively.

8. The tangible, non-transitory computer-readable medium of claim 1, wherein the operations further comprise:
based on a second frame of the constituent frames, determining a first arrival time and respective second arrival times of the respective portions of the recorded calibration audio in the first slot and the one or more second slots of the second frame, wherein determining the first delay for the first sound axis and the one or more respective second delays for the one or more second sound axes comprises determining the first delay for the first sound axis and the one or more respective second delays for the one or more second sound axes based on the first arrival time and the second arrival times, respectively, of the first frame and the first arrival time and the second arrival times, respectively, of the second frame.

9. A method to be performed by a network microphone device (NMD), the method comprising:
recording, via a microphone of the NMD, periodic calibration audio emitted via respective audio drivers of two or more playback devices configured to output multi-channel audio content in synchrony, wherein the respective audio drivers of the two or more playback devices are configured to form a plurality of sound axes including a first sound axis and one or more second sound axes, wherein one or more audio drivers of a first playback device of the two or more playback devices form the first sound axis and one or more audio drivers of a second playback device of the two or more playback devices form the one or more second sound axes, wherein each sound axis corresponds to a respective channel of the multi-channel audio content, and wherein the NMD is communicatively coupled with a media playback system that includes the two or more playback devices;

arranging the recorded calibration audio into constituent frames representing respective periods of the calibration audio, each frame having a first slot and one or more second slots, wherein the first slot comprises a portion of the recorded calibration audio corresponding to the first sound axis, and wherein the one or more second slots comprise respective portions of the recorded calibration audio corresponding to each of the second sound axes;

based on a first frame of the constituent frames, determining a first arrival time and respective second arrival times of the respective portions of the recorded calibration audio in the first slot and the one or more second slots of the first frame;

determining a first delay for the first sound axis and one or more respective second delays for the one or more second sound axes, wherein the first delay and the one or more respective second delays are based on the first arrival time and the second arrival times, respectively; and causing, via a network interface, audio output of the first sound axis and the one or more second sound axes to be delayed according to the first delay and the one or more respective second delays, respectively, wherein causing audio output of the first sound axis and the one or more second sound axes to be delayed according to the respective first and second delays comprises:

sending, via the network interface to the first playback device, instructions to delay audio output of the first sound axis according to the first delay; and sending, via the network interface to the second playback device, instructions to delay audio output of the one or more second sound axes according to the one or more respective second delays.

10. The method of claim 9, wherein two or more first audio drivers of the respective audio drivers form the first sound axis and wherein two or more second audio drivers of the respective audio drivers form a given second sound axis.

11. The method of claim 10, wherein the two or more first audio drivers and the two or more second audio drivers include at least one audio driver in common.

12. The method of claim 10, further comprising:
detecting a trigger condition that initiates calibration of the media playback system, wherein detecting the trigger condition comprises detecting a configuration of the media playback system in which the two or more first audio drivers form the first sound axis and the two or more second audio drivers form the second sound axis.

13. The method of claim 9, wherein causing audio output of the first sound axis and the one or more second sound axes to be delayed comprises:
causing, via the network interface, one or more first filters to delay audio output of the first playback device according to the first delay; and
causing, via the network interface, one or more second filters to delay audio output of the second playback device according to the one or more respective second delays.

14. The method of claim 9, wherein determining the first arrival time and the respective second arrival times comprises:

determining a first impulse response corresponding to the first slot and one or more second impulse responses corresponding to respective second slots;
aligning the first impulse response and the one or more second impulse responses to a first reference point;
identifying respective second reference points in the first and second impulse responses;
determining a first difference between the first and second reference point of the first impulse response;
determining respective second differences between the first and second reference points of the one or more second impulse responses; and
determining first and second arrival times based on the first difference and the respective second differences.

15. The method of claim 9, wherein the one or more audio drivers of the second playback device comprise multiple audio drivers configured to form multiple second sound axes corresponding to left, center, and right channels of the multi-channel audio content, respectively.

16. The method of claim 9, further comprising:
based on a second frame of the constituent frames, determining a first arrival time and respective second arrival times of the respective portions of the recorded calibration audio in the first slot and the one or more second slots of the second frame, wherein determining the first delay for the first sound axis and the one or more respective second delays for the one or more second sound axes comprises determining the first delay for the first sound axis and the one or more respective second delays for the one or more second sound axes based on the first arrival time and the second arrival times, respectively, of the first frame and the first arrival time and the second arrival times, respectively, of the second frame.

17. A media playback system comprising:
two or more playback devices comprising respective audio drivers configured to form a plurality of sound axes including a first sound axis and one or more second sound axes, wherein one or more audio drivers of a first playback device of the two or more playback devices form the first sound axis and one or more audio drivers of a second playback device of the two or more playback devices form the one or more second sound axes, and wherein each sound axis corresponds to a respective channel of the multi-channel audio content;
a network microphone device (NMD) comprising a microphone and a network interface;
one or more processors; and
data storage storing instructions, that when executed by the one or more processors, cause the media playback system to perform operations comprising:
recording, via the microphone of the NMD, periodic calibration audio emitted via multiple audio drivers of the two or more playback devices configured to output multi-channel audio content in synchrony;
arranging the recorded calibration audio into constituent frames representing respective periods of the calibration audio, each frame having a first slot and one or more second slots, wherein the first slot comprises a portion of the recorded calibration audio corresponding to the first sound axis, and wherein the one or more second slots comprise respective portions of the recorded calibration audio corresponding to each of the second sound axes;
based on a first frame of the constituent frames, determining a first arrival time and respective second arrival times of the respective portions of the recorded calibration audio in the first slot and the one or more second slots of the first frame;

determining a first delay for the first sound axis and one or more respective second delays for the one or more second sound axes, wherein the first delay and the one or more respective second delays are based on the first arrival time and the second arrival times, respectively; and causing, via a network interface, audio output of the first sound axis and the one or more second sound axes to be delayed according to the first delay and the one or more respective second delays, respectively, wherein causing audio output of the first sound axis and the one or more second sound axes to be delayed according to the respective first and second delays comprises:

sending, via the network interface to the first playback device, instructions to delay audio output of the first sound axis according to the first delay; and sending, via the network interface to the second playback device, instructions to delay audio output of the one or more second sound axes according to the one or more respective second delays.

18. The media playback system of claim 17, wherein two or more first audio drivers of the respective audio drivers form the first sound axis and wherein two or more second audio drivers of the respective audio drivers form a given second sound axis.

19. The media playback system of claim 18, wherein the two or more first audio drivers and the two or more second audio drivers include at least one audio driver in common.

20. The media playback system of claim 17, wherein causing audio output of the first sound axis and the one or more second sound axes to be delayed comprises:

causing, via the network interface, one or more first filters to delay audio output of the first playback device according to the first delay; and causing, via the network interface, one or more second filters to delay audio output of the second playback device according to the one or more respective second delays.

21. The media playback system of claim 17, wherein determining the first arrival time and the respective second arrival times comprises:

determining a first impulse response corresponding to the first slot and one or more second impulse responses corresponding to respective second slots;

aligning the first impulse response and the one or more second impulse responses to a first reference point;

identifying respective second reference points in the first and second impulse responses;

determining a first difference between the first and second reference point of the first impulse response;

determining respective second differences between the first and second reference points of the one or more second impulse responses; and determining first and second arrival times based on the first difference and the respective second differences.

22. The media playback system of claim 17, wherein the one or more audio drivers of the second playback device comprise multiple audio drivers configured to form multiple second sound axes corresponding to left, center, and right channels of the multi-channel audio content, respectively.

23. The media playback system of claim 17, wherein the operations further comprise:

based on a second frame of the constituent frames, determining a first arrival time and respective second arrival times of the respective portions of the recorded calibration audio in the first slot and the one or more second slots of the second frame, wherein determining the first delay for the first sound axis and the one or more respective second delays for the one or more second sound axes comprises determining the first delay for the first sound axis and the one or more respective second delays for the one or more second sound axes based on the first arrival time and the second arrival times, respectively, of the first frame and the first arrival time and the second arrival times, respectively, of the second frame.

* * * * *